US008130930B2

(12) United States Patent
DeMent

(10) Patent No.: US 8,130,930 B2
(45) Date of Patent: Mar. 6, 2012

(54) CUSTOMIZED RINGBACK AND COMMUNICATIONS

(75) Inventor: Jeffrey M. DeMent, Hoffman Estates, IL (US)

(73) Assignee: LiveWire Mobile, Inc., Littleton, MA (US)

( * ) Notice: Subject to any disclaimer, the term of this patent is extended or adjusted under 35 U.S.C. 154(b) by 1321 days.

(21) Appl. No.: 11/805,836

(22) Filed: May 24, 2007

(65) Prior Publication Data

US 2007/0291931 A1 Dec. 20, 2007

Related U.S. Application Data

(63) Continuation-in-part of application No. 10/981,817, filed on Nov. 5, 2004, now Pat. No. 7,813,490.

(60) Provisional application No. 60/808,449, filed on May 25, 2006, provisional application No. 60/833,421, filed on Jul. 25, 2006, provisional application No. 60/518,818, filed on Nov. 10, 2003, provisional application No. 60/577,724, filed on Jun. 7, 2004.

(51) Int. Cl.
*H04M 3/42* (2006.01)
(52) U.S. Cl. .............................. 379/207.16; 379/373.01
(58) Field of Classification Search ............. 379/211.01, 379/207.16, 373.01, 204.01
See application file for complete search history.

(56) References Cited

U.S. PATENT DOCUMENTS

| 2003/0007483 A1 | 1/2003 | Um |
| 2004/0174983 A1* | 9/2004 | Olschwang et al. .......... 379/377 |
| 2005/0105706 A1* | 5/2005 | Kokkinen ................ 379/201.01 |
| 2005/0117726 A1 | 6/2005 | DeMent et al. |

OTHER PUBLICATIONS

Sawhney, Nitin et al. "Nomadic Radio: Speech & Audio Interaction for Contextual Messaging in Nomadic Environments", In ACM Transactions on Computer-Human Interaction (TOCHI), vol. 7, Issue 3 (Sep. 2000)—Special issue on human-computer interaction with mobile systems, p. 353-383. Year of publication: 2000 (retrieved on Nov. 3, 2007). Retrieved from the Internet: <URL: http://media.mit.edu/speech/papers/2000/sawhney_ToCHI00_nomadic_radio.pdf>.

Camarillo, G. et al. IETF RFC 3960 Early Media and Ringing Tone Generation in the Session Initiation Protocol (SIP), Dec. 2004, p. 1-13, Copyright (C) The Internet Society (2004), http://www.ietf.org/rfc/rfc3960.txtRFC 3960.

(Continued)

*Primary Examiner* — Curtis Kuntz
*Assistant Examiner* — Amal Zenati
(74) *Attorney, Agent, or Firm* — Chapin IP Law, LLC; Barry W. Chapin

(57) ABSTRACT

A ring-back tone generator system provides a customized ring-back tone to a calling party (attempting to reach a called party) while the ring-back tone generator system participates in alerting the called party of the call connection request. Upon acceptance of the call connection by the called party answering his phone, the ring-back tone generator system can temporarily bridge the caller party with the called party. After at least temporarily providing the bridge, the ring-back tone generator system communicates with a remote phone switch system for purposes of offloading the bridge to a remote device that instead provides the bridge between the caller and the called party. Accordingly, the ring-back tone generator system can participate in a process of providing a customized ring-back tone to a caller, initiate alerting of a called party of the call, bridging a call, and a handing off a call.

17 Claims, 32 Drawing Sheets

OTHER PUBLICATIONS

3GPP Organizational Partners (ARIB, ATIS, CCSA, ETSI, TTA, TTC), 3GPP TS 22.182, 3RD Generation Partnership Project; Technical Specification Group Services and System Aspects; Customized Alerting Tones (CAT) Requirements; Stage 1 (Release 8); Apr. 2007, p. 1-13.

Ejzak, R. "Private Header (P-Header) Extension to the Session Initiation Protocol (SIP) for Authorization of Early Media", Sep. 2007, p. 1-15, http://www.tools.ietf.org/html/rfc5009.

European Telecommunications Standards Institute 2007, "Telecommunications and Internet Converged Services and Protocols for Advanced Networking (TISPAN); Requirements for Customized Originating and Terminating Multimedia Information Presentation (COMIP/CTMIP) and Customized Originating and Terminating Multimedia Information Filtering (COMIF/CTMIF) Requirements Analysis", Aug. 2007, p. 1- 41, ETSI TR 181 015 v2.0.1 (Technical Report), France, http://www.etsi.org.

International Search Report, dated Dec. 14, 20037, p. 1.

* cited by examiner

CUSTOMIZED RINGBACK AND COMMUNICATIONS

RELATED APPLICATIONS

This application is related to and claims the benefit of earlier filed U.S. Provisional Patent Application Ser. No. 60/808,449, entitled "Ringback Tone Platform Network Integration,", filed on May 25, 2006, the entire teachings of which are incorporated herein by this reference.

This application is related to and claims the benefit of earlier filed U.S. Provisional Patent Application Ser. No. 60/833,421, entitled "Ringback Tone Platform for IP Network,", filed on Jul. 25, 2006, the entire teachings of which are incorporated herein by this reference.

This application is also a continuation-in-part of U.S. patent application Ser. No. 10/981,817, entitled "Methods and Apparatus for Implementing Customized Ringback,", filed on Nov. 5, 2004, now U.S. Pat. No. 7,813,490, which claims the benefit of two provisional applications, namely, earlier filed U.S. Provisional Patent Application Ser. No. 60/518,818, entitled "New services Based on Custom Ringback Capabilities,", filed on Nov. 10, 2003, and earlier filed U.S. Provisional Patent Application Ser. No. 60/577,724, entitled "Telephony Network Integration Methods for a Customized Ringback Service,", filed on Jun. 7, 2004, the entire teachings of which are incorporated herein by this reference.

BACKGROUND

During past years, several network operators around the world have introduced personalized RingBack Tone (RBT) services. Such a service enables a subscriber to choose a custom audio clip (e.g., a favorite song) to be played back to a caller phone during a ringing portion of a call, prior to a called party answering the call. Thus, instead of hearing a standard ring-back tone (at the caller's phone) indicating that a target phone is being alerted of the incoming call connection request, the caller hears the custom audio clip selected by the subscriber.

According to one conventional application, a subscriber of the custom ring-back tone service may specify one of several audio clips to be played back to a caller based on factors such as caller identification, time-of-day, or other factors. The purpose of the audio clip (e.g., custom ringback tone) can be entertainment, advertising, or corporate identification/branding.

A conventional architecture for providing custom ringback tones includes a Mobile Switching Center (MSC), a Home Location Register (HLR), and a ring-back tone generator. In such an architecture, software in a network operator's MSC, in conjunction with the Home Location Register (HLR), identifies which received calls have been placed to corresponding subscribers of the ring-back service. For such calls, the MSC sets up a voice path to the ring-back tone generator for conveying a ring-back tone to the caller phone while also placing an outbound call connection to alert the subscriber of the call placed by the caller phone. The ring-back tone generator then plays the selected audio clip back to the caller through the voice path while the subscriber phone is alerted of the incoming call connection request. When the MSC detects that the subscriber answers his alerting phone, or the target phone abandons the call, the MSC releases the voice path to the ring-back tone generator and continues on with normal call handling. For example, after detecting that the subscriber answers his phone, the MSC breaks a link to the ring-back tone generator and bridges the caller phone to the subscriber phone via a voice communication channel so that the subscriber and the caller can talk with each other without the custom ring-back tone being played.

SUMMARY

The description below describes several different examples of supporting custom ring-back tone services that may have one or more of the following advantages. For example, a network operator to advantageously can deploy such a service using existing network equipment (e.g., switches/MSCs and HLRs), even if that equipment is designed to play back the standard network ring-back tone to the caller—not a subscriber-customized audio clip. Some examples advantageously do not require the network operator to purchase expensive (and possibly service-disrupting) custom software enhancements and/or software feature package upgrades from an equipment vendor, even if an operator employs equipment from multiple vendors in their network. In such examples, the network operator does not have to acquire software supporting a custom ring-back tone service from the equipment vendor, who might not have such software available.

In one example, there is an MSC that redirects handing of a call connection request to a remotely located ring-back tone generator system. During operation, the ring-back tone generator system maintains a first link through the MSC to feed back a custom ring-back tone to a caller phone calling a target phone. The ring-back tone generator system also maintains a second link through the MSC to alert (e.g., cause the subscriber's phone to ring) a subscriber phone of an incoming call request. Upon detection of a subscriber answering his phone, the ring-back tone generator system i) discontinues providing the ring-back tone to the caller phone and ii) bridges the first link and second link so that the caller phone can communicate with the subscriber phone. To free resources of the ring-back tone generator system after connecting the caller phone to the subscriber phone, the ring-back tone generator system optionally instructs the MSC to bridge the first and second link in lieu of having to provide the bridge at the ring-back tone generator system. Freed resources of the ring-back tone generator system then can be used to handle new calls.

Another example configuration includes a service control system (external to the MSC) that provides call-processing instructions based on trigger conditions. This configuration alleviates the MSC from handling call processing as in conventional custom ring-back tone service applications.

Both of the above example configurations enable a network operator to deploy a custom ring-back tone service without having to purchase expensive customized software or feature upgrade packages for an MSC. Instead, an operator can simply reconfigure an existing network to include a new ringback tone generator system or service control system as discussed above and as will be discussed in more detail below.

Accordingly, one technique herein is directed to ring-back tone service based on a service node approach. For example, a ring-back tone generator system receives an inbound call connection request forwarded from a phone switch (such as an MSC) that itself receives the inbound call connection request from a caller phone attempting to connect to a target phone (e.g., a subscriber). The ring-back tone generator system initiates generation of a first call connection on which to provide the customized ring-back tone (and/or custom video image data) to the caller phone. The ring-back tone generator system transmits, based on receiving the inbound call connection request, an outbound call connection request to the phone switch (such as to the MSC) to establish a second call connection through the phone switch to the target phone. Consequently, an MSC in a conventional ring-back tone generator system that normally handles such call processing redirects a call connection request from the caller phone and relies on the ring-back tone generator system to handle call processing and provide a custom ring-back tone service.

In further configurations, the ring-back tone generator system provides a flag associated with the outbound call connection request from the ring-back tone generator to differentiate the outbound call connection request from the inbound call connection request. Thus, a phone switch system that utilizes a map or table to identify which received call connection requests to redirect to the ring-back tone generator system will not redirect the received outbound call connection request back to the ring-back tone generator system in an endless loop when the inbound call and the outbound call pertain to the same target phone.

In one configuration, the ring-back tone generator system maintains the first call connection to include a first trunk of the ring-back tone generator system and the second call connection to include a second trunk of the ring-back tone generator system. The ring-back tone generator system, therefore, has the ability to receive calls and place calls on different trunks via respective call connection legs.

The ring-back tone generator system communicates with the phone switch (from which the ring-back tone generator system receives the inbound call request message) to establish the second call connection through the phone switch. Consequently, in one configuration, both the first call connection and the second call connection terminate at the ring-back tone generator system and pass through a common phone switch system.

At least initially, the ring-back tone generator system utilizes the second call connection or related communication path through the phone switch to at least attempt to alert the target phone of an incoming call from the caller phone. For example, while maintaining the first call connection with the caller phone to eventually provide a custom ring-back tone, the ring-back tone generator system initiates the second call connection through the phone switch to alert the target phone (e.g., the subscriber) of the call connection request by the caller phone.

Depending on the configuration, the ring-back tone generator system monitors either or both in-band audio signals (e.g., audio signals transmitted on a call connection) and out-of-band signaling messages (e.g., messages associated with a call connection but not transmitted over the call connection) to determine how to handle further call processing. For example, in one configuration, the ring-back tone generator system monitors out-of-band signaling messages associated with the second call connection to i) identify whether the target phone is being alerted of an attempt by the caller phone to connect to the target phone and ii) detect termination of a mode of alerting the target phone of an attempt by the caller phone to connect to the target phone. In another configuration, the ring-back tone generator system monitors in-band audio signals on the second call connection between the ring-back tone generator system and the target phone to i) identify whether the target phone is being alerted of an attempt by the caller phone to connect to the target phone and ii) detect termination of a mode of alerting the target phone of an attempt by the caller phone to connect to the target phone. The ring-back tone generator system can monitor the in-band and out-of-band to detect other conditions as well such as when an attempted call terminates in voice-mail.

Based on the above-mentioned monitoring, when the ring-back tone generator system receives an indication from the phone switch that the target phone is being alerted (e.g., initiation of ringing the target phone) of an attempt by the caller phone to connect to the target phone, the ring-back tone generator system provides (e.g., transmits) one of multiple custom ring-back tones over the first call connection to the caller phone in lieu of a standard ring-back tone. The ring-back tone generator system determines which ring-back tone to play back on the first call connection to the caller phone depending on an identifier (e.g., phone number) associated with the caller phone and potentially an identifier (e.g., phone number of the subscriber phone) of the target phone being called.

As mentioned, in one configuration, the ring-back tone generator system simultaneously monitors out-of-band signaling messages associated with the second call connection and in-band audio signals on the second call connection to identify whether the target phone is being alerted of an attempt by the caller phone to connect to the target phone. This approach can provide better call processing results because the ring-back tone generator system can more quickly and definitively detect that the target phone is being alerted and provide a custom ring-back tone from the ring-back tone generator system over the first call connection to the caller phone.

In certain circumstances, the ring-back tone generator system receives an indication from the phone switch that the target phone cannot be alerted of an attempt by the caller phone to connect to the target phone because a subscriber shut off his phone or the subscriber is currently using his phone and does not have call waiting. In response to such circumstances, the ring-back tone generator system immediately bridges the two call connections together in lieu of providing a custom ring-back tone to the caller phone. Consequently, the caller associated with the caller receives a standard network provided tone (e.g., busy signal) or network announcement that identifies the reason for the failed call attempt in lieu of a custom ring-back tone. Otherwise providing the custom ring-back tone in this case may erroneously imply to the user that the call was being placed to the target phone but the subscriber just wasn't answering his phone. Thus, the ring-back tone generator system allows the caller phone to receive the standard network tone or announcement instead of a custom ring-back tone. In the alternative, according to one configuration, the ring-back tone generator system plays back a custom busy signal to the caller phone depending on the caller.

In one configuration, while providing a custom ring-back tone to the caller phone over the first call connection, the ring-back tone generator system monitors the first call connection for audio signals or DTMF signals generated by a user of the caller phone. In response to detecting a presence of a particular audio signal based on an applied voice recognition algorithm or DTMF, the ring-back tone generator system initiates a corresponding phone function associated with the particular audio signal. Thus, a user of the caller phone, while receiving the custom ring-back tone from the ring-back tone generator system, can speak the words "call Jim" to automatically initiate another call connection leg to Jim. For example, in this case, the ring-back tone generator system initiates call processing to include Jim in a three way call via a third call connection from the ring-back tone generator system to Jim's phone. Thus, a three-way call can include Jim (via Jim's phone), the caller (via the caller phone), and the subscriber (via the target phone). In one configuration, the ring-back tone generator system provides a voice menu of possible voice activation options to the caller phone during a ring-back tone. In another example, a user while receiving commercial ring-back tone from the ring-back tone generator system can press '1' to accept prompt for further information over SMS. And the ring-back tone generator system intimates appropriate backend for processing above acceptance of prompt.

While providing a custom ring-back tone, the ring-back tone generator system monitors for a trigger condition (e.g., a presence of an in-band audio signal on the second call connection or out-of-band messaging signals) indicating that the target phone is no longer being alerted of an attempt by the caller phone to connect to the target phone. In response to detecting the trigger condition, the ring-back tone generator system provides a bridge at the ring-back tone generator system between the first call connection and the second call connection to connect the caller phone to the target phone. Consequently, the ring-back tone generator system enables a user of the caller phone to speak with a subscriber of the target phone without further playing the custom ring-back tone to the caller phone.

In one configuration, a subscriber can select whether to have the ring-back tone generator system play a custom audio clip (potentially different or the same as the custom ring-back tone) during a phone conversation. Thus, the ring-back tone generator system is not limited to generating custom audio during an "alert" portion of a phone call. If the subscriber selects an audio clip to play in the background during a phone conversation, the ring-back tone generator system continues to or starts to provide an appropriate customized audio (e.g., music) over the first call connection and the second call connection during an active session including communications when a user of the caller phone is able to speak with a user of the target phone.

It is possible that a subscriber has initiated call forwarding for phone calls to his target phone. The ring-back tone generator system monitors for a trigger condition indicating a forwarding of the second call connection to an alternative destination instead of the target phone. In response to detecting the trigger condition, the ring-back tone generator system provides a bridge at the ring-back tone generator system between the caller phone and the alternative destination (e.g., another phone device, voice mail, etc.). In one configuration, the ring-back tone generator system utilizes an identifier (e.g., phone number) associated with the alternative destination to determine whether provide a different custom ring-back tone to the caller phone based on being forwarded to the alternative destination. If so, the ring-back tone generator system provides a custom ring-back tone associated with the alternative destination (and caller phone) over the first call connection to the caller phone.

As previously discussed, the ring-back tone generator system optionally provides a bridge between the first call connection and the call second connection to couple the caller phone to the subscriber phone. In one configuration, the ring-back tone generator system passes off a duty of bridging the first call connection and the second call connection to a phone switch in the path of the first call connection and second call connection to free up resources (e.g., phone trunks) of the ring-back tone generator system. For example, in such an configuration, the ring-back tone generator system transmits a message from the ring-back tone generator system to the phone switch to initiate establishing a bridge at the phone switch to connect the caller phone and the target phone in lieu of the bridge in the ring-back tone generator system. As discussed, the first call connection and second call connection pass through the phone switch that initially redirected the call connection request to the ring-back tone generator system.

The phone switch may or may not be able to handle this call processing request of providing a bridge. If not, the ring-back tone generator system receives notification from the phone switch of an inability of the phone switch to provide the bridge between the caller phone and the target phone in lieu of coupling the caller phone to the target phone at the ring-back tone generator system. In such a case, the ring-back tone generator system can continue to bridge the first call connection and the second call connection so that the caller phone can communicate with the target phone. That is, in response to receiving the notification, the ring-back tone generator system provides a new bridge or continues to provide an existing bridge in the ring-back tone generator system between the first call connection and the second call connection to connect the caller phone to the target phone.

Another configuration includes technique of supporting custom ring-back tones from the perspective of a phone switch system. For example, a phone switch system such as an MSC receives a call connection request originating from a caller phone to establish a call connection between the caller phone and a target phone. The phone switch identifies that the target phone is associated with a subscriber of a custom ring-back tone service and thereafter redirects the call connection request originating from the caller phone to a ring-back tone generator system that provides a customized ring-back tone service. After redirecting the call connection request, the phone switch receives a call connection request from the ring-back tone generator system to establish a call connection between the ring-back tone generator system and the target phone.

In one configuration, the phone switch utilizes an unconditional call forwarding to redirect the call connection request. For example, the phone switch system generates an unconditional call forwarding message based on a first number identifier associated with the target phone to forward the call connection request to the ring-back tone generator system instead of directly placing an outgoing call to the target phone itself. In one configuration, the call connection request received from the ring-back tone generator system includes a second number identifier associated with the target phone. The phone switch system identifies (based on use of the second number) that the call connection request should not be redirected to the ring-back tone generator system and utilizes the second number to place a call to the target phone. As discussed above, use of two different numbers for the same target phone enables the phone switch system and the ring-back tone generator system to avoid an endless loop of transmitting the call connection request between the phone switch and the ring-back tone generator system.

In another configuration, the phone switch system receives a flag associated with the call connection request from the ring-back tone generator to differentiate how to handle call processing. The flag provides an indication to the phone switch system to perform standard call routing in lieu of redirecting the call connection request from the ring-back tone generator system back to the ring-back tone generator system. Thus, a call connection request can be based on the same identifier (e.g., phone number of the target phone) without causing the call connection request from being passed in an endless loop between the phone switch system and the ring-back tone generator system.

The phone switch system maintains at least part of a first communication path between the caller phone and the ring-back tone generator system to convey the customized ring-back tone service from the ring-back tone generator system to the caller phone. Additionally, the phone switch system maintains at least part of a second communication path from the ring-back tone generator system to the target phone. The ring-back tone generator system utilizes the second communication path through the phone switch system to alert the target phone of an attempt by the caller phone to connect to the target phone.

In response to receiving the call connection request from the ring-back tone generator system, the phone switch system transmits or forwards an alert to the target phone of an attempt by the ring-back tone generator system to establish the call connection between the ring-back tone generator system and the target phone. In the event that the phone switch system detects that target phone is unable to receive a call alert initiated by the ring-back tone generator system, the phone switch system provides notification to the ring-back tone generator system that the target phone is unable to receive the call. In one configuration, this notification prompts the ring-back tone generator system to bridge the two call connections together within the ring-back tone generator system, allowing the caller to hear the standard network tone or announcement identifying the reason for the call failure (instead of a custom ring-back tone).

As previously discussed for one configuration, the ring-back tone generator system eventually attempts to hand off bridging of the first call connection and second call connection terminating at the ring-back tone generator system and passing through the phone switch system. In such a case, the phone switch system receives a message from the ring-back tone generator system to provide a bridge between the caller phone and the target phone in lieu of coupling the caller phone to the target phone at the ring-back tone generator system.

The phone switch system may or may not be able to provide the bridge enabling the ring-back tone generator system to free up some of its resources. If not, the phone switch system notifies the ring-back tone generator system of an inability to provide the bridge between the caller phone and the target phone in lieu of coupling the caller phone to the target phone at the ring-back tone generator system. If so, the phone switch system notifies the ring-back tone generator system that the phone switch system can accommodate the handoff request and provide a bridge to connect the caller phone and target phone.

In yet other embodiments, a ring-back tone generator system provides a customized ring-back tone to a calling party (attempting to reach a called party) while the ring-back tone generator system participates in alerting the called party of the call connection request. Upon acceptance of the call connection by the called party answering his phone, the ring-back tone generator system at least temporarily bridges the caller party with the called party. After at least temporarily providing the bridge, the ring-back tone generator system communicates with a remote location such as a phone switch system for purposes of offloading the bridge to a remote device that instead provides the bridge between the caller and the called party. Accordingly, a ring-back tone generator system according to embodiments herein can participate in a process of providing a customized ring-back tone to a caller, initiate alerting of a called party of the call connection, bridging a call, and a handing off a call.

As discussed, techniques herein are well suited for use in applications providing customized ring-back tone services. However, it should be noted that configurations herein are not limited to use in such applications and thus configurations herein and deviations thereof are well suited for other applications as well.

Other configurations include a computerized device (e.g., a host computer, workstation, etc.) configured to support the aforementioned method operations disclosed herein as configurations to provide or support customized ring-back tone services. In such configurations, the computerized device includes a memory system, a network/communication interface, a processor (e.g., a processing device), an optional display, and an interconnect. The interconnect supports communications among the processor, the memory system and the optional display. The network/communication interface supports communication with remote devices with respect to the computer. The memory system is encoded with an application that, when executed on the processor, produces a process that supports custom ring-back tone services.

Yet other configurations disclosed herein include software programs to perform the method configuration and operations summarized above and disclosed in detail below under the heading Detailed Description. More particularly, a computer program product (e.g., a computer-readable medium) including computer program logic encoded thereon may be executed on a computerized device to support techniques as explained herein. That is, the computer program logic, when executed on at least one processor with a computing system, causes the processor to perform the operations (e.g., the methods) indicated herein. Such arrangements are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular configuration is directed to a computer program product that includes a computer readable medium having instructions stored thereon for supporting custom ring tone services. The instructions, when carried out by a processor of a respective computer device, cause the processor to perform the steps of: i) establishing a first call leg to provide a customized ring-back tone to a caller party attempting to establish a call connection with a called party; ii) establishing a second call leg to notify the called party of the attempted call connection; iii) detecting acceptance of the call connection by the called party; and iv) providing notification to terminate the first call leg and the second call leg and bridge the caller party to the called party at a remote communication device.

It should be understood that the system disclosed herein may be embodied strictly as a software program, as software and hardware, or as hardware alone. The features disclosed herein may be employed in data communications devices and other computerized devices and software systems for such devices such as those manufactured by NMS Communications Corporation of Framingham, Mass.

Techniques herein are well suited for use in applications such as those supporting customized ring-back tones. However, it should be noted that configurations herein are not limited to such use and thus configurations herein and deviations thereof are well suited for use in other environments as well.

It should be noted that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features, and advantages of the presented techniques herein will be apparent from the following more particular description of preferred configurations, as illustrated in the accompanying drawings in which like reference characters refer to the same parts throughout the different views. The drawings are not necessarily to scale, with emphasis instead being placed upon illustrating embodiments, techniques, and concepts herein.

DETAILED DESCRIPTION

Figure 1:
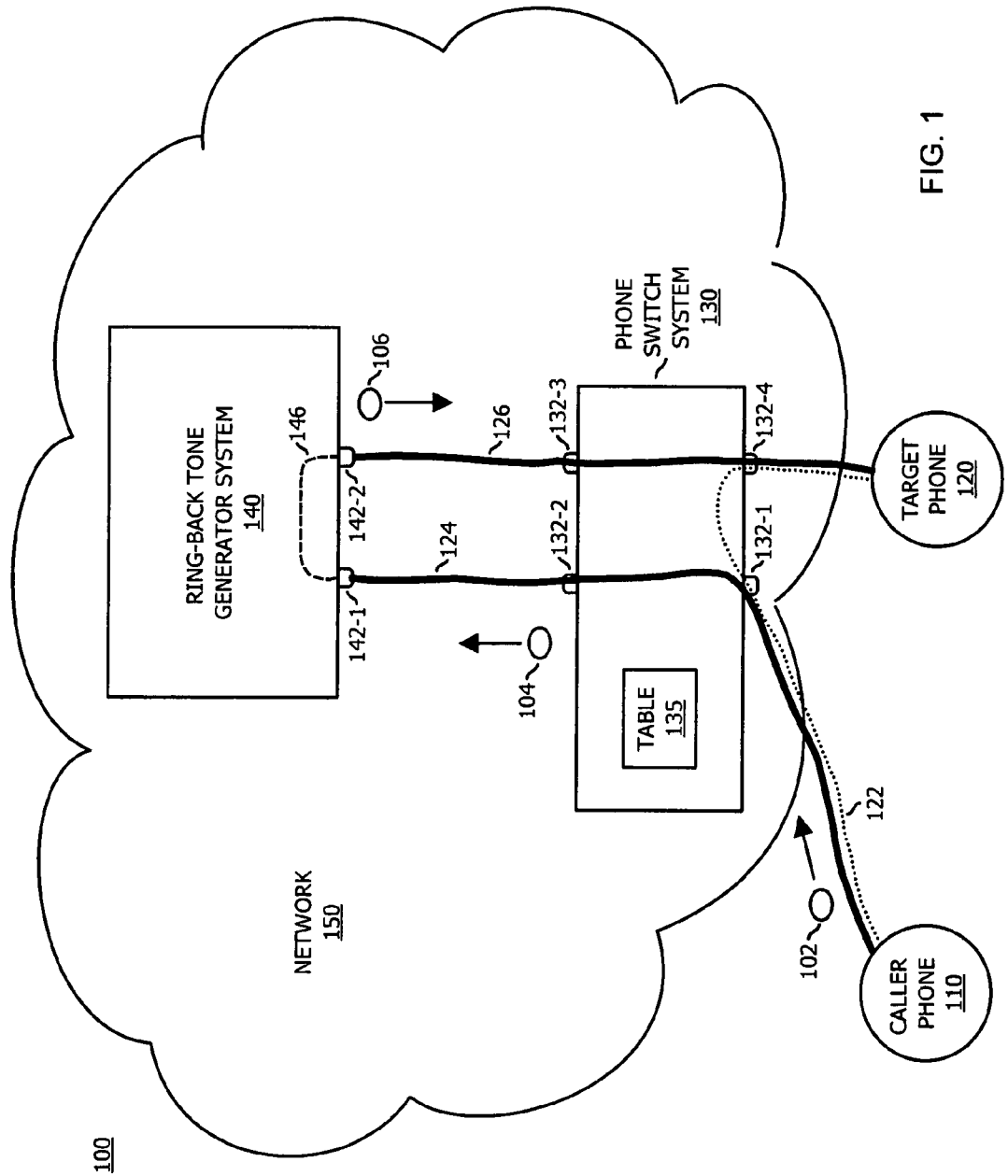
FIG. 1 is a block diagram of an example communications system suitable for use in explaining custom ring-back tone generation.

The description below describes several different examples of supporting custom ring-back tone services that may have one or more of the following advantages. For example, a network operator can deploy such a service using existing network equipment (e.g., switches/MSCs and HLRs), even if that equipment is designed to play back the standard network ring-back tone to the caller—not a subscriber-customized audio clip. Some examples advantageously do not require the network operator to purchase expensive (and possibly service-disrupting) custom software enhancements and/or software feature package upgrades from an equipment vendor, even if an operator employs equipment from multiple vendors in their network. In such examples, the network operator does not have to acquire software supporting a custom ring-back tone service from the equipment vendor, who might not have such software available.

In one example, there is an MSC that redirects handing of a call connection request to a remotely located ring-back tone generator system. During operation, the ring-back tone generator system maintains a first link through the MSC to feed back a custom ring-back tone to a caller phone calling a target phone. The ring-back tone generator system also maintains a second link through the MSC to alert (e.g., cause the subscriber's phone to ring) a subscriber phone of an incoming call request. Upon detection of a subscriber answering his phone, the ring-back tone generator system i) discontinues providing the ring-back tone to the caller phone and ii) bridges the first link and second link so that the caller phone can communicate with the subscriber phone. To free resources of the ring-back tone generator system after connecting the caller phone to the subscriber phone, the ring-back tone generator system optionally instructs the MSC to bridge the first and second link in lieu of having to provide the bridge at the ring-back tone generator system. Freed resources of the ring-back tone generator system then can be used to handle new calls.

Another example configuration includes a service control system (external to the MSC) that provides call-processing instructions based on trigger conditions. This configuration alleviates the MSC from handling call processing as in conventional custom ring-back tone service applications.

Both of the above example configurations enable a network operator to deploy a custom ring-back tone service without having to purchase expensive customized software or feature upgrade packages for an MSC. Instead, an operator can simply reconfigure an existing network to include a new ring-back tone generator system or service control system as discussed above and as will be discussed in more detail below.

Accordingly, one technique herein is directed to ring-back tone service based on a service node approach. For example, a ring-back tone generator system receives an inbound call connection request forwarded from a phone switch (such as an MSC) that itself receives the inbound call connection request from a caller phone attempting to connect to a target phone (e.g., a subscriber). The ring-back tone generator system initiates generation of a first call connection on which to provide the customized ring-back tone (and/or custom video image data) to the caller phone. The ring-back tone generator system transmits, based on receiving the inbound call connection request, an outbound call connection request to the phone switch (such as to the MSC) to establish a second call connection through the phone switch to the target phone. Consequently, an MSC in a conventional ring-back tone generator system that normally handles such call processing redirects a call connection request from the caller phone and relies on the ring-back tone generator system to handle call processing and provide a custom ring-back tone service.

In further configurations, the ring-back tone generator system provides a flag associated with the outbound call connection request from the ring-back tone generator to differentiate the outbound call connection request from the inbound call connection request. Thus, a phone switch system that utilizes a map or table to identify which received call connection requests to redirect to the ring-back tone generator system will not redirect the received outbound call connection request back to the ring-back tone generator system in an endless loop when the inbound call and the outbound call pertain to the same target phone.

In one configuration, the ring-back tone generator system maintains the first call connection to include a first trunk of the ring-back tone generator system and the second call connection to include a second trunk of the ring-back tone generator system. The ring-back tone generator system, therefore, has the ability to receive calls and place calls on different trunks via respective call connection legs.

The ring-back tone generator system communicates with the phone switch (from which the ring-back tone generator system receives the inbound call request message) to establish the second call connection through the phone switch. Consequently, in one configuration, both the first call connection and the second call connection terminate at the ring-back tone generator system and pass through a common phone switch system.

At least initially, the ring-back tone generator system utilizes the second call connection or related communication path through the phone switch to at least attempt to alert the target phone of an incoming call from the caller phone. For example, while maintaining the first call connection with the caller phone to eventually provide a custom ring-back tone, the ring-back tone generator system initiates the second call connection through the phone switch to alert the target phone (e.g., the subscriber) of the call connection request by the caller phone.

Depending on the configuration, the ring-back tone generator system monitors either or both in-band audio signals (e.g., audio signals transmitted on a call connection) and out-of-band signaling messages (e.g., messages associated with a call connection but not transmitted over the call connection) to determine how to handle further call processing. For example, in one configuration, the ring-back tone generator system monitors out-of-band signaling messages associated with the second call connection to i) identify whether the target phone is being alerted of an attempt by the caller phone to connect to the target phone and ii) detect termination of a mode of alerting the target phone of an attempt by the caller phone to connect to the target phone. In another configuration, the ring-back tone generator system monitors in-band audio signals on the second call connection between the ring-back tone generator system and the target phone to i) identify whether the target phone is being alerted of an attempt by the caller phone to connect to the target phone and ii) detect termination of a mode of alerting the target phone of an attempt by the caller phone to connect to the target phone. The ring-back tone generator system can monitor the in-band and out-of-band to detect other conditions as well such as when an attempted call terminates in voice-mail.

Based on the above-mentioned monitoring, when the ring-back tone generator system receives an indication from the phone switch that the target phone is being alerted (e.g., initiation of ringing the target phone) of an attempt by the caller phone to connect to the target phone, the ring-back tone generator system provides (e.g., transmits) one of multiple custom ring-back tones over the first call connection to the caller phone in lieu of a standard ring-back tone. The ring-back tone generator system determines which ring-back tone to play back on the first call connection to the caller phone depending on an identifier (e.g., phone number) associated with the caller phone and potentially an identifier (e.g., phone number of the subscriber phone) of the target phone being called.

As mentioned, in one configuration, the ring-back tone generator system simultaneously monitors out-of-band signaling messages associated with the second call connection and in-band audio signals on the second call connection to identify whether the target phone is being alerted of an attempt by the caller phone to connect to the target phone. This approach can provide better call processing results because the ring-back tone generator system can more quickly and definitively detect that the target phone is being alerted and provide a custom ring-back tone from the ring-back tone generator system over the first call connection to the caller phone.

In certain circumstances, the ring-back tone generator system receives an indication from the phone switch that the target phone cannot be alerted of an attempt by the caller phone to connect to the target phone because a subscriber shut off his phone or the subscriber is currently using his phone and does not have call waiting. In response to such circumstances, the ring-back tone generator system immediately bridges the two call connections together in lieu of providing a custom ring-back tone to the caller phone. Consequently, the caller associated with the caller receives a standard network provided tone (e.g., busy signal) or network announcement that identifies the reason for the failed call attempt in lieu of a custom ring-back tone. Otherwise providing the custom ring-back tone in this case may erroneously imply to the user that the call was being placed to the target phone but the subscriber just wasn't answering his phone. Thus, the ring-back tone generator system allows the caller phone to receive the standard network tone or announcement instead of a custom ring-back tone. In the alternative, according to one configuration, the ring-back tone generator system plays back a custom busy signal to the caller phone depending on the caller.

In one configuration, while providing a custom ring-back tone to the caller phone over the first call connection, the ring-back tone generator system monitors the first call connection for audio signals generated by a user of the caller phone. In response to detecting a presence of a particular audio signal based on an applied voice recognition algorithm, the ring-back tone generator system initiates a corresponding phone function associated with the particular audio signal. Thus, a user of the caller phone, while receiving the custom ring-back tone from the ring-back tone generator system, can speak the words "call Jim" to automatically initiate another call connection leg to Jim. For example, in this case, the ring-back tone generator system initiates call processing to include Jim in a three way call via a third call connection from the ring-back tone generator system to Jim's phone. Thus, a three-way call can include Jim (via Jim's phone), the caller (via the caller phone), and the subscriber (via the target phone). In one configuration, the ring-back tone generator system provides a voice menu of possible voice activation options to the caller phone during a ring-back tone.

While providing a custom ring-back tone, the ring-back tone generator system monitors for a trigger condition (e.g., a presence of an in-band audio signal on the second call connection or out-of-band messaging signals) indicating that the target phone is no longer being alerted of an attempt by the caller phone to connect to the target phone. In response to detecting the trigger condition, the ring-back tone generator system provides a bridge at the ring-back tone generator system between the first call connection and the second call connection to connect the caller phone to the target phone. Consequently, the ring-back tone generator system enables a user of the caller phone to speak with a subscriber of the target phone without further playing the custom ring-back tone to the caller phone.

In one configuration, a subscriber can select whether to have the ring-back tone generator system play a custom audio clip (potentially different or the same as the custom ring-back tone) during a phone conversation. Thus, the ring-back tone generator system is not limited to generating custom audio during an "alert" portion of a phone call. If the subscriber selects an audio clip to play in the background during a phone conversation, the ring-back tone generator system continues to or starts to provide an appropriate customized audio (e.g., music) over the first call connection and the second call connection during an active session including communications when a user of the caller phone is able to speak with a user of the target phone.

It is possible that a subscriber has initiated call forwarding for phone calls to his target phone. The ring-back tone generator system monitors for a trigger condition indicating a forwarding of the second call connection to an alternative destination instead of the target phone. In response to detecting the trigger condition, the ring-back tone generator system provides a bridge at the ring-back tone generator system between the caller phone and the alternative destination (e.g., another phone device, voice mail, etc.). In one configuration, the ring-back tone generator system utilizes an identifier (e.g., phone number) associated with the alternative destination to determine whether provide a different custom ring-back tone to the caller phone based on being forwarded to the alternative destination. If so, the ring-back tone generator system provides a custom ring-back tone associated with the alternative destination (and caller phone) over the first call connection to the caller phone.

As previously discussed, the ring-back tone generator system optionally provides a bridge between the first call connection and the call second connection to couple the caller phone to the subscriber phone. In one configuration, the ring-back tone generator system passes off a duty of bridging the first call connection and the second call connection to a phone switch in the path of the first call connection and second call connection to free up resources (e.g., phone trunks) of the ring-back tone generator system. For example, in such an configuration, the ring-back tone generator system transmits a message from the ring-back tone generator system to the phone switch to initiate establishing a bridge at the phone switch to connect the caller phone and the target phone in lieu of the bridge in the ring-back tone generator system. As discussed, the first call connection and second call connection pass through the phone switch that initially redirected the call connection request to the ring-back tone generator system.

The phone switch may or may not be able to handle this call processing request of providing a bridge. If not, the ring-back tone generator system receives notification from the phone switch of an inability of the phone switch to provide the bridge between the caller phone and the target phone in lieu of coupling the caller phone to the target phone at the ring-back tone generator system. In such a case, the ring-back tone generator system can continue to bridge the first call connection and the second call connection so that the caller phone can communicate with the target phone. That is, in response to receiving the notification, the ring-back tone generator system provides a new bridge or continues to provide an existing bridge in the ring-back tone generator system between the first call connection and the second call connection to connect the caller phone to the target phone.

Another configuration includes technique of supporting custom ring-back tones from the perspective of a phone switch system. For example, a phone switch system such as an MSC receives a call connection request originating from a caller phone to establish a call connection between the caller phone and a target phone. The phone switch identifies that the target phone is associated with a subscriber of a custom ring-back tone service and thereafter redirects the call connection request originating from the caller phone to a ring-back tone generator system that provides a customized ring-back tone service. After redirecting the call connection request, the phone switch receives a call connection request from the ring-back tone generator system to establish a call connection between the ring-back tone generator system and the target phone.

In one configuration, the phone switch utilizes an unconditional call forwarding to redirect the call connection request. For example, the phone switch system generates an unconditional call forwarding message based on a first number identifier associated with the target phone to forward the call connection request to the ring-back tone generator system instead of directly placing an outgoing call to the target phone itself. In one configuration, the call connection request received from the ring-back tone generator system includes a second number identifier associated with the target phone. The phone switch system identifies (based on use of the second number) that the call connection request should not be redirected to the ring-back tone generator system and utilizes the second number to place a call to the target phone. As discussed above, use of two different numbers for the same target phone enables the phone switch system and the ring-back tone generator system to avoid an endless loop of transmitting the call connection request between the phone switch and the ring-back tone generator system.

In another configuration, the phone switch system receives a flag associated with the call connection request from the ring-back tone generator to differentiate how to handle call processing. The flag provides an indication to the phone switch system to perform standard call routing in lieu of redirecting the call connection request from the ring-back tone generator system back to the ring-back tone generator system. Thus, a call connection request can be based on the same identifier (e.g., phone number of the target phone) without causing the call connection request from being passed in an endless loop between the phone switch system and the ring-back tone generator system.

As previously discussed for one configuration, the ring-back tone generator system eventually attempts to hand off bridging of the first call connection and second call connection terminating at the ring-back tone generator system and passing through the phone switch system. In such a case, the phone switch system receives a message from the ring-back tone generator system to provide a bridge between the caller phone and the target phone in lieu of coupling the caller phone to the target phone at the ring-back tone generator system.

The phone switch system may or may not be able to provide the bridge enabling the ring-back tone generator system to free up some of its resources. If not, the phone switch system notifies the ring-back tone generator system of an inability to provide the bridge between the caller phone and the target phone in lieu of coupling the caller phone to the target phone at the ring-back tone generator system. If so, the phone switch system notifies the ring-back tone generator system that the phone switch system can accommodate the handoff request and provide a bridge to connect the caller phone and target phone.

In contrast to conventional approaches discussed above, techniques herein are directed toward novel ways of supporting custom ring-back tone services. For example, one configuration herein involves use of an MSC (Mobile Switching Center) that redirects handing of a call connection request to a remotely located and independently operating ring-back tone generator system. During operation, the ring-back tone generator system maintains a first link through the MSC to feed back a custom ring-back tone to a caller phone calling a target phone. The ring-back tone generator system also maintains a second link through the MSC to alert (e.g., cause the subscriber's phone to ring) a subscriber phone of an incoming call request. Upon detection of a subscriber answering his phone, the ring-back tone generator system i) discontinues providing the feedback to the caller phone and ii) bridges the first link and second link so that the caller phone can communicate with the subscriber phone. To free resources of the ring-back tone generator system after connecting the caller phone to the subscriber phone, the ring-back tone generator system optionally instructs the MSC to bridge the first and second link in lieu of having to provide the bridge at the ring-back tone generator system. Freed resources of the ring-back tone generator system therefore can be used to handle new calls.

Another technique herein includes a service control system (external to the MSC) that provides call-processing instructions based on trigger conditions. This configuration alleviates the MSC from handling call processing as in conventional custom ring-back tone service applications.

Both of the above configurations enable a network operator to deploy a custom ring-back tone service without having to purchase expensive customized software or feature upgrade packages for an MSC. Instead, an operator can simply reconfigure an existing network to include a new ring-back tone generator system or service control system as discussed above and as will be discussed in more detail below.

More particularly, FIG. 1 illustrates a communication system 100 suitable for use in explaining an operation of example configurations herein. As shown, the communication system 100 includes a caller phone 110 and a target phone 120 in communication with network 150. Network 150 includes phone switch system 130 and ring-back tone generator system 140. Phone switch system 130 includes table 135 as well as trunk 132-1, trunk 132-2, trunk 132-3, and trunk 132-4 (collectively trunks 132). Ring-back tone generator system 140 includes trunk 142-1 and trunk 142-2 (collectively trunks 142). Call connection 124 and call connection 126 define a communication path through respective elements of network 150.

Communication system 100 supports custom ring-back tones for calls to certain subscribers of such a phone plan. For example, the custom ring-back tone service provided by communication system 100 enables a subscriber to choose a custom audio clip (e.g., a favorite song) to be played back to a caller phone during a ringing portion of a call, prior to the subscriber answering an attempted call. Thus, instead of hearing a standard ring-back tone (at the caller phone 110) indicating that a target phone 120 is being alerted of the incoming call connection request, the caller phone 110 hears the custom audio clip (e.g., a song) selected by the subscriber.

During general operation, caller phone 110 initiates a call to target phone 120 (such as a subscriber of the custom ring-back tone service) by transmitting a call connection request 102 to phone switch system 130 such as a MSC. In one configuration, call connection request 102 includes an identifier of the caller phone 110 as well as an identifier of the target phone 120. The phone switch system 130 first compares information such as the identifier of the called party in the call connection request 102 to the table 135 (e.g., a map) to identify whether the called party (e.g., target phone 120) is a subscriber of an enhanced service requiring interaction with an external peripheral such as the ring-back tone generator system. If so, the phone switch system 130 forwards (e.g., hands off) the call connection request 104 to ring-back tone generator system 140 for further call processing to the ring-back tone generator system 140. If not, the phone switch system 130 proceeds with normal call handling routines to provide a call connection 122 between the caller phone 110 and the target phone 120.

For the case when phone switch system 130 redirects the call connection request 102 to ring-back tone generator system 140, the phone switch system 130 forwards call connection request 104 to ring-back tone generator system 140 indicating the request by caller phone 110 to connect to target phone 130. In response to receiving call connection request 104, ring-back tone generator system 140 transmits a call connection request 106 to phone switch system 130 to establish call connection path 126. Establishing call connection path 126 includes assigning a trunk 142-1 of ring-back tone generator system 140 and trunk 132-3 and trunk 132-4 of phone switch system 130 to support communications between the ring-back tone generator system 140 and the target phone 130. Call connection path 124 supports communications through trunk 142-1 of ring-back tone generator system 140 and through trunk 132-2 and trunk 132-1 to caller phone 110. While alerting the target phone 120 (e.g., causing the target phone 120 to ring) of the incoming call by caller phone 110, the ring-back tone generator system 140 provides a custom ring-back tone to caller phone 110. When a subscriber of the target phone 120 answers the target phone 120, the ring-back tone generator system 140 discontinues the ring-back tone on call connection path 124 to caller phone 110 and potentially bridges call connection path 122 (e.g. a first voice communication channel) and call connection path 126 (e.g., a second voice communication channel) via bridge 146 so that a user of caller phone 110 and subscriber of target phone 120 can speak with each other.

Figure 2:
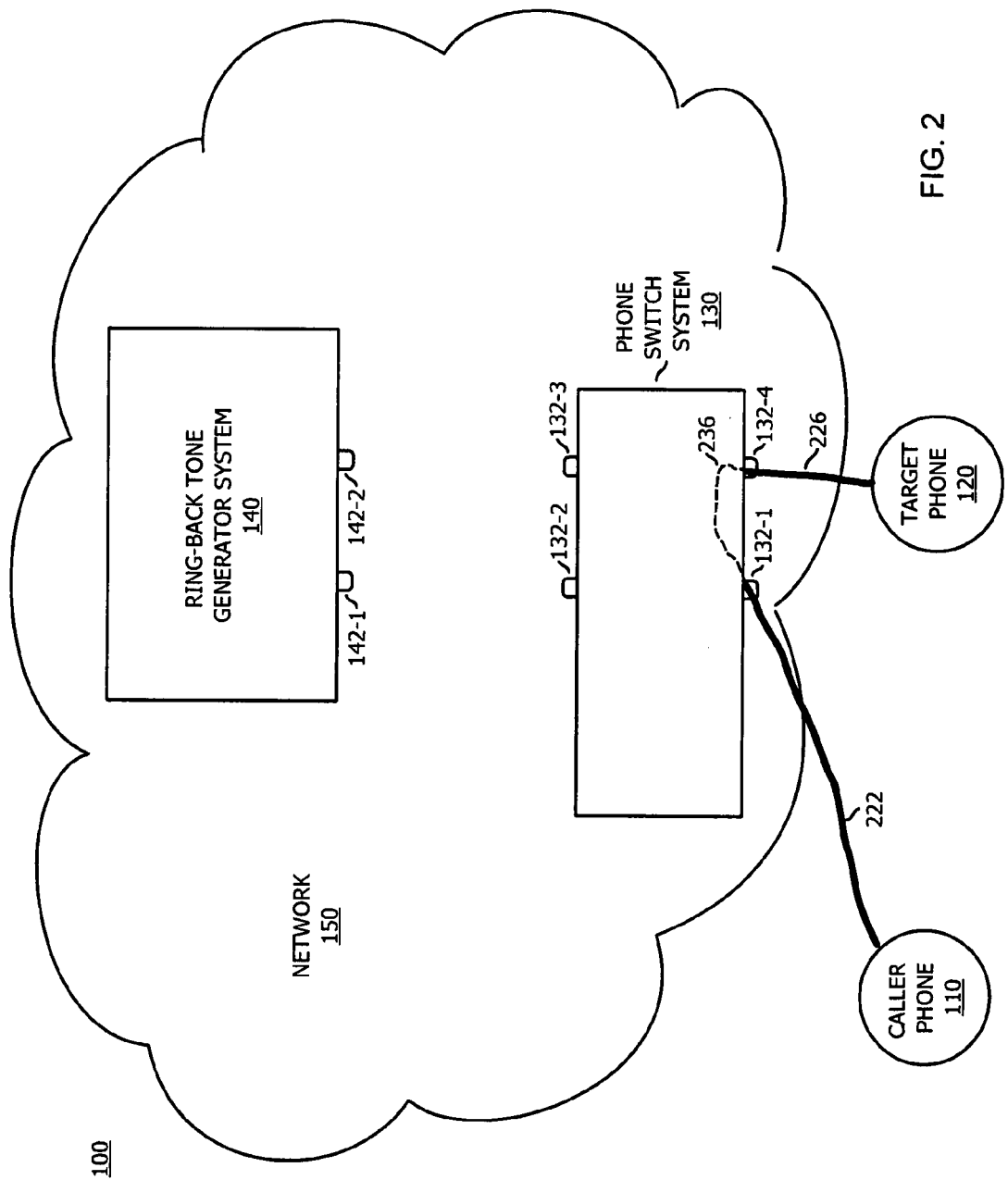
FIG. 2 is an example block diagram of the same communications system as in FIG. 1 with a connection for call bridging.

In one configuration, after providing bridge 146 to connect the caller phone 110 to the target phone 120, the ring-back tone generator system 140 transmits a message to phone switch system 130 requesting the phone switch system 130 to provide a bridge between trunk 132-1 and trunk 132-4. In response, the phone switch system 130 provides bridge 236 as shown in FIG. 2 to free trunk 142-1, trunk 142-2, trunk 132-2, and trunk 132-3. Caller phone 110 couples to target phone 120 via call connection path 222 and call connection path 226.

Functionality supported by an example configuration of ring-back tone generator system 140 will now be discussed via use of flowchart 300 in FIGS. 3-5. Note that there will be some overlap with respect to concepts discussed above for FIGS. 1 and 2.

Figure 3:
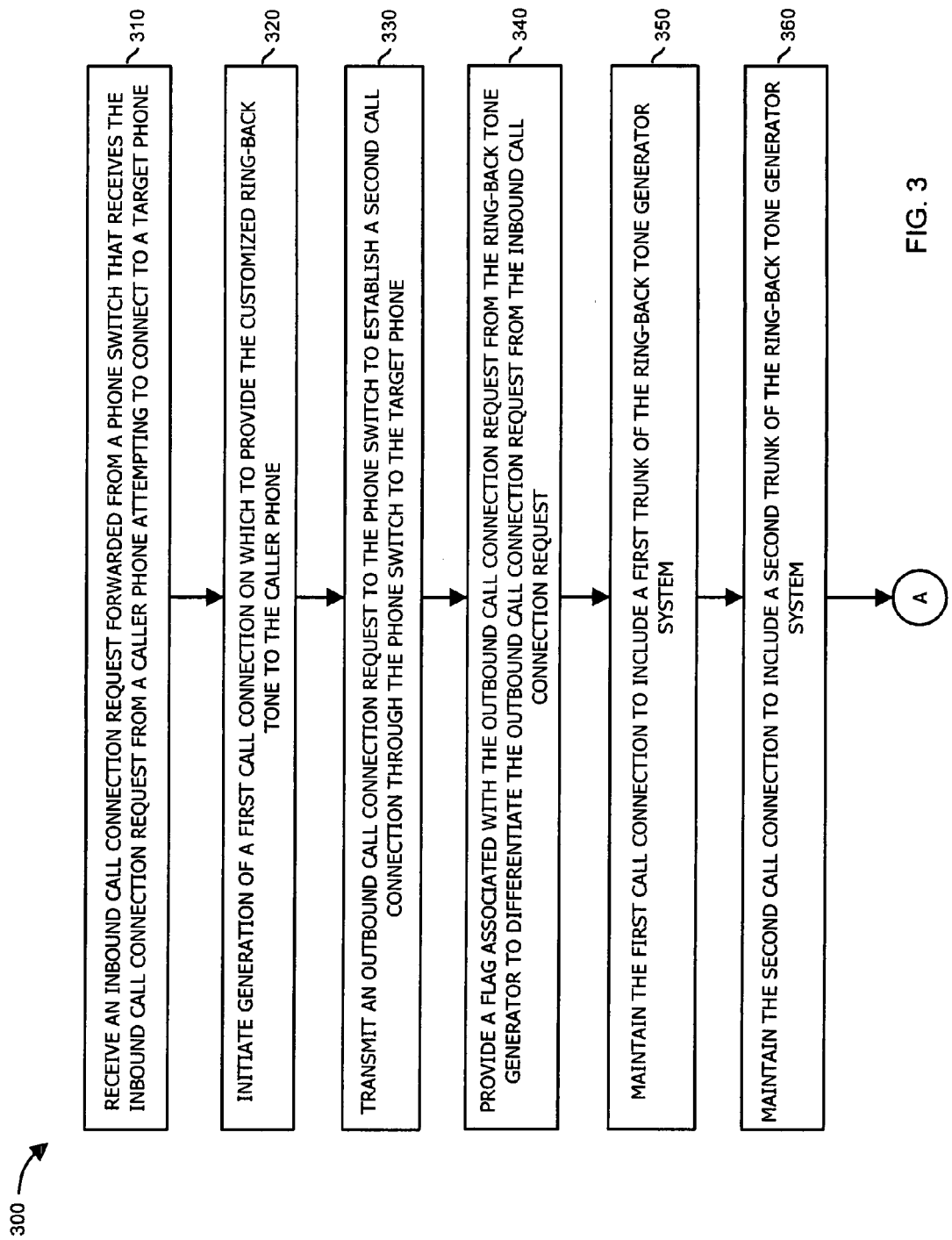
FIGS. 3-5 combine to form a flowchart illustrating example processing steps performed by a ring-back tone generator system.
Figure 4:
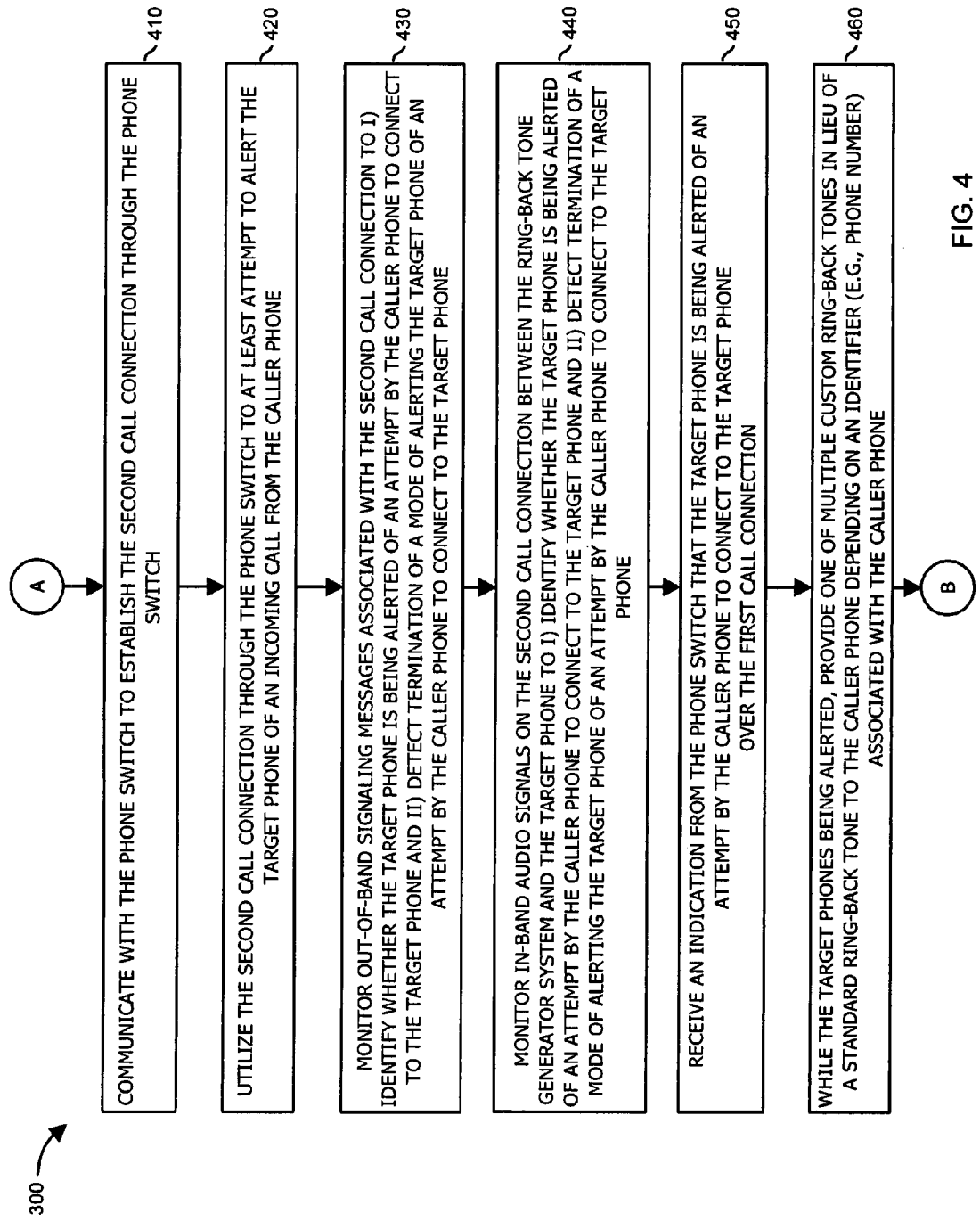
Figure 5:
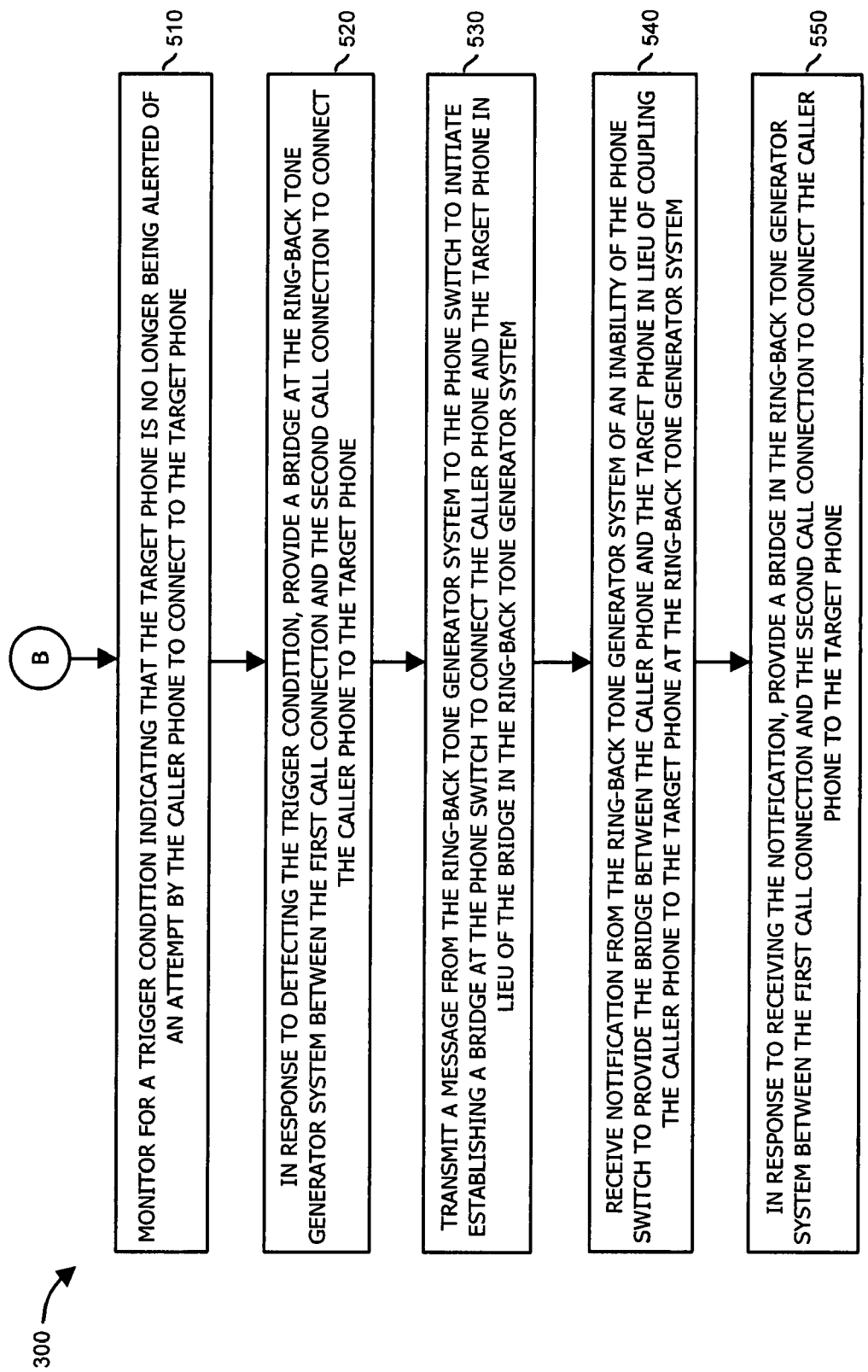

FIGS. 3-5 combine to form a flowchart 300 of processing steps performed by ring-back tone generator system 140. In general, flowchart 300 illustrates how ring-back tone generator system 140 processes a call connection request 104 to provide a custom ring-back tone to caller phone 110.

In step 310, ring-back tone generator system 140 receives an inbound call connection request 104 forwarded from a phone switch system 130 (such as an MSC) that itself receives the inbound call connection request 102 from a caller phone 110 attempting to connect to a target phone 120 (e.g., a subscriber).

In step 320, the ring-back tone generator system 140 initiates generation of a first call connection path 124 on which to provide the customized ring-back tone (and/or custom video image data) to the caller phone 110. The ring-back tone generator system 140 also transmits, based on receiving the inbound call connection request 124, an outbound call connection request 126 to the phone switch system 130 to establish a second call connection path 126 through the phone switch system 130 to the target phone 120. Consequently, an MSC in a conventional ring-back tone generator system that normally handles such call processing redirects a call connection request 102 from the caller phone 110 and relies on the ring-back tone generator system 140 to handle call processing and provide a custom ring-back tone service.

In step 340, according to one configuration, the ring-back tone generator system 140 provides a flag associated with the outbound call connection request 106 from the ring-back tone generator system 140 to differentiate the outbound call connection request 106 from the inbound call connection request 104. Thus, a phone switch system 130 that utilizes a map or table 135 to identify which received call connection requests to redirect to the ring-back tone generator system 140 will not redirect the received outbound call connection request 106 back to the ring-back tone generator system 140 in an endless loop.

In steps 350 and 360, the ring-back tone generator system 140 maintains the first call connection path 124 to include a first trunk 142-1 of the ring-back tone generator system 140 and the second call connection path 126 to include a second trunk 142-2 of the ring-back tone generator system 140. Based on use of trunks and other resources, the ring-back tone generator system 140, therefore, has the ability to receive calls and place calls on different call connection legs (i.e., different call connection paths).

Referring now to FIG. 4, in step 410, the ring-back tone generator system 140 communicates with the phone switch system 130 (from which the ring-back tone generator system 130 receives the inbound call request 104) to establish the second call connection path 126 through the phone switch system 130. Consequently, in one configuration, both the first call connection path 124 and the second call connection path 126 terminate at the ring-back tone generator system 140 and pass through phone switch system 130.

In step 420, at least initially, the ring-back tone generator system 140 utilizes the second call connection path 126 or related communication path through the phone switch system 130 to at least attempt to alert the target phone 120 of an incoming call from the caller phone 130. For example, while maintaining the first call connection path 124 with the caller phone 110 to eventually provide a custom ring-back tone, the ring-back tone generator system 140 initiates generation of the second call connection path 126 through the phone switch system 130 to alert the target phone 120 (e.g., the subscriber) of the call connection request by the caller phone 110.

Depending on the configuration, in steps 430 and/or 440, the ring-back tone generator system 140 monitors either or both in-band audio signals (e.g., audio signals transmitted on a call connection path) and out-of-band signaling messages (e.g., messages associated with a call connection path but not transmitted over the call connection path) to determine how to handle further call processing. For example, in one configuration, the ring-back tone generator system 140 monitors out-of-band signaling messages associated with the second call connection path to i) identify whether the target phone 120 is being alerted of an attempt by the caller phone 110 to connect to the target phone 120 and ii) detect termination of a mode of alerting the target phone 120 of an attempt by the caller phone 110 to connect to the target phone 120.

In another configuration, as in step 440, the ring-back tone generator system 140 monitors in-band audio signals on the second call connection path 126 between the ring-back tone generator system 140 and the target phone 120 to i) identify whether the target phone 120 is being alerted of an attempt by the caller phone 110 to connect to the target phone 120 and ii) detect termination of a mode of alerting the target phone 120 of an attempt by the caller phone 110 to connect to the target phone 120. The ring-back tone generator system 140 can further monitor the in-band and out-of-band signals to detect other conditions as well such as when an attempted call terminates in voice-mail.

In step 450, based on the above-mentioned monitoring, when the ring-back tone generator system 140 receives an indication from the phone switch system 130 that the target phone 120 is being alerted (e.g., initiation of ringing the target phone 120) of an attempt by the caller phone 110 to connect to the target phone 120, in step 460, the ring-back tone generator system 140 provides (e.g., transmits) one of multiple custom ring-back tones over the first call connection path 124 to the caller phone 110 in lieu of a standard ring-back tone. The ring-back tone generator system 140 determines which ring-back tone to play back on the first call connection path 124 to the caller phone 110 depending on an identifier (e.g., phone number) associated with the caller phone 110 and potentially an identifier (e.g., phone number of the subscriber phone) of the target phone 120 being called.

Certain configurations support passing of calling party identification information, including any calling ID presentation restrictions associated with the caller phone 110, received on the first call connection path 124 (e.g., from the phone switch system 130, caller phone 110, etc.) through to a called subscriber associated with the target phone 120 via the second call connection 126, such that the called subscriber can identify a call attempt as being from an actual calling party rather than from the ring-back tone generator system 140.

In one configuration, the ring-back tone generator system 140 simultaneously monitors out-of-band signaling messages associated with the second call connection path 126 and in-band audio signals on the second call connection path 126 to identify whether the target phone 120 is currently being alerted of an attempt by the caller phone 110 to connect to the target phone 120. This approach can provide better call processing results because the ring-back tone generator system 140 can more quickly and definitively detect that the target phone 120 is being alerted and provide a custom ring-back tone from the ring-back tone generator system 140 over the first call connection path 124 to the caller phone 110.

In certain circumstances, the ring-back tone generator system 140 receives an indication from the phone switch system 130 that the target phone 120 cannot be alerted of an attempt by the caller phone 110 to connect to the target phone 120 because a subscriber shut off his phone or the subscriber is currently using his phone and does not have call waiting. In response to such circumstances, the ring-back tone generator system 140 system immediately creates bridge 146 between the first call connection path 124 and the second call connection path 126 together in lieu of providing a custom ring-back tone to the caller phone 110. Consequently, the caller associated with the caller phone 110 receives a standard network tone (e.g., busy signal) or announcement identifying the reason for the call attempt failure in lieu of a custom ring-back tone. Otherwise providing the custom ring-back tone in this case may erroneously imply to the user of caller phone 110 that the call request was being placed to the target phone 120 but the subscriber just wasn't answering his target phone 120. Thus, ring-back tone generator system 140 can selectively provide standard network tones or announcements to the caller phone 110 instead of a custom ring-back tone.

In one configuration, while providing a custom ring-back tone to the caller phone 110 over the first call connection path 124, the ring-back tone generator system 140 monitors the first call connection path 124 for audio signals generated by a user of the caller phone 110. In response to detecting a presence of a particular audio signal based on an applied voice recognition algorithm, the ring-back tone generator system 140 initiates a corresponding phone function associated with the particular audio signal. For example, a user of the caller phone 110, while receiving the custom ring-back tone from the ring-back tone generator system 140, can say the words "call Jim" to automatically initiate another call connection leg by ring-back tone generator system 140 to a phone associated with Jim. In this case, the ring-back tone generator system 140 initiates call processing to include Jim in a three way call via a third call connection from the ring-back tone generator system 140 to Jim's phone. Thus, a three-way call can include Jim (via Jim's phone), the caller (via the caller phone), and the subscriber (via the target phone).

Referring now to FIG. 5, in step 510, while providing a custom ring-back tone, the ring-back tone generator system 140 monitors for a trigger condition (e.g., a presence of an in-band audio signal on the second call connection or out-of-band messaging signals) indicating that the target phone 120 is no longer being alerted of an attempt by the caller phone 110 to connect to the target phone 120.

In step 520, in response to detecting such a trigger condition, the ring-back tone generator system 140 provides a bridge 146 between the first call connection path 124 and the second call connection path 126 to connect the caller phone 110 to the target phone 120. Consequently, the ring-back tone generator system 140 enables a user of the caller phone 110 to speak with a subscriber of the target phone 120 without further playing the custom ring-back tone to the caller phone 110.

In one configuration, a subscriber can select whether the ring-back tone generator system 140 plays a custom audio clip (potentially different or the same as the custom ring-back tone) during a phone conversation between the caller phone 110 and the target phone 120. If the subscriber selects an audio clip to play in the background during a phone conversation, the ring-back tone generator system 140 continues to or starts to provide an appropriate customized audio (e.g., music) over the first call connection path 124 and the second call connection path 126 during an active session when a user of the caller phone 110 is able to speak with a user of the target phone 120.

It is possible that a subscriber of the target phone 120 has initiated call forwarding for any phone calls directed to his target phone 120. The ring-back tone generator system 140 monitors for a trigger condition indicating a forwarding of the second call connection path 126 to an alternative destination instead of the target phone 120. In response to detecting the trigger condition, the ring-back tone generator system 140 provides a bridge 146 at the ring-back tone generator system 140 between the caller phone 110 and the alternative destination (e.g., another phone device, voice mail, etc.). In one configuration, the ring-back tone generator system 140 utilizes an identifier (e.g., phone number) associated with the alternative destination to determine whether to provide a different custom ring-back tone to the caller phone 110 based on being forwarded to the alternative destination. If so, the ring-back tone generator system 140 provides a custom ring-back tone associated with the alternative destination (and caller phone) over the first call connection path 124 to the caller phone 110.

As previously discussed, the ring-back tone generator system 140 optionally provides a bridge 146 between the first call connection path 124 and the call second connection path 126 to couple the caller phone 110 to the target phone 120. In one configuration, the ring-back tone generator system 140 passes off a duty of bridging the first call connection path 124 and the second call connection path 126 to the phone switch system 130 in the path of the first call connection path 124 and second call connection path 126 to free up resources (e.g., phone trunks) of the ring-back tone generator system 140 for new calls. For example, in step 530, the ring-back tone generator system 140 transmits a message from the ring-back tone generator system 140 to the phone switch system 130 to initiate establishing a bridge 236 at the phone switch system 130 to connect the caller phone 110 and the target phone 120 in lieu of the bridge 146 in the ring-back tone generator system 140. As discussed, the first call connection path 124 and second call connection path 126 pass through the phone switch system 130 that initially redirected the call connection request 104 to the ring-back tone generator system 140. The phone switch system 130 may or may not be able to handle this call processing request of providing a bridge 236.

In step 540, the ring-back tone generator system 140 receives notification from the phone switch system 130 of an inability of the phone switch system 130 to provide the bridge 236 between the caller phone 110 and the target phone 120 in lieu of coupling the caller phone 110 to the target phone 120 via use of the ring-back tone generator system 140. In such a case, the ring-back tone generator system 140 can continue to bridge the first call connection path 124 and the second call connection path 126 so that the caller phone 110 can communicate with the target phone 120.

In step 550, in response to receiving the notification, the ring-back tone generator system 140 provides a bridge 146 in the ring-back tone generator system 140 between the first call connection path 124 and the second call connection path 126 to connect the caller phone 110 to the target phone 120.

Figure 6:
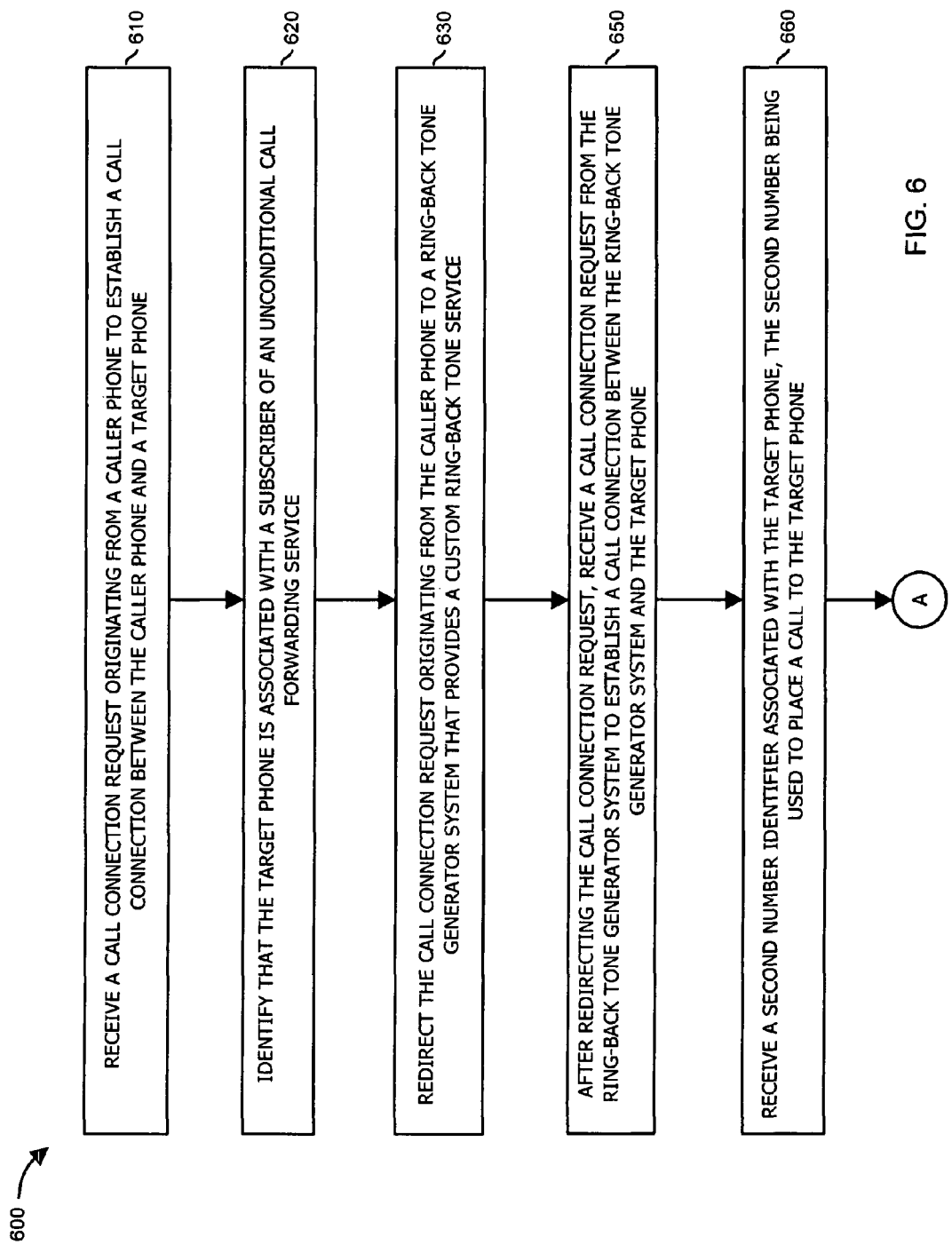
FIGS. 6-8 combine to form a flowchart illustrating example processing steps of a phone switch system.
Figure 7:
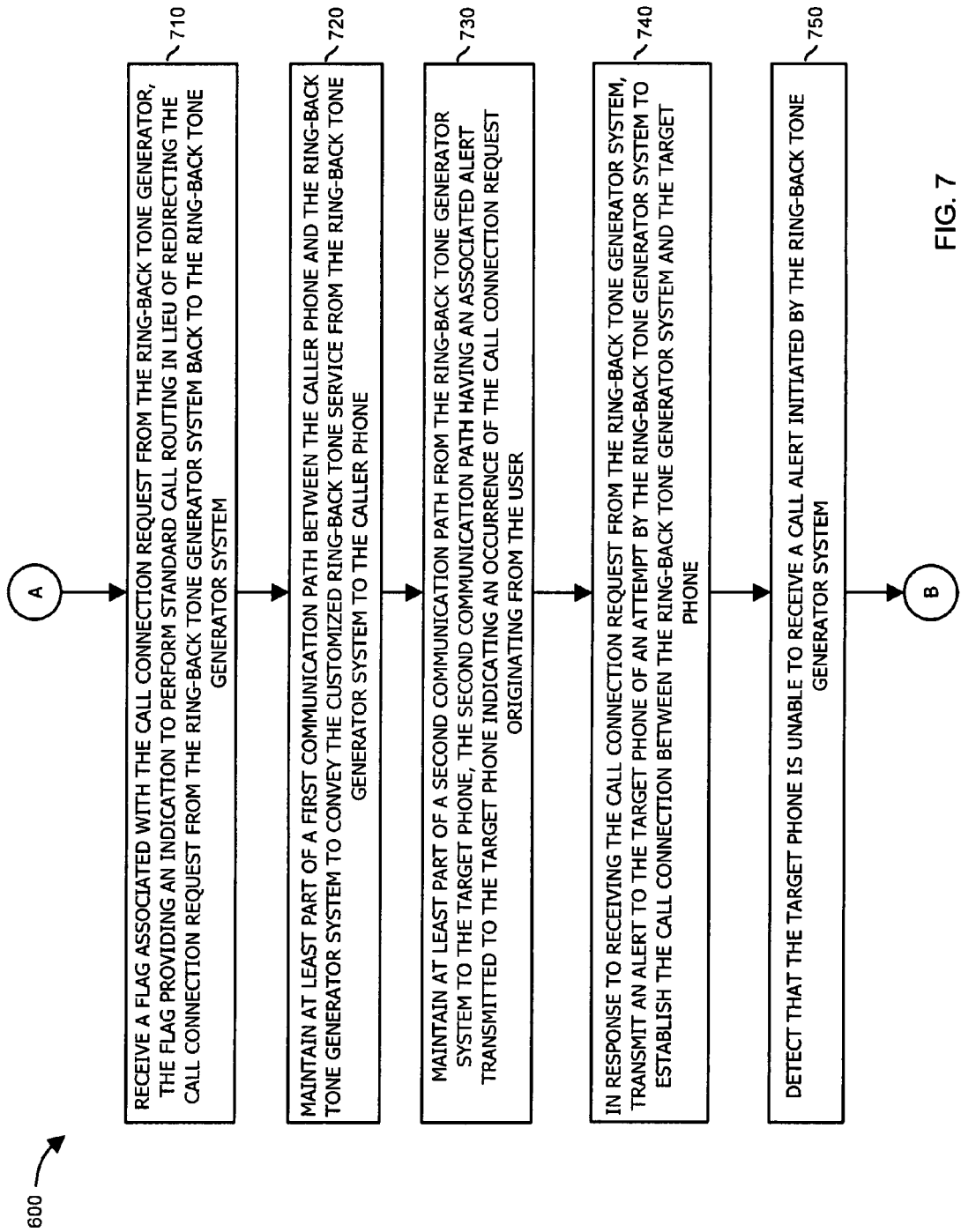
Figure 8:
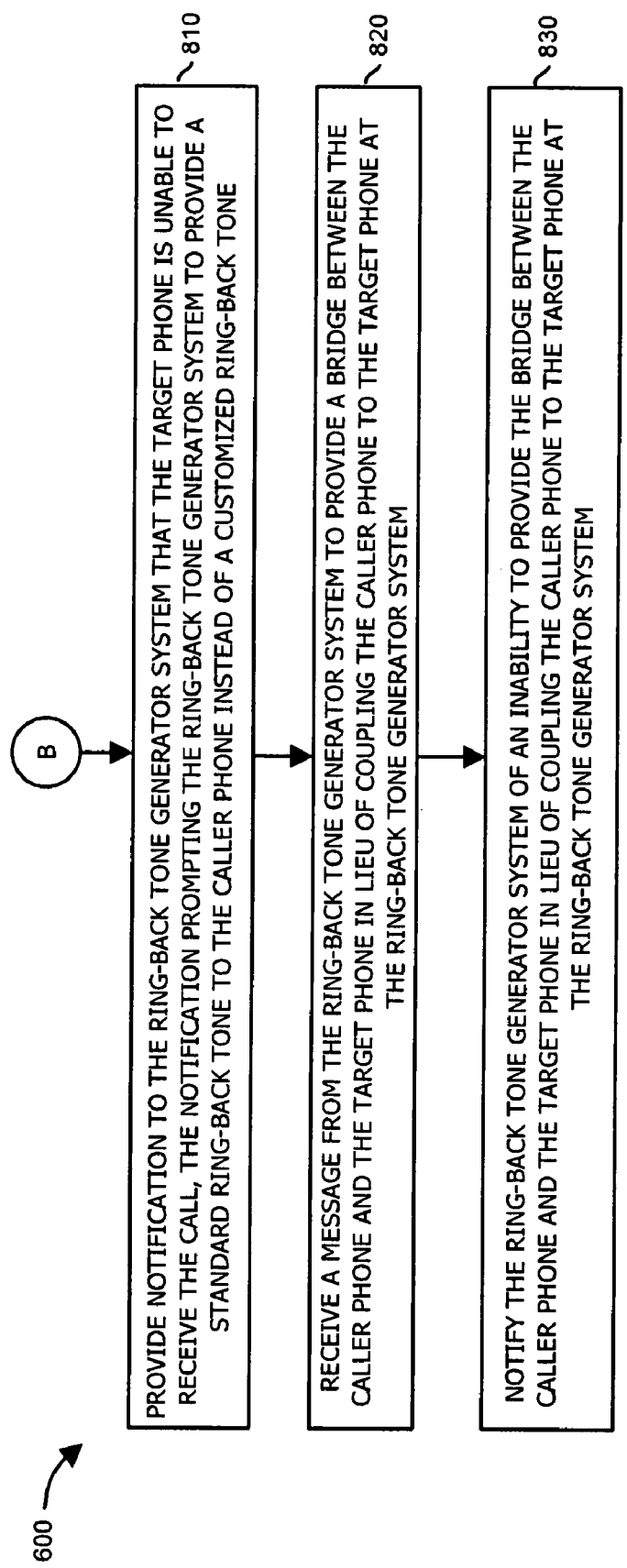

FIGS. 6-8 combine to form a flowchart 600 of processing steps performed by phone switch system 130 according to example configurations herein. In general, flowchart 600 illustrates how phone switch system 130 supports generating a custom ring-back tone to caller phone 110.

In step 610, phone switch system 130 such as an MSC receives a call connection request originating from a caller phone 110 to establish a call connection between the caller phone 110 and a target phone 120.

In step 620, the phone switch system 130 identifies that the target phone 120 is associated with a subscriber of an unconditional call forwarding service, and that service is activated such that all calls to the subscriber are forwarded to the ring-back tone generator system.

In step 630, the phone switch system 130 redirects the call connection request 102 originating from the caller phone 110 to the ring-back tone generator system 140 that provides a customized ring-back tone service. In one configuration, the phone switch utilizes an identifier associated with the caller phone 110 to generate an unconditional call forwarding message to the ring-back tone generator system 140. This is one example of how the phone switch system 130 forwards the call connection request 102 to the ring-back tone generator system 140 rather than directly placing an outgoing call to the target phone 120 itself.

In step 650, after redirecting the call connection request 104, the phone switch system 130 receives a call connection request 106 from the ring-back tone generator system 140 to establish a call connection path between the ring-back tone generator system 140 and the target phone 120.

In step 660, the phone switch system 130 receives call connection request 106 including a second number identifying the target phone 120 as a destination of call connection request 106. In one configuration, the second number is unique with respect to the first identifier number (identifying target phone 120 as the destination of the call) received in call connection request 102. The phone switch system 130 identifies (based on use of the second number) that the call connection request 106 should not be redirected back to the ring-back tone generator system 140 and utilizes the second number to place (potentially via normal call processing) a call connection to the target phone 120. As discussed above, use of two different numbers for the same target phone 120 enables the phone switch system 130 and the ring-back tone generator system 140 to avoid an endless loop of transmitting the call connection request 104/106 between the phone switch system 130 and the ring-back tone generator system 140.

Referring now to FIG. 7, in step 710, the phone switch system 130 receives a flag associated with the call connection request 106 received from the ring-back tone generator 140. The flag provides a signal to differentiate how to handle call processing associated with the call connection request 106. For example, the flag provides an indication to the phone switch system 130 to perform standard call routing in lieu of redirecting the call connection request 106 back to the ring-back tone generator system 140. Thus, a call connection request 106 can be based on the same identifier (e.g., phone number of the target phone 120) as in the call connection request 104 or call connection request 102 without causing the call connection request 106 from being passed in an endless loop between the phone switch system 130 and the ring-back tone generator system 140.

In steps 720 and 730, the phone switch system 130 maintains at least part of a first call connection path 124 (e.g., communication path) between the caller phone 110 and the ring-back tone generator system 140 to convey the customized ring-back tone service from the ring-back tone generator system 140 to the caller phone 110. Additionally, the phone switch system 130 maintains at least part of a second call connection path 126 (e.g., second communication path) from the ring-back tone generator system 140 to the target phone 120. The ring-back tone generator system 140 utilizes the second communication path through the phone switch system 130 to alert the target phone 120 of an attempt by the caller phone 110 to connect to the target phone 120.

In step 740, in response to receiving the call connection request 106 from the ring-back tone generator system 140, the phone switch system 130 transmits or forwards an alert to the target phone 120 of an attempt by the ring-back tone generator system 140 to establish the call connection path 126 between the ring-back tone generator system 140 and the target phone 120.

In step 750, the phone switch system 130 detects that target phone 120 is unable to receive a call alert initiated by the ring-back tone generator system 140.

Referring now to FIG. 8, in step 810, the phone switch system 130 provides notification to the ring-back tone generator system 140 that the target phone 120 is unable to receive the call. This notification prompts the ring-back tone generator system 140 to immediately create bridge 146 between the first call connection path 124 and the second call connection path 126, allowing the caller phone 110 to receive the standard network tone or announcement that identifies the reason for the call attempt failure.

As previously discussed for one configuration, if the ring-back tone generator system 140 provides a custom ring-back tone and the subscriber answers to 120, the ring-back tone generator system 140 attempts to hand off bridging of the first call connection path 124 and second call connection path 126 terminating at the ring-back tone generator system 140 and passing through the phone switch system 140. For example, in step 820, the phone switch system 130 receives a message from the ring-back tone generator system 140 to provide a bridge 236 between the caller phone 110 and the target phone 120 in lieu of coupling the caller phone 110 to the target phone 120 at the ring-back tone generator system 140.

The phone switch system 130 may or may not be able to provide the bridge 236 enabling the ring-back tone generator system 140 to free up some of its resources. If not, in step 830, the phone switch system 130 notifies the ring-back tone generator system 140 of an inability to provide the bridge 236 between the caller phone 110 and the target phone 120 in lieu of coupling the caller phone 110 to the target phone 120 at the ring-back tone generator system 140 via bridge 146. In the alternative, if the phone switch system 130 has the ability to provide bridge 236, the phone switch system 130 notifies the ring-back tone generator system 140 that the phone switch system 130 can accommodate the handoff request and provide a bridge 236 to connect the caller phone 110 and target phone 120.

As discussed above, configurations herein include equipment and methods for integrating a RBT (Ring-back Tone) platform to an existing phone switching network. In furtherance of the previous configurations, two different implementations are presented: an Intelligent Network (IN) approach and a Service Node (SN) approach. Note that while the following detailed configurations use a wireless network illustrate example operations, techniques herein are directed to networks in general and "wireline" networks such as a PSTN (Public Switched Telephone Network) using similar techniques.

1. Intelligent Network (IN) Approach

Figure 9:
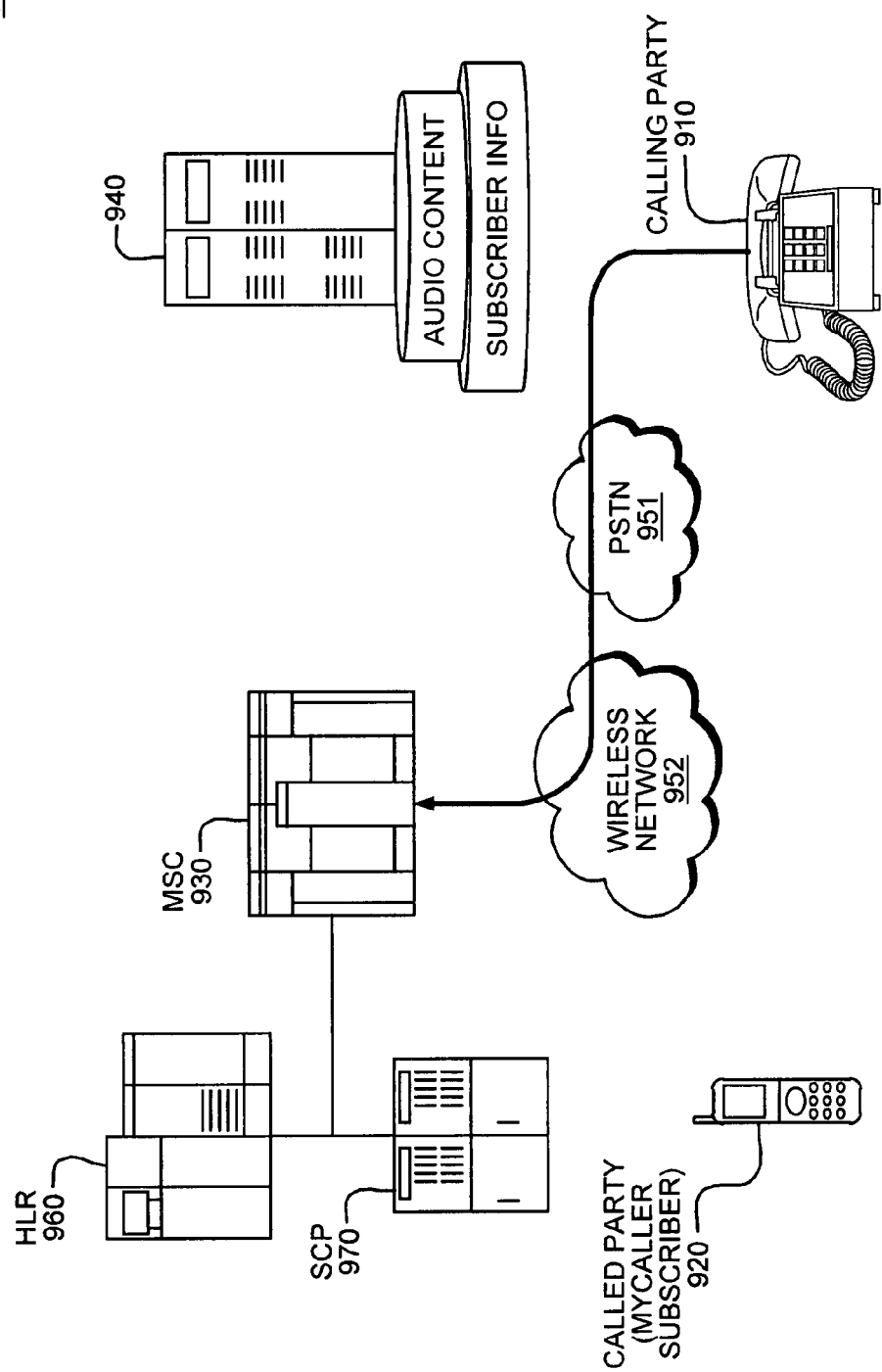
FIG. 9 is a diagram illustrating an example of receiving an incoming call.
Figure 10:
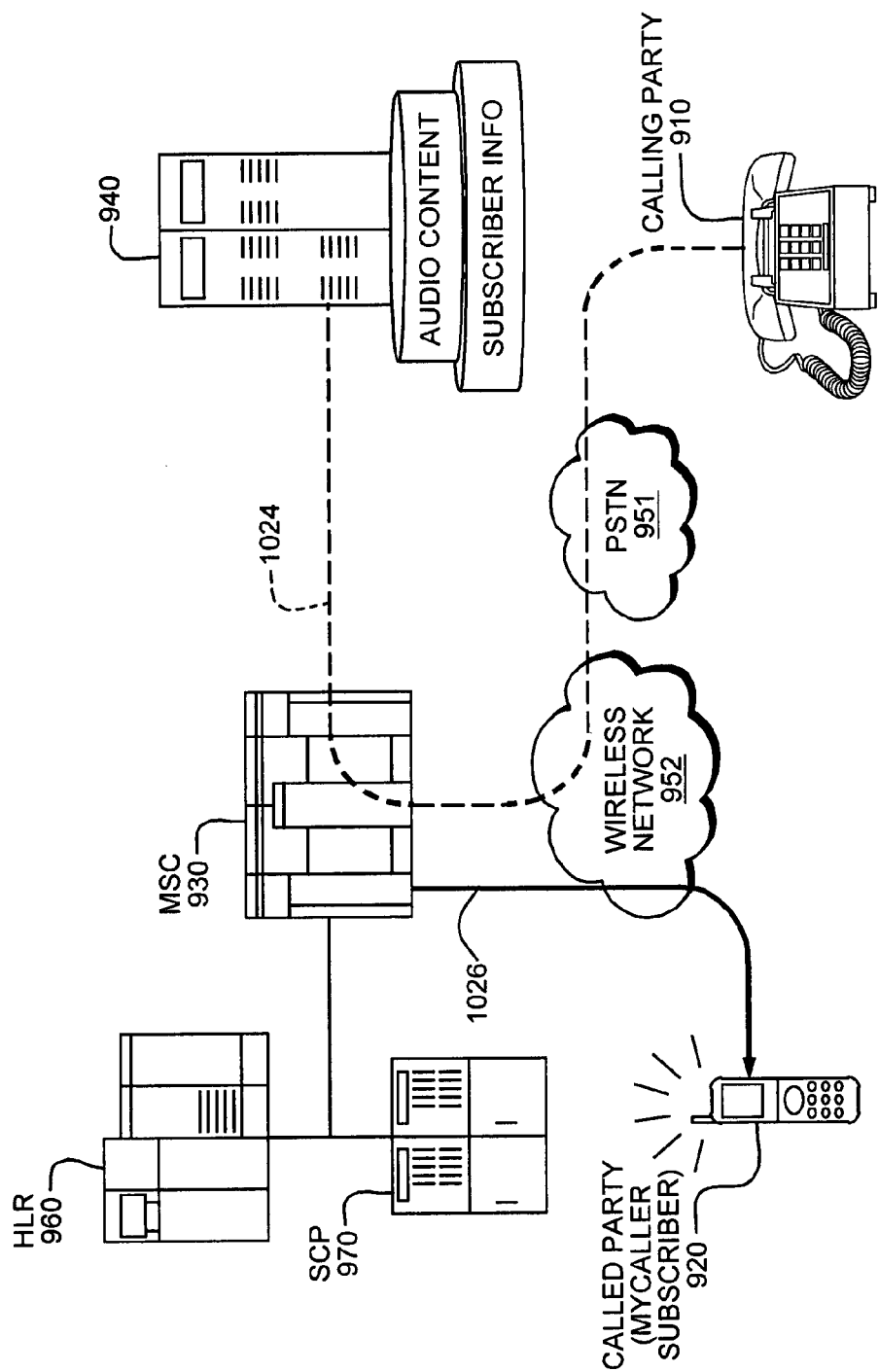
FIG. 10 is a diagram illustrating an example of generating a custom ring-back tone.
Figure 11:
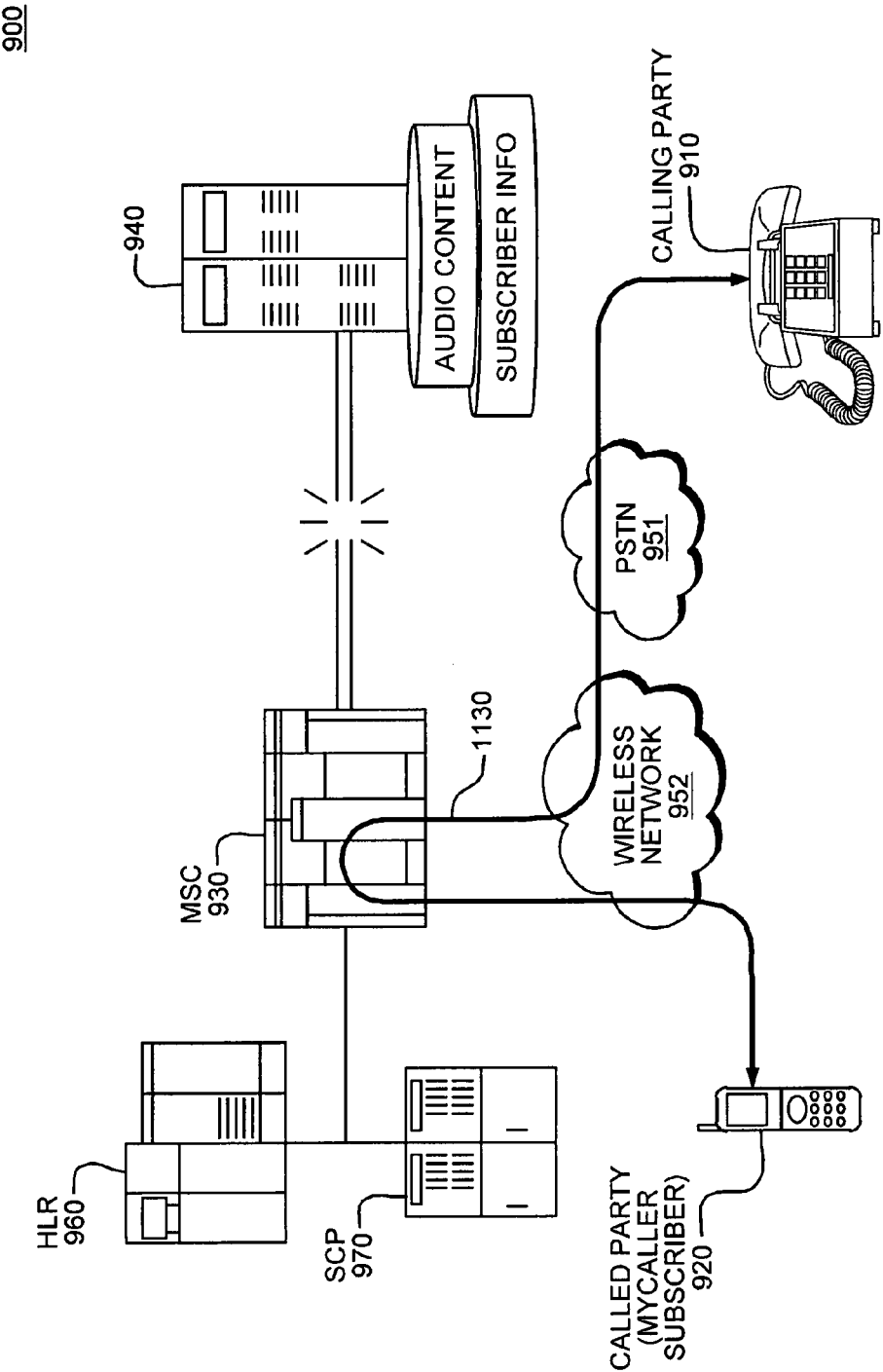
FIG. 11 is a diagram illustrating release of the custom ring-back tone generation system and bridging of two call legs.

FIGS. 9-11 are diagrams illustrating a communication system 900 implementing an IN approach according to a configuration herein. As shown, communication system 900 includes caller phone 910, target phone 920, MSC (Mobile Switching Center) 930, ring-back tone generator system 940, PSTN (Public Switched Telephone Network) 951, wireless network 952, HLR (Home Location Register) 960, and SCP (Service Control Point) 970.

In one configuration, the SCP 970 is a general purpose computer including an associated database for storing data and a signaling interface for communicating with the existing switching networks 951 and 952. SCP 970 also includes a processor, memory, and a standard interface between the SCP 970 and the switching network to support communications. The primary protocols used in the SCP 970 interface include AIN (Advanced Intelligent Network), WIN (Wireless Intelligent Network), INAP (Intelligent Network Application Part) and CAMEL.

In addition to inclusion of the SCP 970 to support custom ring-back services, certain network switching equipment in communication system 900 is "IN-capable." For example, the switches (e.g., MSC 930) are capable of i) suspending call processing activity at certain well-defined points in a call (know as trigger detection points) and ii) communicating with the SCP 970 to receive further instructions on how to process a call. The MSC 930 has the ability to notify the SCP 970 of certain events during the life of the call, such as called party alerting, call answer, and call disconnected. As mentioned, the switching equipment (e.g., MSC 930) communicates with the SCP 970 using AIN, WIN, INAP, or CAMEL protocols.

One purpose of using IN technology to deploy enhanced services is to provide freedom to create a service without depending on each switching equipment vendor to develop costly custom software upgrades for the new service. This enables a network operator overseeing at least a portion of communication system 900 to create a service that operates identically across all switching equipment in their network, regardless of equipment vendor. In one configuration, this is largely possible because a custom ring-back service is based on standardized capabilities and protocols.

Certain versions of the IN protocols such as INAP capability set 1 and CAMEL release 2 define only simple capabilities and may be insufficient to implement a reliable RBT service. However, more recent versions of these protocols, known as INAP capability set 2 (CS-2) and CAMEL release 4 (based on INAP CS-2) contain new call handling capabilities (which were originally developed for support of multi-party calls such as 3-party conferencing) can be employed to support an IN standards-based custom RBT service according to example configurations herein.

Basic Operation of Intelligent Network (IN) Approach

FIGS. 9-11 below illustrate the basic operation of the RBT service using an IN approach. For example, a terminating call attempt trigger, such as the Termination_Attempt_Authorized trigger, is provisioned in the MSC 930 for each custom RBT subscriber. MSC 930 receives an incoming call from caller phone 910 to a target phone 920. When MSC 930 detects the call attempt trigger for the new call from caller phone 910, the MSC 930 transfers control of the call to the SCP 970 assigned for that target phone 920 (e.g., subscriber phone).

The SCP 970 verifies that the call is for a custom RBT subscriber and then instructs the MSC 930 to continue the call processing to the target phone 920. The SCP 970 also arms the trigger detection points for further call status changes (e.g., alerting, busy, answered, disconnected, etc.) on that call. Once the MSC 930 determines that the call to target phone 920 is alerting, the SCP 970 is again triggered of this condition. In response to the trigger, the SCP 970 instructs the MSC 930 to set up a call leg to the RBT platform and connect the call leg to the caller phone 910 as shown by call connection path 1024 in FIG. 10. The ring-back tone generator system 940 determines the appropriate audio clip to play for the ring-back tone based on the phone number associated with the caller phone 910, the phone number of the target phone 920, as well as other information in the call setup message from the MSC 930. The ring-back tone generator system 940 plays the clip over the selected audio circuit to the caller phone 910 so that a user of the caller phone 910 hears the custom ring-back tone in lieu of a standard ring-back tone.

When the MSC 930 detects that a pending call from the caller phone 910 to the target phone 920 has been answered by a subscriber, the MSC 930 notifies the SCP 970 of the condition. In response, the SCP 970 instructs the MSC 930 to connect the caller phone 910 to the target phone 920 via call connection path 1130 and drop the connection to the ring-back tone generator system 940 as shown in FIG. 11. The SCP 970 then disarms the call status triggers for the remainder of the call and allows the MSC 930 to resume normal call processing for the remainder of the call.

Figure 12:
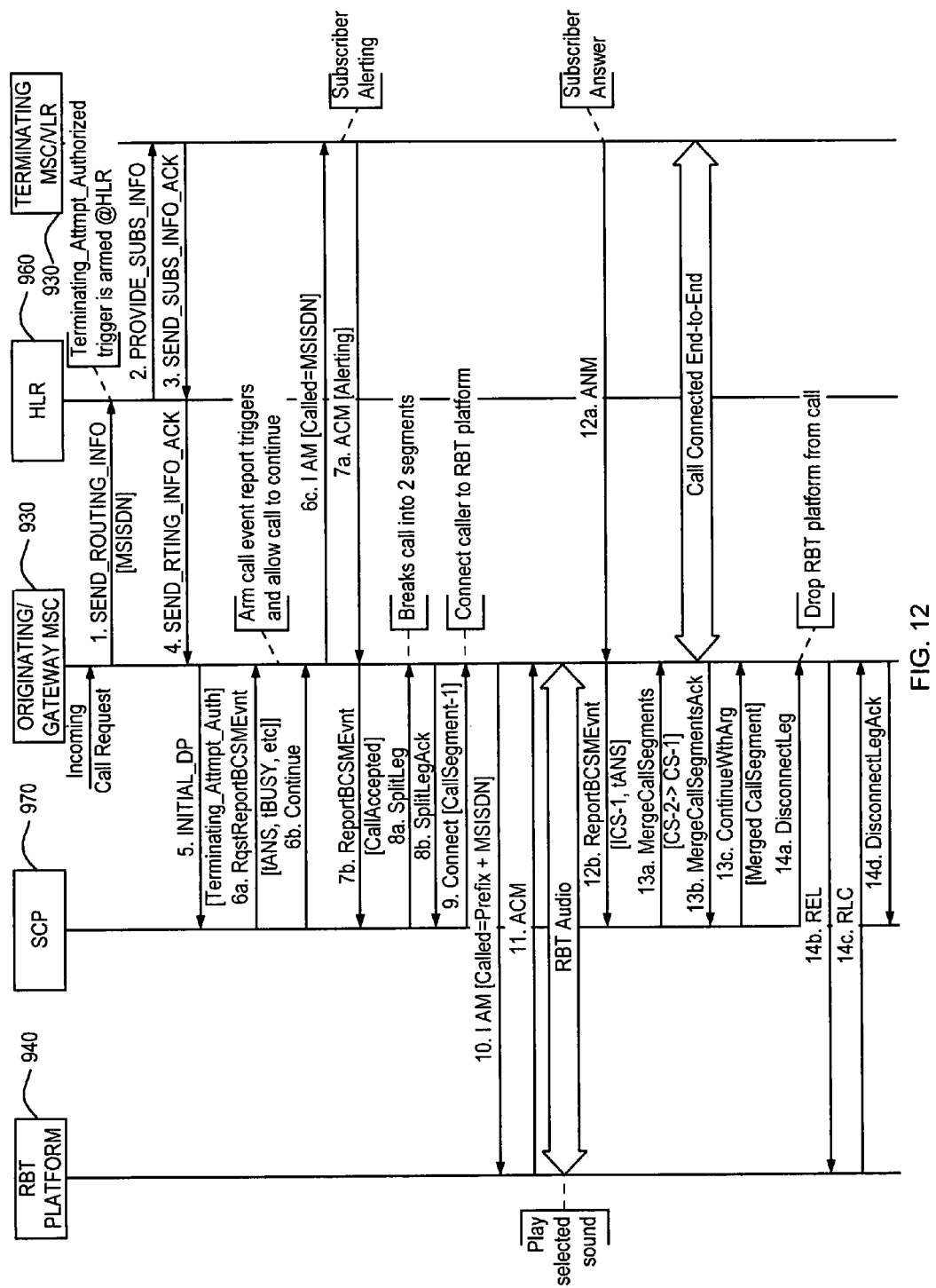
FIG. 12 is an example timing diagram illustrating call handling.

FIG. 12 is a timing diagram illustrating an example implementation of communication system 900 and custom RBT service based on SCP 970 using the INAP CS-2 protocol. Other configurations use INAP CS-2 or other IN protocols providing similar capabilities.

Steps Functional Description 1-4 These steps include normal GSM incoming call setup—HLR 960 returns terminating trigger information for target phone 920 subscriber to MSC 930

5 MSC 930 detects Terminating_Attempt_Authorized trigger and sends Initial_DP event to SCP 970

6a-c SCP 970 arms detection points for call accept, answer, busy, and disconnect and instructs MSC 930 to continue with call termination to target phone 920 subscriber; MSC 930 initiates call setup to visited MSC 7a-b Upon detection that target phone 920 subscriber is alerting, originating (gateway) MSC 930 reports call accept event to SCP 970

8a-b SCP 970 instructs MSC 930 to split the call into 2 segments: the caller phone 910 connects to MSC 930 via a first segment and MSC connects to called target phone 920 subscriber via a second segment 9-10 SCP 970 instructs MSC 930 to connect first segment (caller) to the ring-back tone generator system 940 while the second segment continues alerting the called target phone 920 subscriber; this causes the MSC 930 to set up a new call to the ring-back tone generator system 940 using SS7 ISUP 11 Ring-back tone generator system 940 queries its subscriber database to determine the audio clip to play using calling number, called number, and other information from the ISUP IAM message, then returns an ACM message to the MSC 930 and begins playing the audio clip 12a-b Upon detection that called target phone 920 subscriber has answered the call, originating (gateway) MSC 930 reports call answered event to SCP 970

13a-b SCP 970 instructs MSC 930 to merge first and second call segments, connecting the caller phone 910 to the target phone 920 subscriber, and allow that call to continue 14a-d SCP 970 instructs MSC 930 to drop ring-back tone generator system 940 from the call, causing MSC 930 to initiate normal ISUP call release sequence 2. Service Node Approach The service node approach in the present application employs an RBT platform (e.g., ring-back tone generator system) connected to the originating or terminating MSC by voice trunks controlled by the SS7 ISUP signaling protocol. In this configuration, existing MSC software configuration options are used to redirect calls for RBT subscribers to the RBT platform intelligent peripheral.

In one configuration, the RBT platform IP consists of a general purpose processor, disk storage for all the audio clips, digital trunk interface cards with the ability to play audio files and to detect call progress tones in the audio channels (e.g., NMS CG-series boards with on-board DSPs), and the corresponding signaling protocol software (e.g., SS7 ISUP). For the service node approach, the IP also includes a digital switching fabric that allows it to connect an incoming trunk circuit to an outgoing trunk circuit.

Basic Operation of the Service Node Approach

Figure 13:
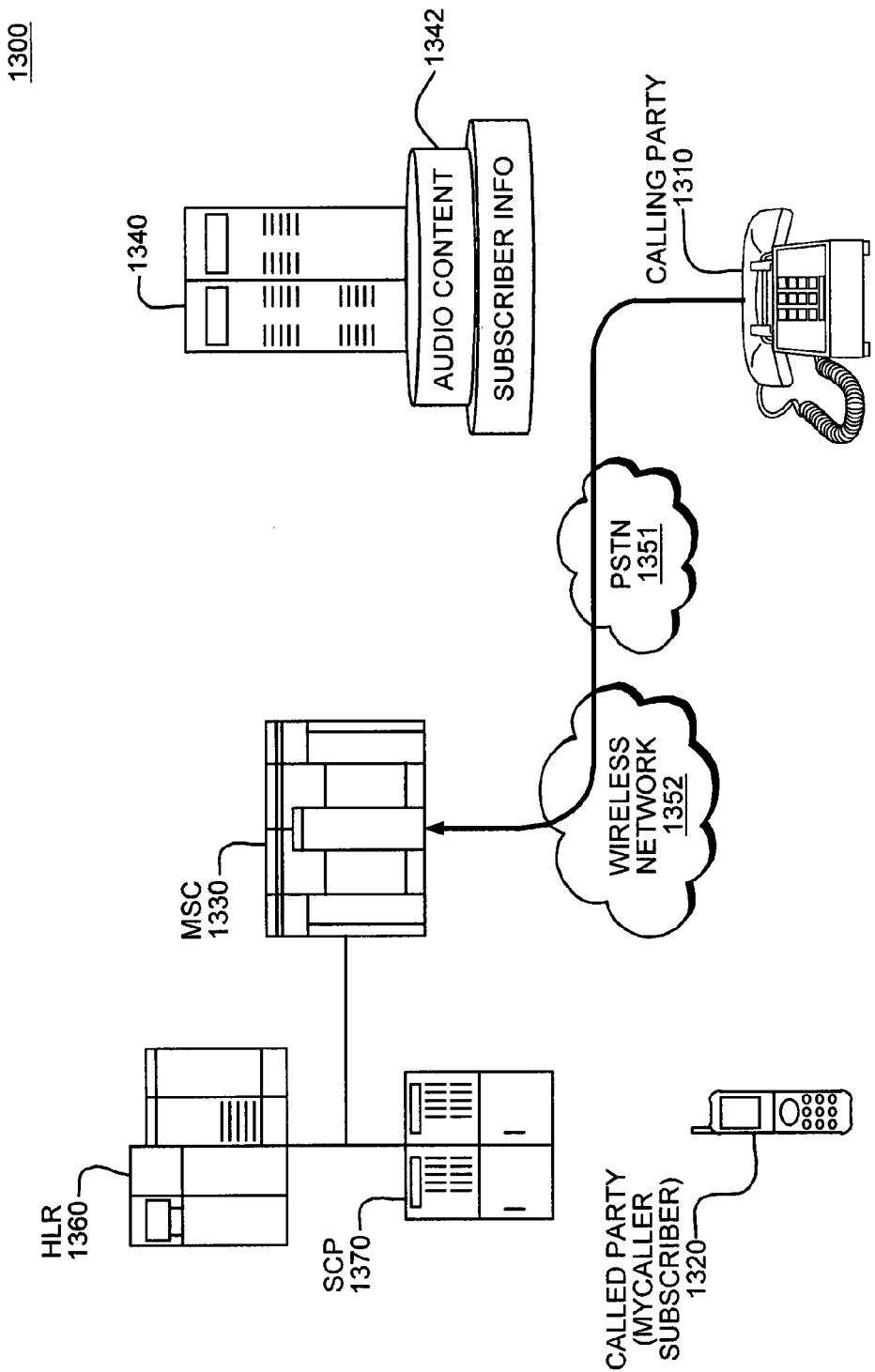
FIG. 13 is a diagram illustrating an example of receiving an incoming call.
Figure 14:
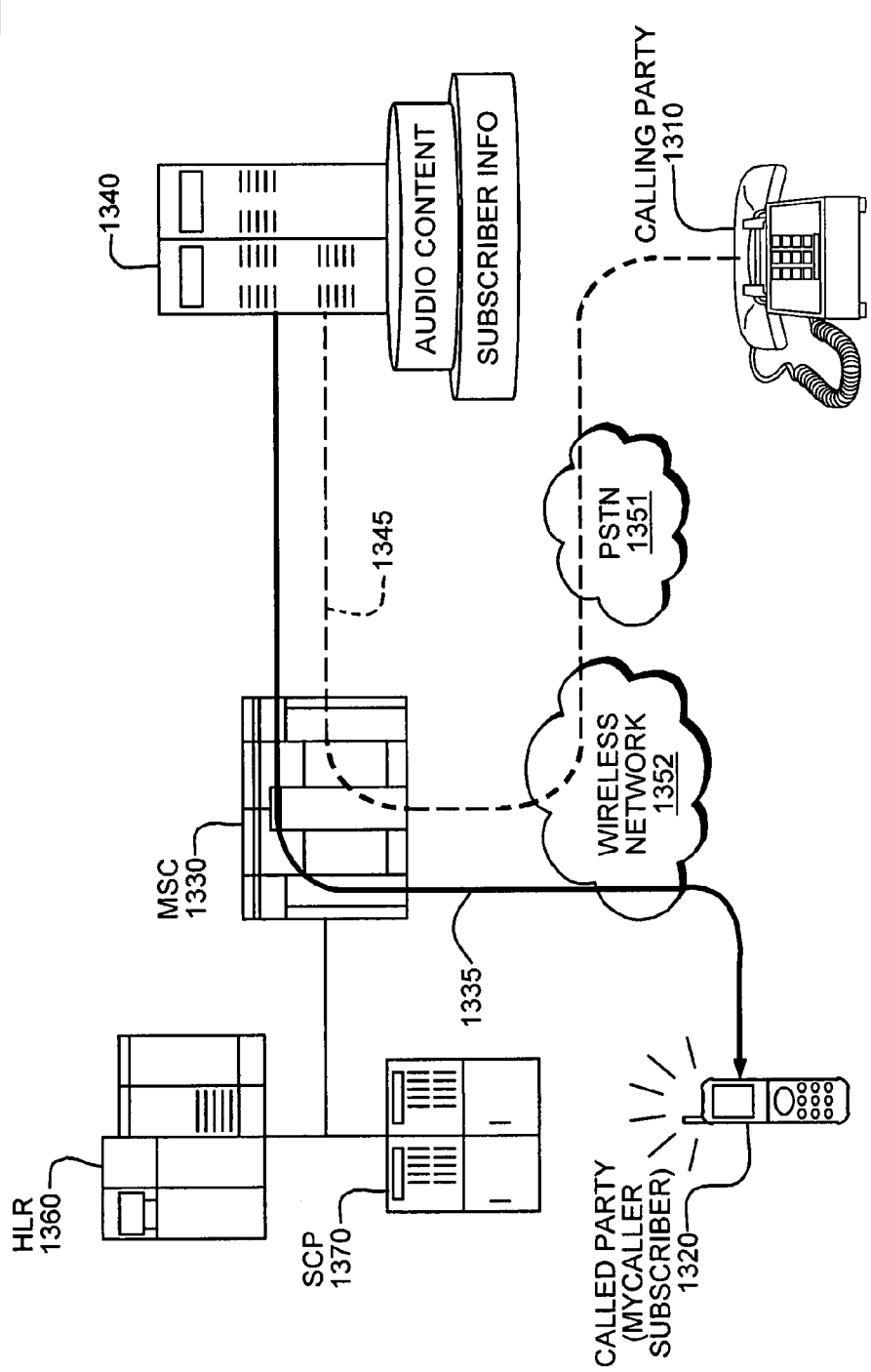
FIG. 14 is a diagram illustrating establishment of two call legs and generation of a custom ring-back tone.
Figure 15:
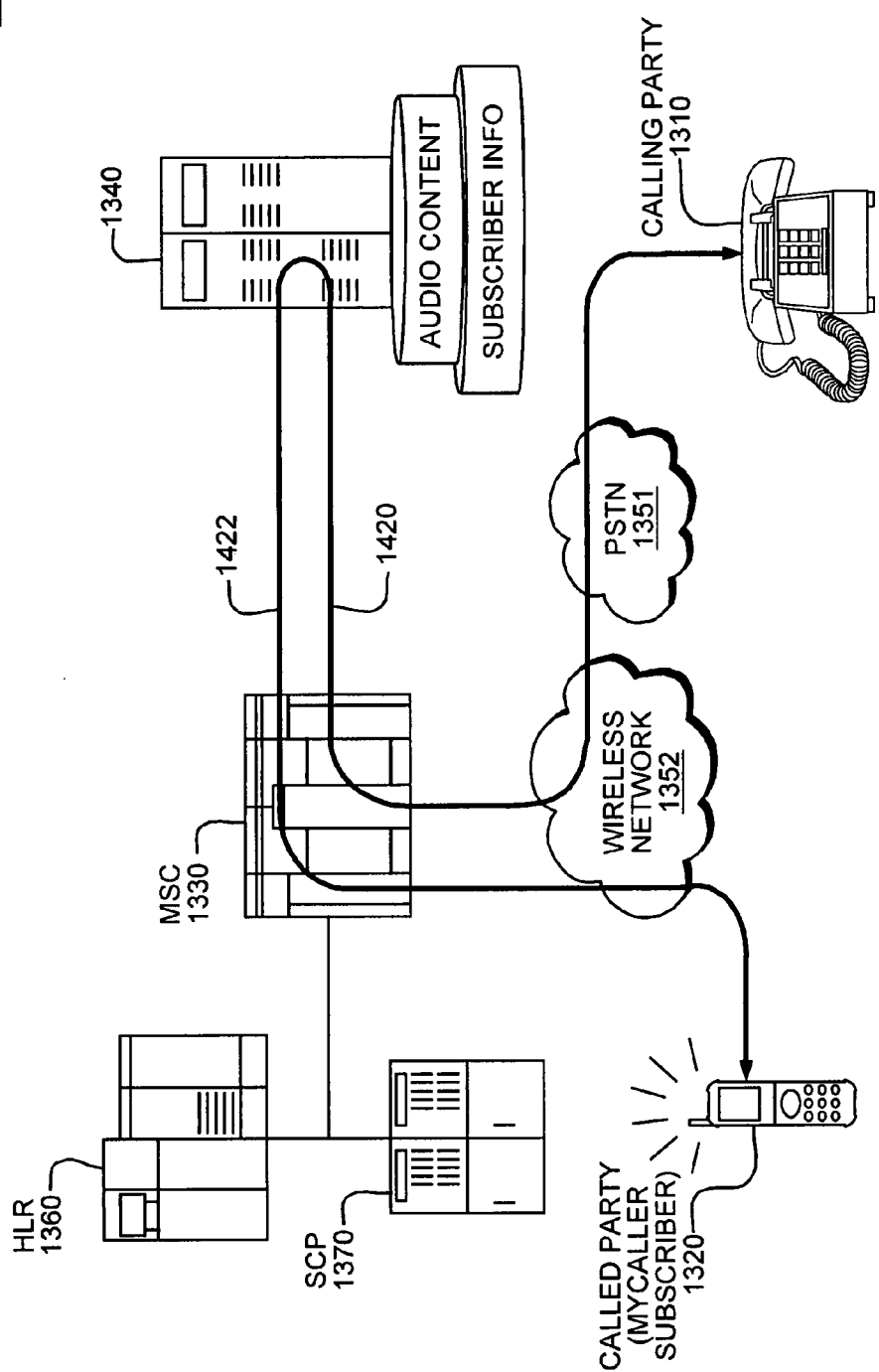
FIG. 15 is a diagram illustrating an example of bridging two call legs at the custom ring-back tone generation system.

FIGS. 13-15 are diagrams illustrating a communication system 1300 implementing a service node approach. As shown, communication system 1300 includes caller phone 1310, target phone 1320, MSC (Mobile Switching Center)

1330, ring-back tone generator system 1340, PSTN (Public Switched Telephone Network) 1351, wireless network 1352, HLR (Home Location Register) 1360, and SCP (Service Control Point) 1370. Ring-back tone generator system 1340 includes disk storage 1342 for audio clips. In general, FIGS. 13-15 are diagrams illustrating a connection sequence implemented by ring-back tone generator system 1340 in order to transparently implement a custom RBT service in an existing switching network such as wireless network 1352.

As shown in FIG. 13, when an MSC 1330 receives an incoming call from caller phone 1310 and identifies that the called party (e.g., target phone 1320) is a subscriber of the custom RBT service, the MSC 1330 forwards the call to the ring-back tone generator system 1340 as shown in FIG. 14. The ring-back tone generator system 1340 queries its respective subscriber database to determine the audio clip to play and then places a second call connection 1345 through the same MSC 1330 or a different MSC to alert the called target phone 1320 subscriber of the incoming call from caller phone 1310. When the MSC 1330 indicates that the target phone 1320 subscriber is alerting, the ring-back tone generator system 1340 plays the selected ring-back sound file on the first call connection 1335 to the caller phone 1310. As shown in FIG. 15, when the subscriber answers the target phone 1320, the ring-back tone generator system 1340 bridges the 2 call legs (e.g., call leg 1420 and call leg 1422) together using its internal switch fabric for the duration of the call.

Figure 16:
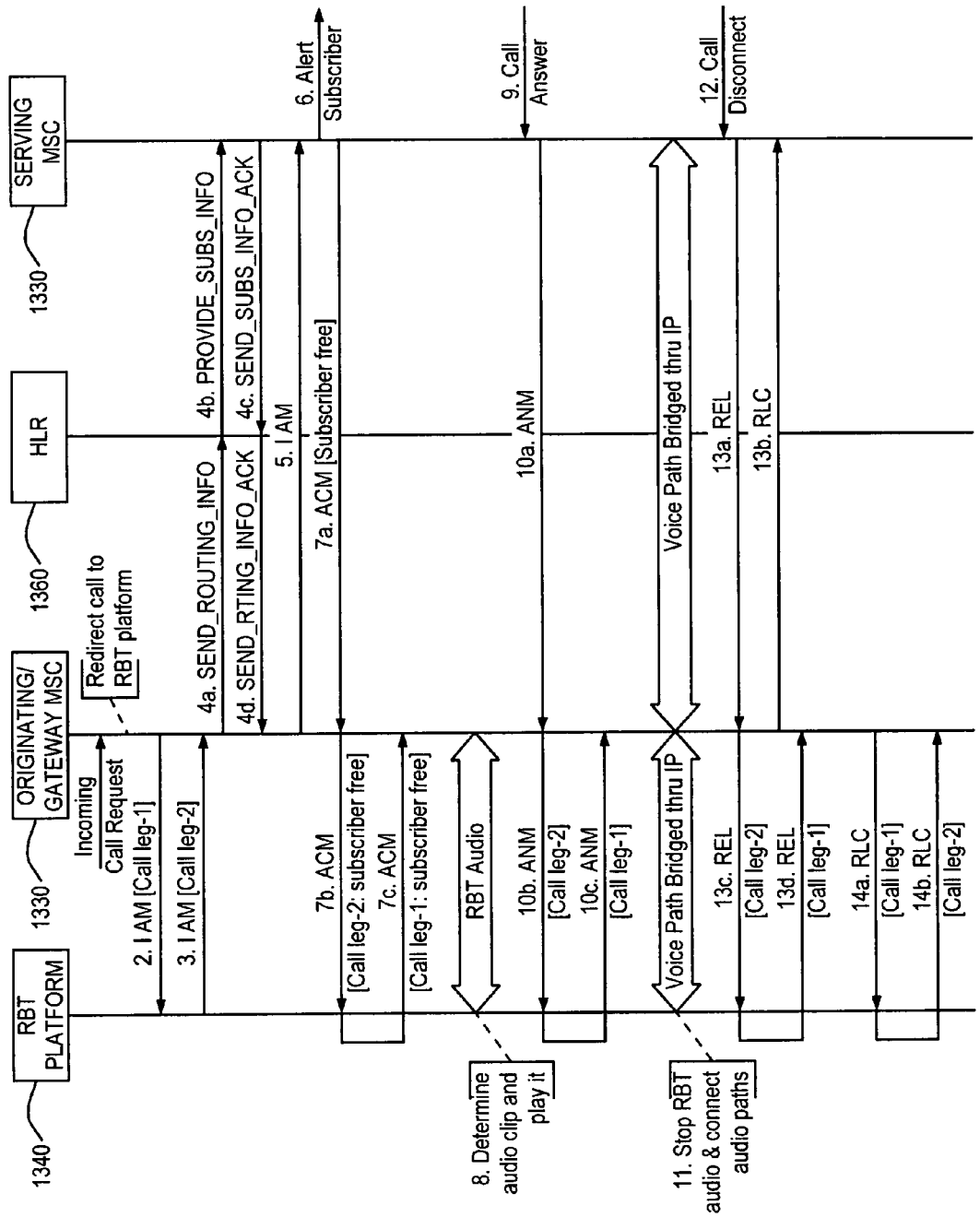
FIG. 16 is an example timing diagram illustrating call handling.

FIG. 16 is a timing diagram illustrating an example of call signaling sequences between an existing network and the RBT platform using the SS7-ISUP protocol.

During the life of the call, other signaling messages may be passed between the originating and terminating switches, such as call progress messages (e.g., call has been forwarded) or requests for supplementary services. These signaling messages are passed through the RBT platform with the incoming and outgoing circuit numbers mapped but the messages otherwise unchanged to preserve the operation of the services that rely on these messages.

Call Progress Monitoring

During an offering of the outgoing call leg to the called RBT subscriber (e.g., target phone 1320), the user experience for the caller phone 1310 can be enhanced if the custom RBT audio is only played back to the caller phone 1310 in cases where called party (e.g., target phone 1320) is being alerted of the incoming call. In one configuration, when the target phone 1320 is busy or can't be reached, the ring-back tone generator system 1340 provides the caller phone 1310 a standard network tone or announcement indicating the called party's status.

This can be implemented in the ring-back tone generator system 1340 by monitoring the out-of-band SS7 signaling messages received from the signaling network for an indication that the target phone 1320 is alerting or that the call cannot be completed. Based on use of SS7 ISUP, the target phone 1320 can be considered in an alert mode based on receipt of either:

an Address Complete (ACM) message with the called part status indicator (in the backward call indicators parameter) containing the value of "subscriber free"; or a Call Progress (CPG) message with the event indicator containing the value of "alerting".

This triggers the ring-back tone generator system 1340 to start playing the appropriate custom RBT to the caller phone 1310.

Similarly, the ring-back tone generator system 1340 detects when a call cannot be offered to the target phone 1320 based on receipt of either:

an Address Complete (ACM) message containing both the "in-band information available" indicator set in the optional backward call indicators parameter and a cause value parameter indicating an unsuccessful call; or a Call Progress (CPG) message containing both the "in-band information available" value set in the event indicator parameter and a cause value parameter indicating an unsuccessful call.

This causes the incoming and outgoing call legs to be immediately connected within the ring-back tone generator system 1340 switch fabric so that the caller phone 1310 can hear the network provided tone or announcement.

In some networks, existing switching equipment does not or cannot provide the appropriate call progress information using out-of-band SS7 signaling. In these cases, the ring-back tone generator system 1340 monitors the audio channel on the outgoing call leg to detect the appropriate tones (e.g. busy, reorder, ring-back) or announcement, for example using the tone and voice activity detection capability implemented by the DSPs (Digital Signal Processors) on the NMS CG6000 trunk interface board.

The out-of-band and in-band call progress monitoring methods can be employed in parallel by the RBT platform (e.g., ring-back tone generator system 1340). In this case the first positive indication from either method is used to determine the appropriate call treatment—playing of RBT audio or connecting the audio paths for tone or announcement.

Call Forwarding

Prior to a call being answered, the call leg to the called RBT subscriber (B-party) may be forwarded to another subscriber (C-party) or to a voice mail system. At that time it may be beneficial to stop playing custom RBT audio of the B-party and allow the caller (A-party) to hear the RBT audio of the C-party (if also a RBT subscriber) or the normal ring tone provided for the C-party or voice mail system. The ring-back tone generator system 1340 detects the forwarding of a call by receipt of the SS7-ISUP Call Progress (CPG) message with an event information parameter indicating that the call has been forwarded. At this point, the ring-back tone generator system 1340 immediately stops playing the custom RBT audio and connects the incoming and outgoing call legs together within its internal switch fabric to allow the caller phone 1310 to hear a custom RBT associated with C-party.

Redirecting Calls to the RBT Platform

Which method to employ for redirecting the incoming calls to the ring-back tone generator system 1340 depends on the capabilities of equipment in the existing switching network. For each of multiple different vendor types of switching equipment, it may be beneficial to use a different redirecting method for each type of vendor equipment within the same network.

The call redirection may be implemented in such a way that incoming calls to the RBT subscriber from other subscribers on the same network, or from different networks, are routed to the ring-back tone generator system 1340. However, the outbound call leg from the ring-back tone generator system 1340 back to the called subscriber should not be routed back to the ring-back tone generator system 1340 by the switching network in order to avoid an endless loop where the call is never offered to the called subscriber. This prevents a simple call processing feature such as unconditional call forwarding from being used alone for this purpose.

If the existing switching network supports intelligent network (IN) capabilities, one method for redirecting calls to the ring-back tone generator system 1340 is to assign a terminating IN trigger to each custom RBT subscriber. This causes the existing switch to generate a trigger message to a corresponding SCP 1370 on each incoming call for the RBT subscriber and wait for instructions from the SCP 1370 on how to process the call. Depending on the configuration, the SCP 1370 may be part of the existing switching network or may be an integral part of the ring-back tone generator system 1340.

Figure 17:
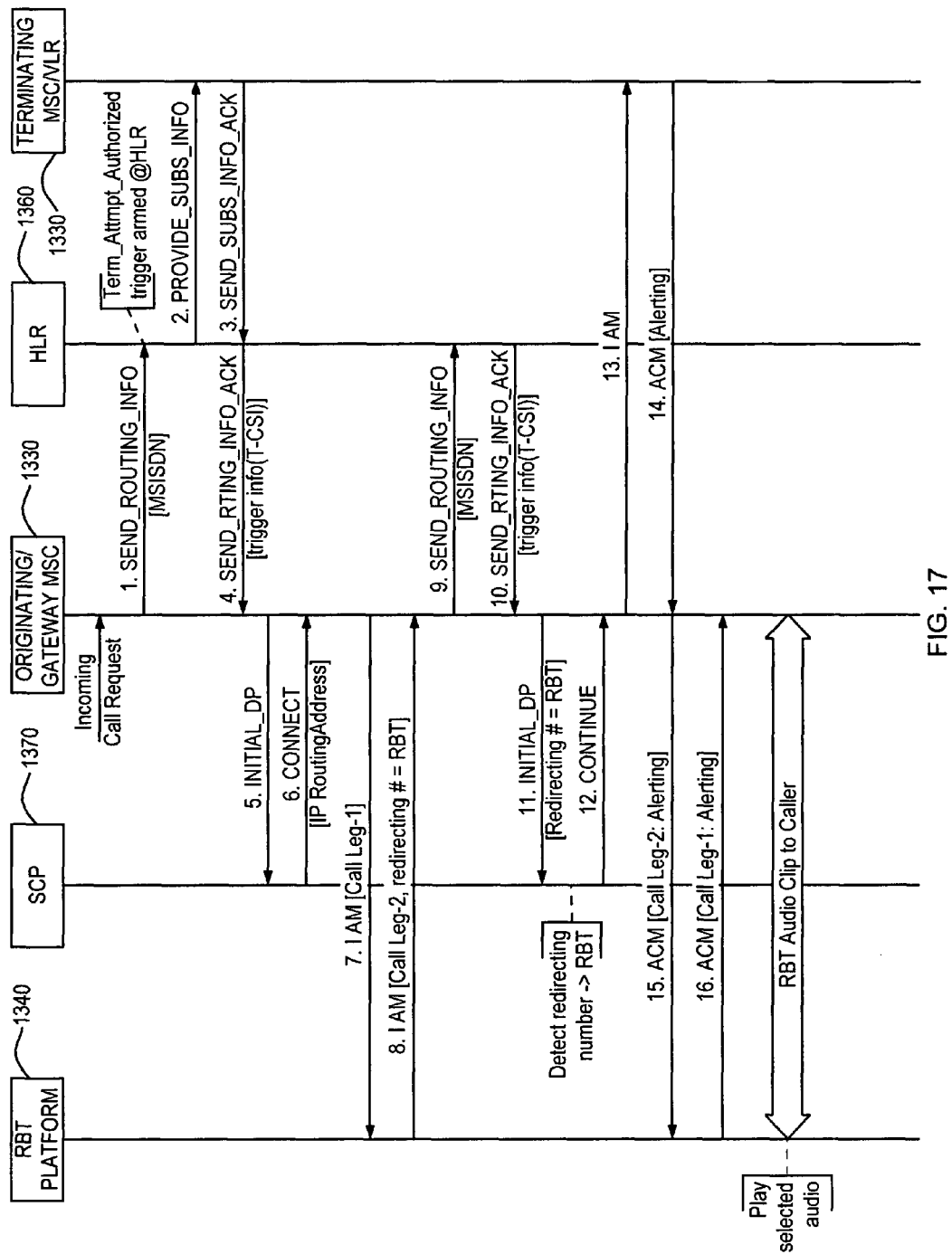
FIG. 17 is an example timing diagram illustrating call handling.

One possible call sequence using the Intelligent Network Application Part (INAP) protocol is shown in FIG. 17. Many other similar sequences are possible depending on the variant of the intelligent network signaling protocol (e.g., INAP, CAMEL, AIN, WIN) supported in the switching network.

Upon receipt of a terminating call trigger from the MSC 1330, the SCP 1370 instructs the MSC 1330 to redirect the call to the ring-back tone generator system 1340, for example, using the INAP Connect message. When the ring-back tone generator system 1340 receives the incoming call and places the outgoing call leg to the called subscriber, the ring-back tone generator system 1340 flags the outgoing call as having already been processed by the RBT platform in a way that is visible to the SCP 1370 when the new call leg again triggers the SCP 1370. Having identified the call as the 2nd leg of a custom RBT call from the ring-back tone generator system 1340, the SCP 1370 can then instruct the MSC 1330 to continue with normal call routing, rather than redirecting the call to the ring-back tone generator system 1340.

One possible mechanism for flagging the call as the 2nd leg of a custom RBT call is for the ring-back tone generator system 1340 to set the "redirecting number" parameter in the outgoing SS7-ISUP initial address message to a number uniquely assigned to the ring-back tone generator system 1340. The SCP 1370 can then test the redirecting number field in the corresponding trigger event (e.g., INAP INITIAL_DP event) for this unique number.

A standard call redirection feature such as call forwarding unconditional (CFU) can be used as an alternate method of redirecting calls for a ring-back tone generator system 1340 that doesn't require an SCP or IN-capable switch. This method provides each RBT subscriber with two associated directory numbers—a public directory number with unconditional call forwarding activated to forward all incoming calls to the ring-back tone generator system 1340, and a private DN that the ring-back tone generator system 1340 uses to terminate calls to the subscriber without getting caught in an infinite loop as discussed. Any other terminating features (e.g., call waiting, call forwarding—no answer for voice mail, etc.) are activated on the private DN and are only applied by the MSC on the 2nd call leg. In one configuration, the private DN is a permutation of the public DN—which is generated by replacing a prefix with an alternate routing prefix reserved for RBT subscribers. The ring-back tone generator system 1340 can maintain a database of directory number mappings and perform a lookup and replace strategy on each received call.

Figure 18:
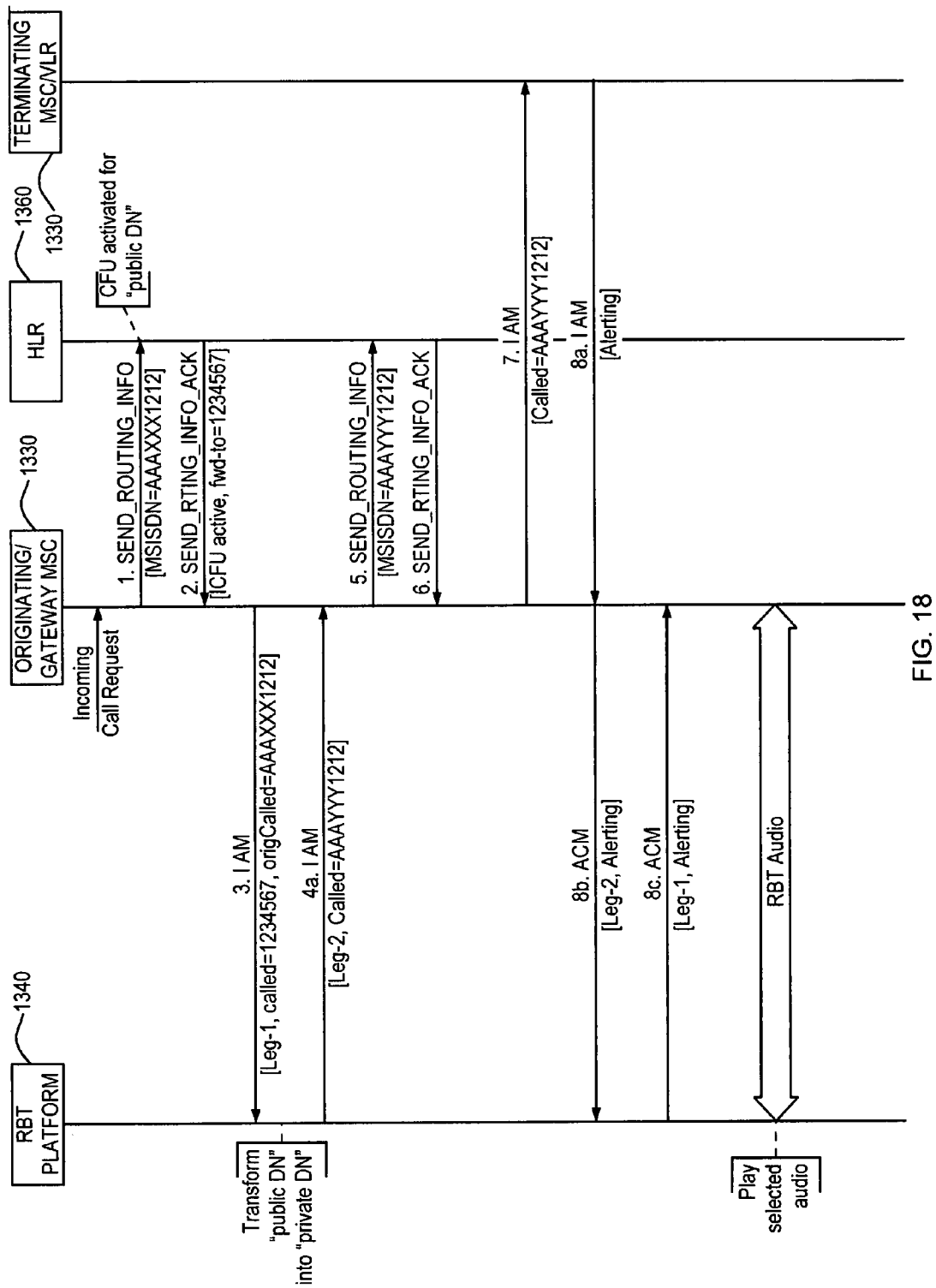
FIG. 18 is an example timing diagram illustrating call handling.

FIG. 18 is a timing diagram illustrating a call flow for the call diversion scenario using CFU and multiple DNs for a GSM-based network. A brief description of the sequence follows below:

Steps Functional Description 1-2 Upon receipt of an incoming call for the RBT subscriber's public DN, the [gateway] MSC 1330 performs its normal SendRoutingInfo request to the HLR 1360. The HLR 1360 returns routing info indicating the CFU is active and the forward-to DN is a number assigned to the ring-back tone generator system 1340.

3 The MSC 1330 forwards the call to the ring-back tone generator system 1340. The subscriber's public DN is included in the "original called number" field of the IAM from the MSC 1330 to the ring-back tone generator system 1340.

4a, 5-6 The ring-back tone generator system 1340 transforms the subscriber's public DN into its private DN and initiates a call back through the MSC 1330 to the target phone 1320 subscriber. Calling party information from the original IAM is retained. The MSC 1330 again queries the HLR 1360 for routing info—this time for the private DN, which is not forwarded to the IP.

7 Upon receipt of routing information from the HLR 1360 for the private DN, the MSC 1330 routes the call to the target phone 1320 subscriber to the visited MSC 8a-c Upon receipt of the ACM from the 2nd call leg indicating that the target phone 1320 subscriber is alerting, the IP returns the ACM for the 1st call leg and begins playing the custom RBT audio back to the caller phone 1310.

Release Line Trunking

Some existing switching equipment (such as the DMS family of switches from Nortel Networks™) supports a feature called Release Line Trunking (RLT). RLT capability allows an enhanced service platform, such as ring-back tone generator system 1340, having two related calls in progress to request the switch to connect those two calls together and drop the enhanced service platform from the call.

Use of RLT can significantly reduce the voice trunk utilization between an MSC 1330 and ring-back tone generator system 1340 using a service node implementation by allowing the ring-back tone generator system 1340 to drop out of the call (and thus release the switch-to-RBT platform trunks used for that call) once the call is answered by the target phone 1320 subscriber or a tone or announcement is detected that must be connected through to the caller phone 1310. This reduces the number of trunks required on both the switch and the ring-back tone generator system 1340 to support a given subscriber base, reducing the cost of deploying the custom RBT service.

Figure 19:
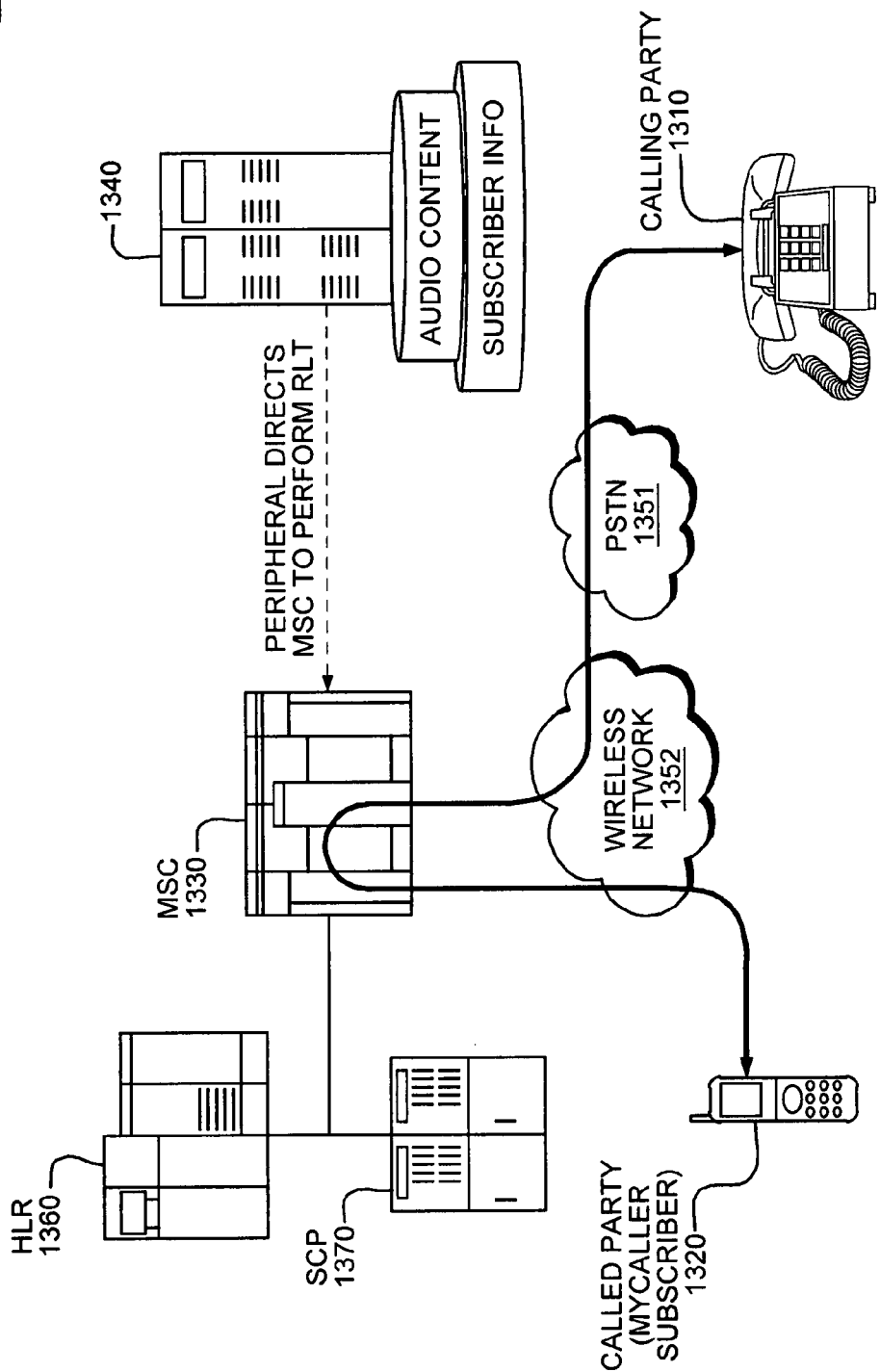
FIG. 19 is a diagram illustrating release line trunking.

The equipment employed and the initial call setup is the same as the normal service node implementation. Once the ring-back tone generator system 1340 detects the call is answered (or a network tone or announcement is detected), the ring-back tone generator system 1340 requests an adjacent switch to bridge the two call legs together rather than in the ring-back tone generator system 1340 in FIG. 19. If the MSC 1330 can satisfy this request, the MSC 1330 connects the specified call legs together within its internal switch fabric and releases the two trunk circuits of the ring-back tone generator system 1340. If the MSC 1330 can't satisfy the RLT request, for example due to blocking in its internal switch fabric or other internal resource failure, the ring-back tone generator system 1340 then connects the calls internally with its own switch fabric and remain in the call path for the duration of the call.

Some switch implementations only allow RLT after the outbound call leg toward the RBT subscriber is answered, but not during a network tone or announcement. In this case, the ring-back tone generator system 1340 uses its internal switch fabric to connect the calls together once a network tone or announcement is detected. This does not significantly affect the trunk utilization since the percentage of calls terminating to tone or announcement is typically low and the duration of those calls is usually short.

Figure 20:
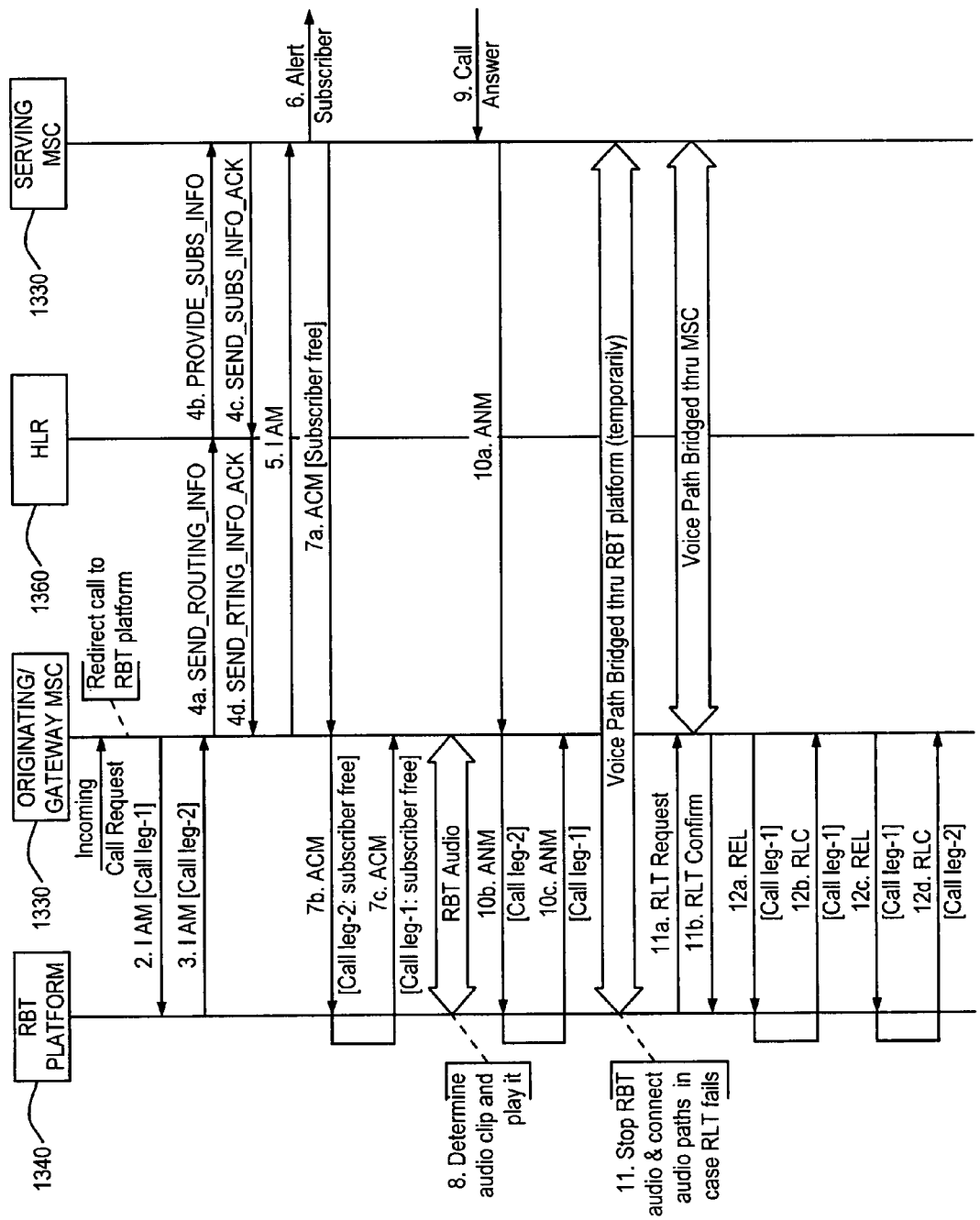
FIG. 20 is an example timing diagram illustrating call handling.

FIG. 20 is a timing diagram illustrating an example RLT implementation using the SS7 ISUP signaling protocol. The exact message sequence used to request RLT and the detailed parameters used to identify the calls to be connected are typically proprietary to each switch vendor and are represented here by generic RLT request and response messages.

The configurations herein enable a network operator to deploy a custom ring-back tone service without having to purchase costly customized software or feature upgrade packages for an MSC. For example, an MSC that normally handles call processing to provide a custom ring-back tone service offloads the task to a remote ring-back tone generator system that instead handles call processing and provides the custom ring-back tone service.

Figure 21:
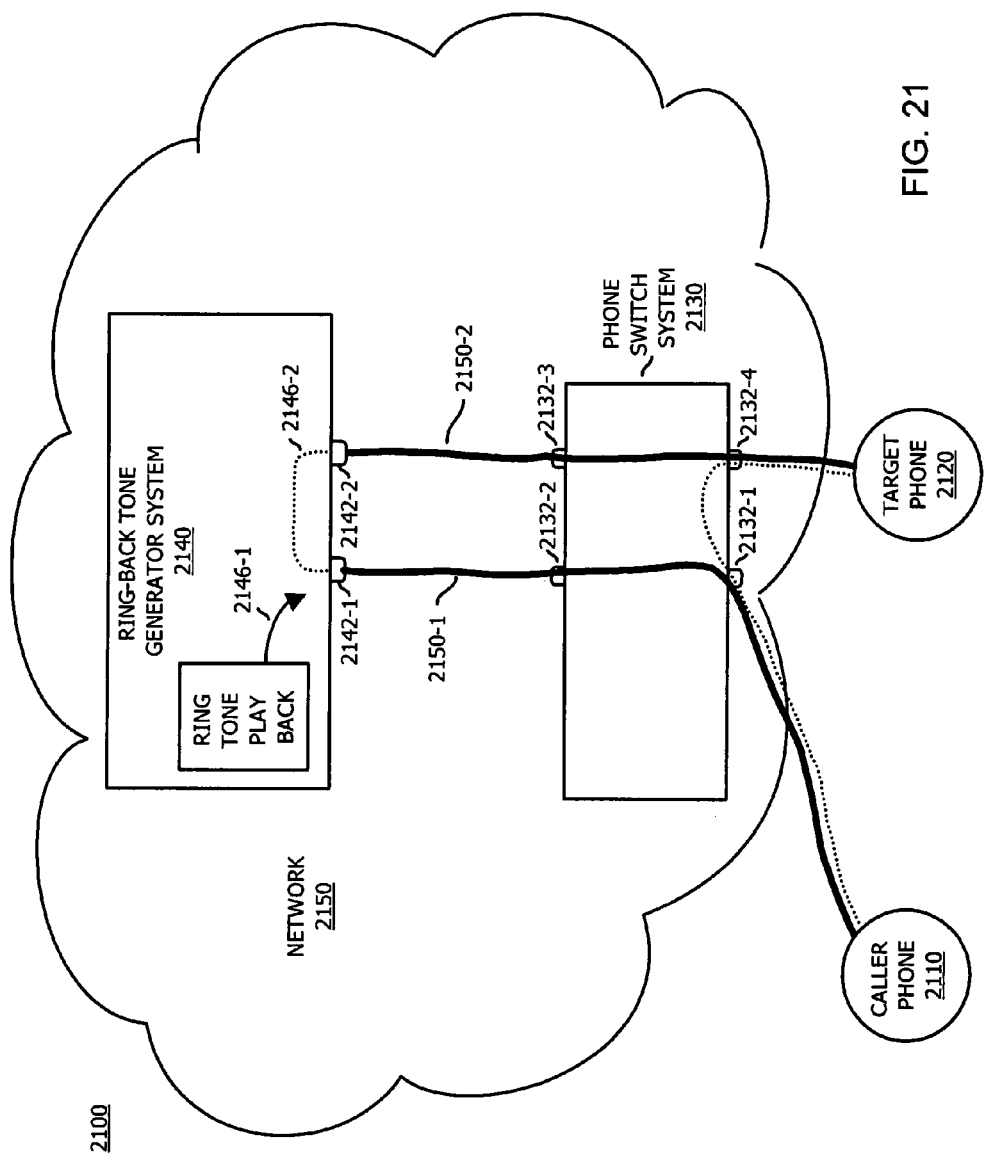
FIG. 21 is an example diagram of a communication system in which a ring-back tone generator system handles a received call according to embodiments herein.

FIG. 21 is a diagram of a communication system 2100 illustrating use of customized ring-back tones during establishment of a phone connection according to embodiments herein. As shown, communication system 2100 includes a caller phone 2110 and a target phone 2120 in communication with network 2150. Network 2150 includes phone switch system 2130 (e.g., a switch resource) and ring-back tone generator system 2140. Phone switch system 2130 includes trunk 2132-1, trunk 2132-2, trunk 2132-3, and trunk 2132-4 (collectively trunks 2132 or communication port resources). Ring-back tone generator system 2140 includes trunk 2142-1 and trunk 2142-2 (collectively trunks 2142).

Communication system 2100 supports custom ring-back tones for calls to certain subscribers of such a phone plan. For example, a custom ring-back tone service according to embodiments herein (as provided by communication system 2100) enables a subscriber to choose a custom audio clip (e.g., a favorite song or other stream of audible data) to be played back to a caller phone during a ringing portion of a call, prior to the subscriber answering an attempted call. Thus, instead of hearing a standard ring-back tone (at the caller phone 2110) indicating that a target phone 2120 is being alerted of the incoming call connection request, the caller phone 2110 hears the custom audio clip (e.g., a song) selected by the subscriber while the target 2120 is alerted.

In the context of the present example, during general operation, caller phone 2110 initiates a call to target phone 2120 (such as a subscriber of the custom ring-back tone service) by transmitting a call connection request to phone switch system 2130 such as an MSC as mentioned above. In one configuration, call connection request includes an identifier of the caller phone 2110 as well as an identifier of the target phone 2120. Upon receipt of call request information, the phone switch system 2130 first compares information such as the identifier of the called party in the call connection request to a corresponding table (e.g., a map) of the phone switch system 2130 to identify whether the called party (e.g., target phone 2120) is a subscriber of an enhanced service requiring interaction with an external peripheral such as the ring-back tone generator system 2140. If so, the phone switch system 2130 forwards (e.g., hands off) the call connection request (as received from caller 2110) to ring-back tone generator system 2140 for further call processing by the ring-back tone generator system 2140. If not, the phone switch system 2130 proceeds with normal call handling routines to provide a call connection between the caller phone 2110 and the target phone 2120.

For the case when phone switch system 2130 redirects the call connection request because the called or corresponding called phone 2120 is a subscriber of the ring-back tone generator service the phone switch system 2130 forwards the call connection request to ring-back tone generator system 2140 indicating the request by caller phone 2110 to connect to target phone 2130. Phone switch system 2130 participates in establishing a call connection leg 2150-1 between trunk 2132-2 and trunk 2142-1.

In response to receiving the call connection request as received from phone switch system 2130 over leg 2150-1, ring-back tone generator system 2140, in turn, transmits a call connection request to phone switch system 2130 to establish call connection leg 2150-2. As shown, establishing call connection leg 2150-2 can include assigning a trunk 2142-2 of ring-back tone generator system 2140 and trunk 2132-3 of phone switch system 2130 to create call connection leg 2150-2.

Call connection leg 2150-1 supports communications through trunk 2142-1 of ring-back tone generator system 2140 and through trunk 2132-2 and trunk 2132-1 of phone switch system 2130 to caller phone 2110.

While alerting the target phone 2120 (e.g., causing the target phone 2120 to ring) of the incoming call by caller phone 2110, the ring-back tone generator system 2140 provides a custom ring-back tone to caller phone 2110. When a subscriber of the target phone 2120 answers the target phone 2120, the ring-back tone generator system 2140 discontinues the ring-back tone on call connection leg 2150-1 to caller phone 2110 and potentially creates bridge 2146-2 so that a user of caller phone 2110 and subscriber of target phone 2120 can speak with each other. As previously discussed, prior to creating bridge 2146-2 connecting the caller to the target, the ring-back tone generator system 2140 plays back custom ring tone 2116 over link 2146-1 while alerting the target 2120 of the incoming call via leg 2150-2.

Figure 22:
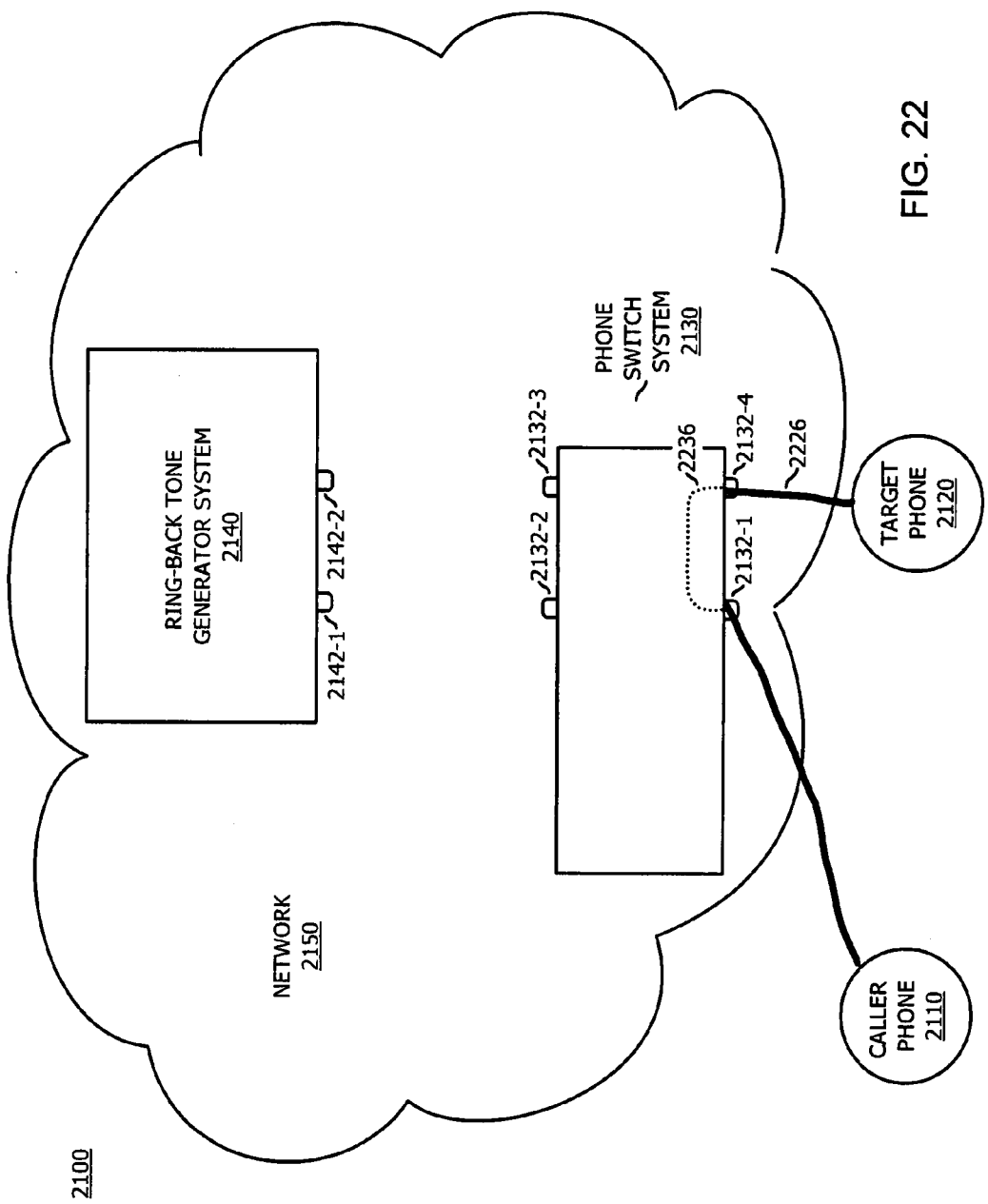
FIG. 22 is an example diagram of a communication system in which a phone switch system establishes a bridge for connecting a caller to a called party according to embodiments herein.

In one configuration, after at least temporarily providing bridge 2146-2 to connect the caller phone 2110 to the target phone 2120 via a voice communication channel, the ring-back tone generator system 2140 transmits a message to phone switch system 2130 requesting the phone switch system 2130 to provide a bridge connecting the caller 2110 and the target 2120 in lieu of the phone ring-back tone generation system 2140 providing bridge 2146-2. In response, the phone switch system 2130 provides bridge 2236 as shown in FIG. 22 to free resources such as leg 2150-1, leg 2150-2, trunk 2142-1, trunk 2142-2, trunk 2132-2, and trunk 2132-3. Note that the phone switch system 2130 can include a network of multiple switches. Accordingly, bridge 2236 may be created between two or more separately located switch devices in a switch fabric.

Figure 23:
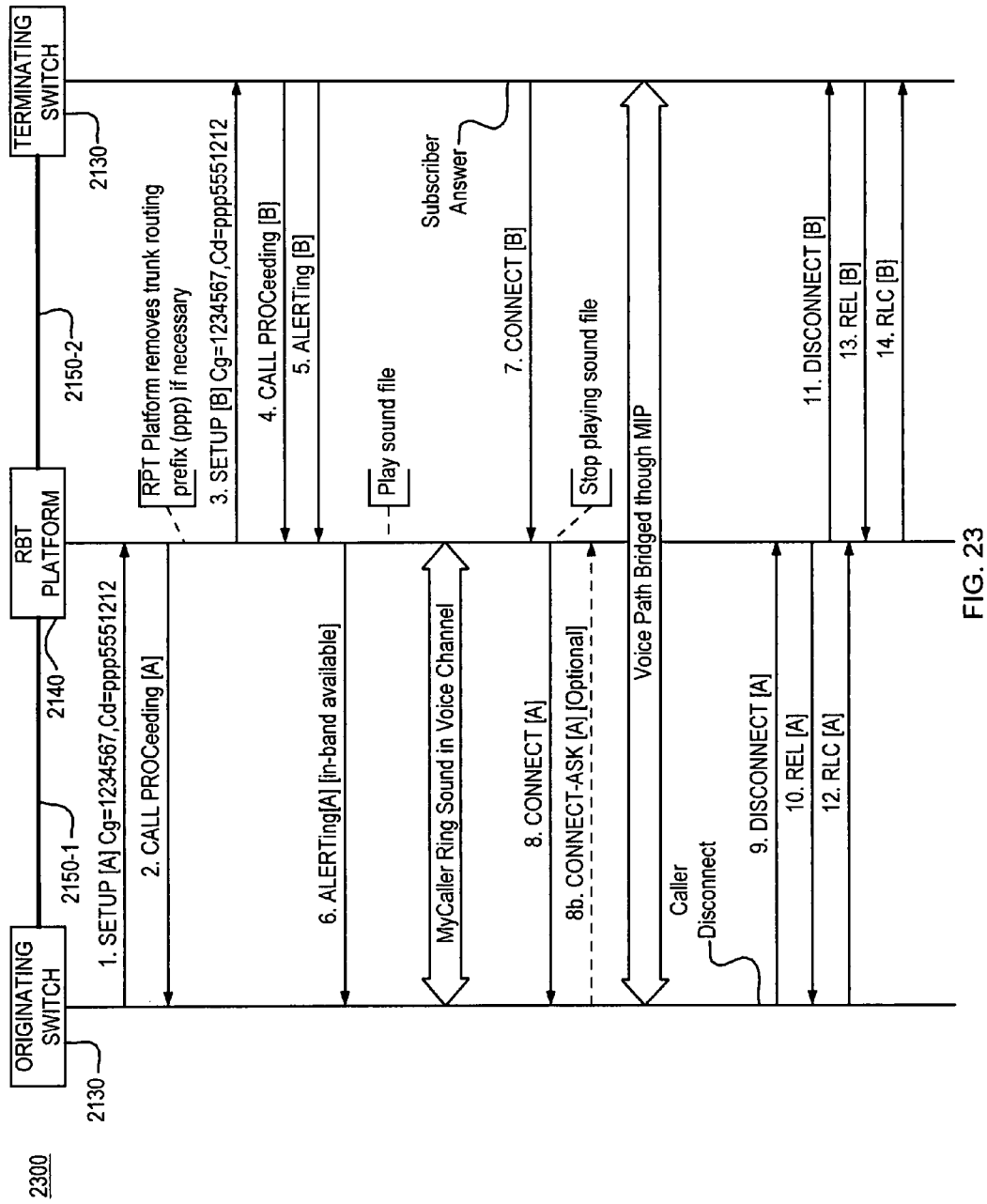
FIG. 23 is an example timing diagram illustrating call handling according to embodiments herein.

FIG. 23 is a timing diagram 2300 illustrating an example implementation of customized ring-back tones and related processes according to embodiments herein. For example, timing diagram 2300 illustrates service operation using ISDN trunks.

Service Operation Using ISDN Trunks

One method for the service node approach uses ISDN primary rate interface (PRI) trunks to form the interface between the phone switch system 2130 (e.g., MSC) and the ring-back tone generator system 2140 (e.g., RBT platform). This approach may be attractive for landline networks that are likely to be equipped with ISDN PRI trunks.

An example call flow for the ISDN service node implementation is analogous to the SS7 ISUP implementation of the previous sections.

Figure 24:
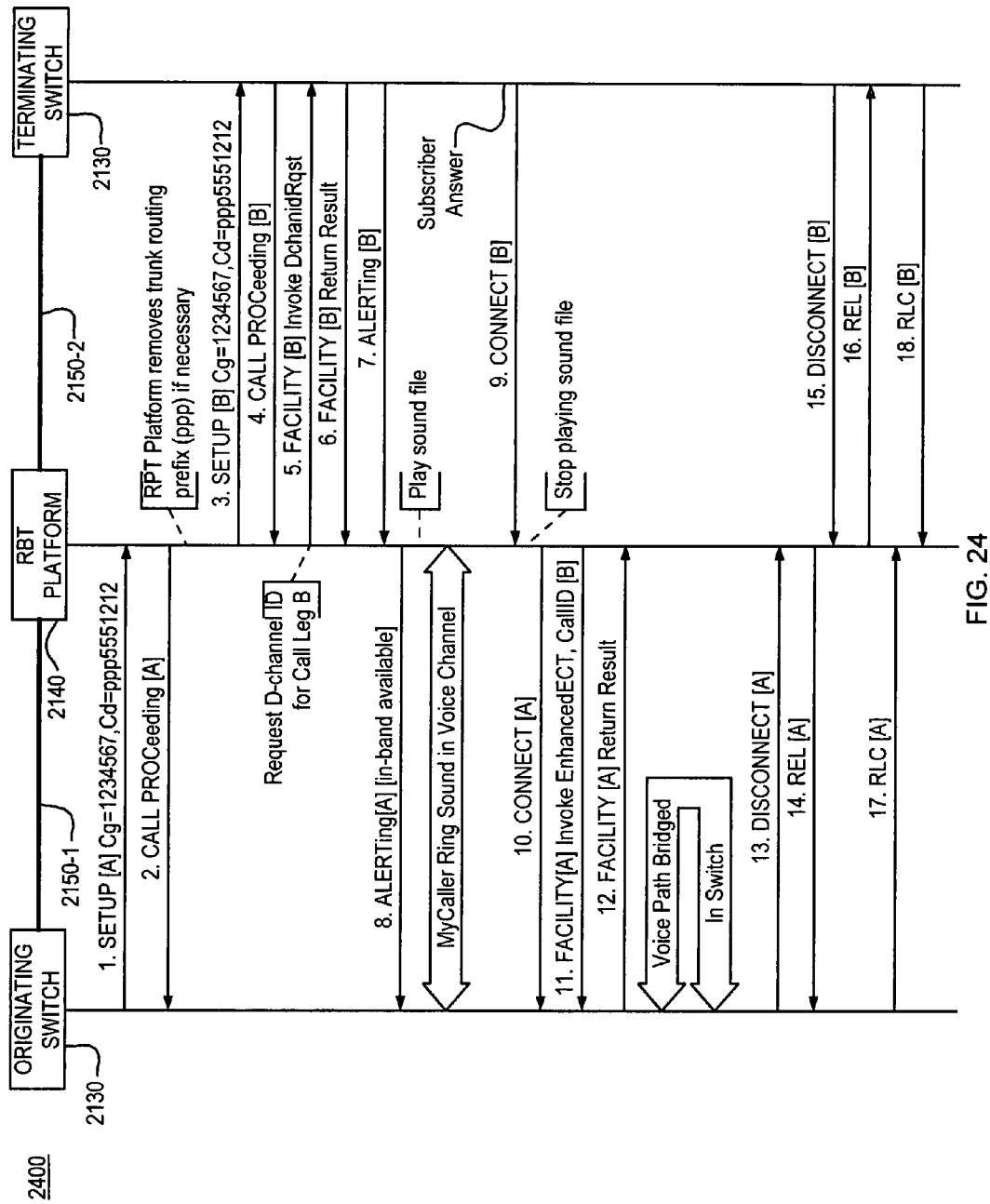
FIG. 24 is an example timing diagram illustrating call handling according to embodiments herein.

FIG. 24 is a timing diagram 2400 illustrating an example implementation of customized ring-back tones and related processes according to embodiments herein. For example, timing diagram 2400 illustrates service operation using an ISDN service and two B channel transfer techniques.

ISDN Service Node Operation with Two B-Channel Transfer

Some ISDN protocol variants (for example, US National ISDN-2) support a feature called two B-channel transfers (i.e., TBCT). The TBCT capability can be adapted for use in a ring-back tone generator system 2130, having 2 related calls in progress. According to embodiments herein one purpose of the TCBT request is to request that phone switch system 2130 connect those two calls together and drop the enhanced service platform connection (e.g., bridge 2146-2) from the call.

Use of TBCT can significantly reduce the voice trunk utilization between phone switch system 2130 (e.g., a switch) and an RBT platform (e.g., ring-back tone generator system 2140) using a service node implementation. For example, the ring-back tone generator system 2140 can drop out of the call (and thus releases the switch-to-RBT platform trunks used for that call) after a corresponding subscriber (e.g., target) answers the call. This technique is useful for reducing the number of trunks required on both the phone switch system 2130 and the ring-back tone generator system 2140 to support a given subscriber base by a significant factor, reducing the cost of deploying customized ring-back tone generator services.

The equipment (e.g., ring-back tone generator system 2140 and phone switch system 2130) employed in communication system 2100 and the initial call setup can be based on the normal ISDN service node implementation as discussed above. In such an embodiment, after the RBT platform (e.g., ring-back tone generator system 2140) detects that a call is answered, the RBT platform can request (via use of a TBCT type of request) that the adjacent switch (e.g., or switches in phone switch system) bridge the two call legs (e.g., the leg between caller 2110 and phone switch system 2130 as well as the leg between phone switch system 2130 and target 2120) together.

If the phone switch system 2130 can satisfy this request, the phone switch system 2130 connects the specified call legs together within its internal switch fabric and releases the two trunk circuits (e.g., 2132-2 and 2132-3). If the switch can't satisfy the TBCT request, for example, due to blocking in its internal switch fabric or other internal resource failure, the ring-back tone generator system 2140 connects the caller to the target 2120 internally via its own switch fabric. The ring-back tone generator system 2140 can support a voice channel in the call connection path between the caller 2110 and the target 2120 for all, part, or no part of the call.

Some switch implementations only allow transmission of the TBCT request after the outbound call leg toward the ring-back tone subscriber is answered, but not during a network tone or announcement. In this case, the ring-back tone generator system 2130 uses its internal switch fabric to connect the calls together once a network tone or announcement is detected. This normally does not significantly affect the trunk utilization since the percentage of calls terminating to tone or announcement is typically low and the duration of those calls is usually short.

As mentioned above, FIG. 24 illustrates an example of a TBCT implementation using the US National ISDN-2 signaling protocol variant. The exact message sequence used to request TBCT and the detailed parameters used to identify the calls to be connected may be different for other ISDN protocol variants.

Steps 1-4 Standard call setup for ISDN service node call.

Steps 5-6 Upon receipt of the call proceeding message for the outbound call segment, the RBT platform (if necessary) retrieves the D-channel identifier for the trunk used for this call. This is needed later when TBCT is requested.

Steps 7-8 Upon notification that the called party is alerting, the RBT platform plays the selected audio back to the calling party.

Steps 9-12 Upon notification that the called party has answered the call, the RBT platform requests the switch to transfer the two call segments together.

Steps 13-18 Upon successful transfer of the two call segments, the switch disconnects both call legs toward the RBT platform with standard ISDN disconnect messages.

Functionality supported by ring-back tone generator system 2140 and phone switch system 2130 and other resources will now be discussed via flowcharts in FIGS. 25-31.

Figure 25:
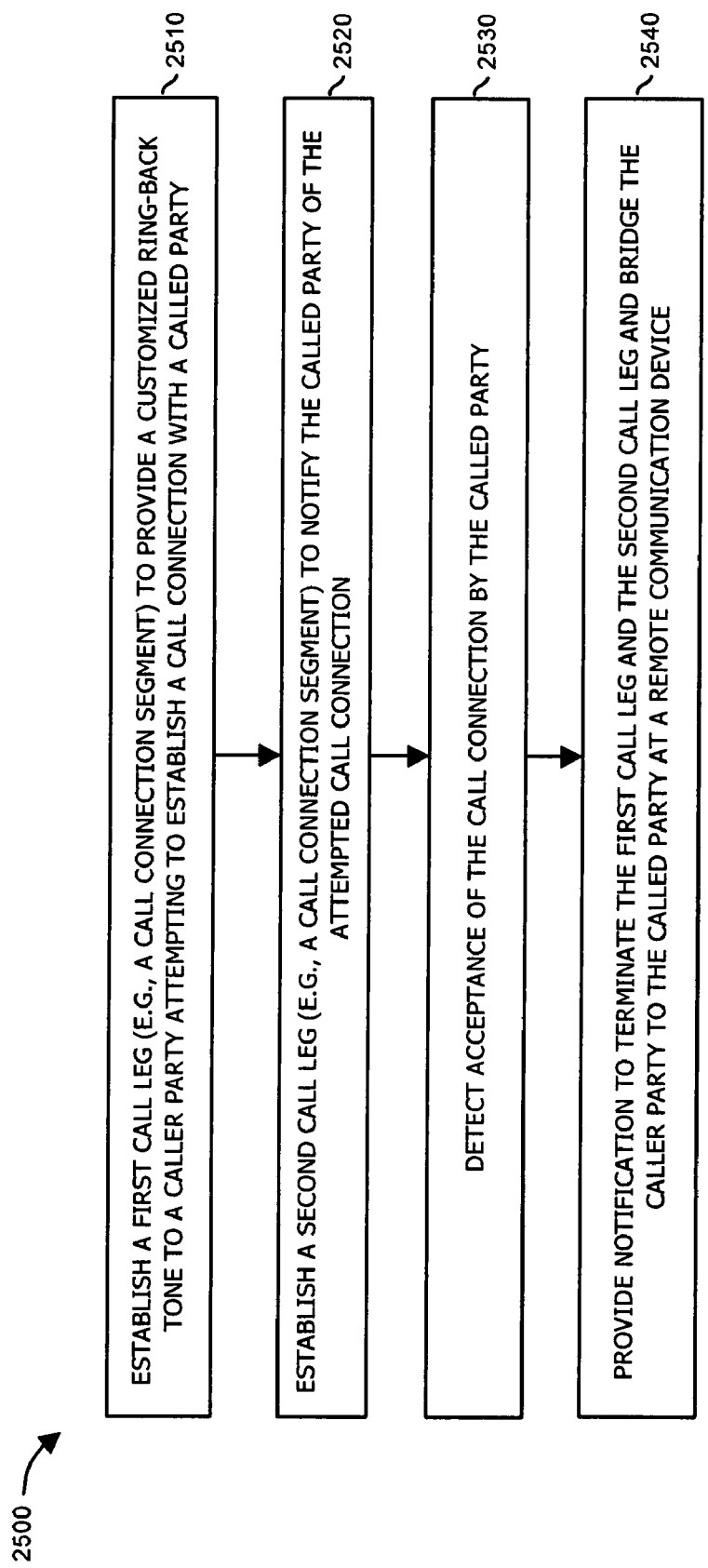
FIGS. 25-31 are diagrams of example flowcharts according to embodiments herein.

Now, more particularly, FIG. 25 is a flowchart 2500 illustrating a technique of implementing ring-back tone and related techniques (e.g., method, apparatus, etc.) according to embodiments herein. Note that techniques discussed in flowchart 2500 overlap with the techniques discussed above.

In step 2510, the ring-back tone generator system 2140 establishes a first call leg 2150-1 (e.g., a call connection segment) to provide a customized ring-back tone from ring-back tone generator system 2140 to a caller party (e.g., caller 2110) attempting to establish a call connection with a called party (e.g., target 2120 such as a phone, person, etc.).

In step 2520, the ring-back tone generator system 2140 establishes a second call leg 2150-2 (e.g., a call connection segment) to notify the called party (e.g., target 2120) of the attempted call connection initiated by caller 2110.

In step 2530, the ring-back tone generator system 2140 detects acceptance of the call connection request by the called party (e.g., target 2120) such as via a communication received over the second call leg 2150-2 from target 2120.

In step 2540, the ring-back tone generator system 2140 provides notification to terminate the first call leg 2150-1 and the second call leg 2150-2 and bridge the caller party (e.g., caller 2110) to the called party (e.g., target 2120) at a remote location (e.g., phone switch system 2130).

Figure 26:
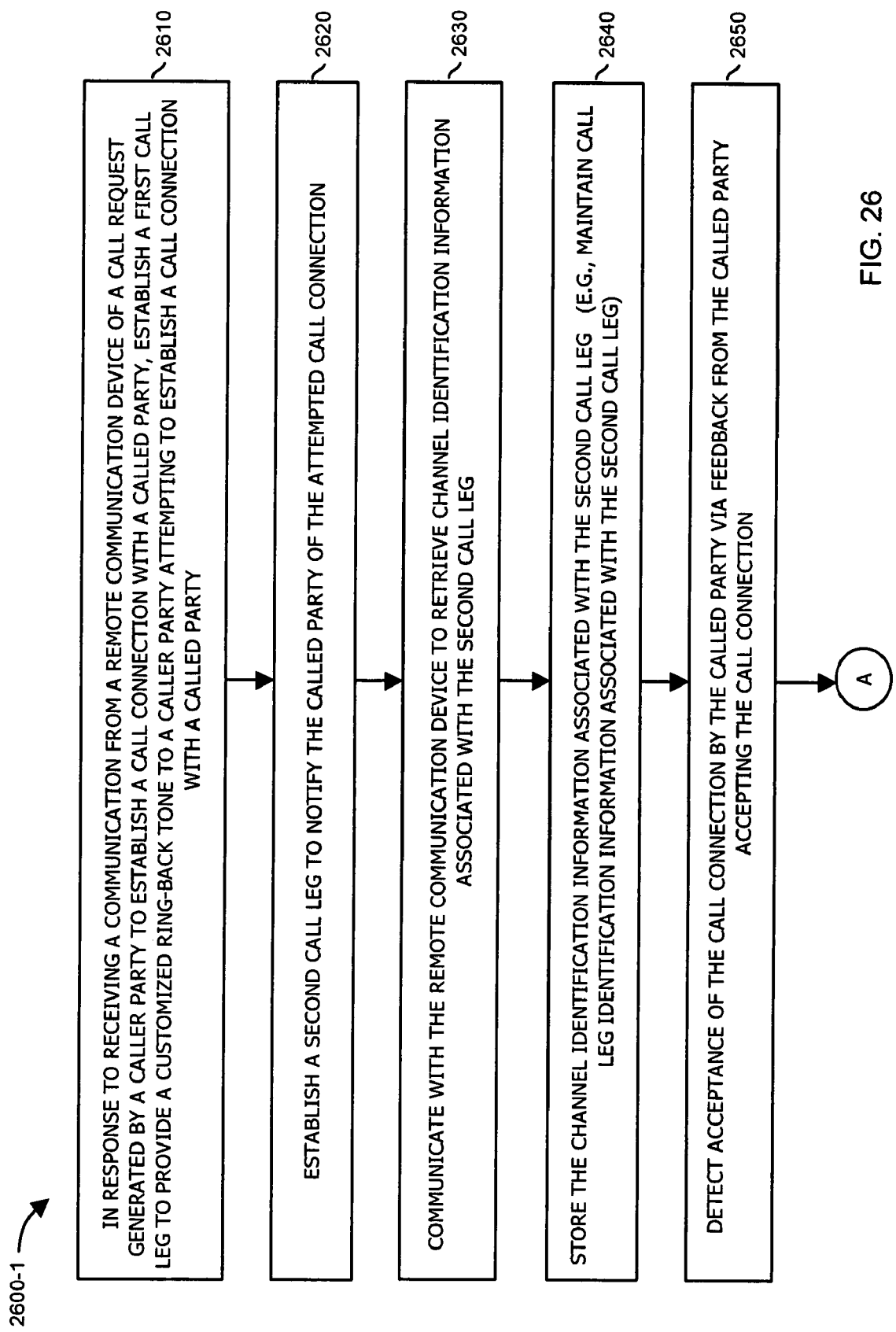
Figure 27:
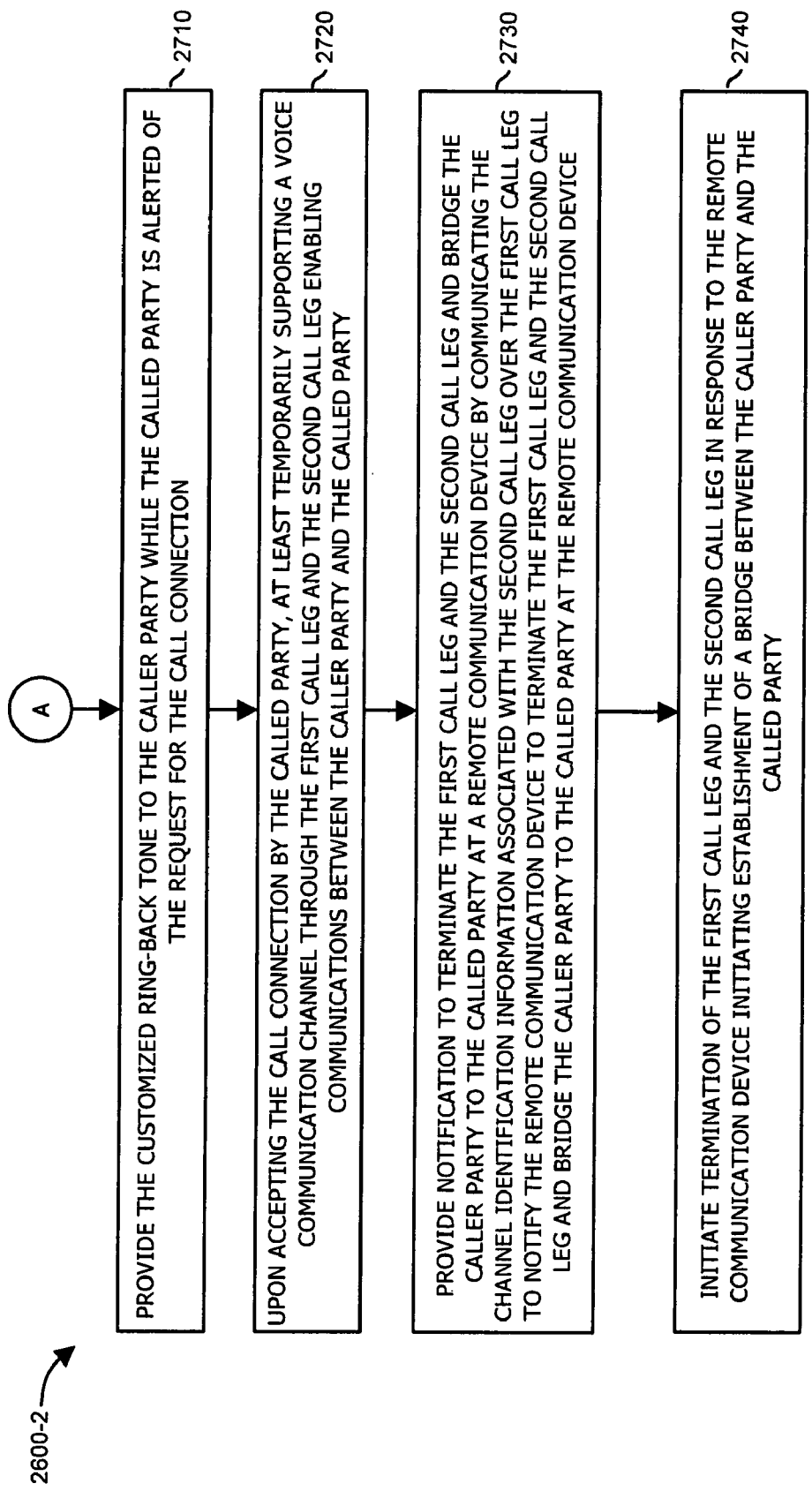

FIGS. 26 and 27 combine to form a detailed flowchart 2600 (e.g., flowchart 2600-1 and flowchart 2600-2) illustrating techniques for implementing customized ring-back tones and related processes according to embodiments herein. Note that techniques discussed in flowchart 2600 may overlap with the techniques discussed above in the previous figures.

In step 2610, in response to receiving a communication from a remote communication device (e.g., a phone device operated by caller 2110) of a call request generated by a caller party (e.g., caller 2110) to establish a call connection with a called party (e.g., target 2120), the ring-back tone generator system 2140 establishes a first call leg 2150-1 on which to provide a customized ring-back tone from ring-back tone generator system 2140 to the caller party.

In step 2620, the ring-back tone generator system 2140 establishes a second call leg 2150-2 to notify (e.g., alert) the called party 2110 of the attempted call connection.

In step 2630, the ring-back tone generator system 2140 communicates with a remote communication device (e.g., the phone switch system 2130) to retrieve channel identification information associated with the second call leg 2150-2. The channel identification information can specify attributes of the second call leg 2150-2 and/or specify information associated with the second call leg 2150-2 enabling an inquiring device to obtain information associated with the second call leg 2150-2.

In step 2640, the ring-back tone generator system 2140 stores the channel identification information associated with the second call leg 2150-2 (e.g., the ring-back tone generator system 2150-2 maintains call leg identification information associated with the second call leg).

In step 2650, the ring-back tone generator system 2140 detects acceptance of the call connection by the called party (e.g., target 2120) via feedback from the called party accepting the attempted call connection.

In step 2710 of flowchart 2600-2 of FIG. 27, the ring-back tone generator system 2140 provides (e.g., plays back) the customized ring-back tone to the caller party while the called party is alerted of the request for the call connection.

In step 2720, upon acceptance of the call connection by the called party, the ring-back tone generator system 2140 ends playback of the customized ring-back tone to the caller 2110, stops alerting the called party, and at least temporarily supports bridge 2146-2 and a voice communication channel through the first call leg 2150-1 and the second call leg 2150-2 enabling at least temporary communications between the caller party and the called party through the ring-back tone generator system 2140.

In step 2730, the ring-back tone generator system 2140 provides notification to phone switch system 2130 to terminate the first call leg 2150-1 and the second call leg 2150-2 and bridge the caller party to the called party at a remote communication device (e.g., phone switch system 2130), for example, by communicating the channel identification information associated with the second call leg 2150-2 over the first call leg 2150-1 to notify the remote communication device (e.g., phone switch system 2130) to terminate the first call leg 2150-1 and the second call leg 2150-2 and bridge the caller party to the called party at the phone switch system 2130.

In step 2740, the ring-back tone generator system 2140 participates in communication exchange with the phone switch system 2130 resulting in termination of the first call leg 2150-1 and the second call leg 2150-2 in response to the phone switch system 2130 initiating establishment of bridge 2236 at phone switch system 2130 between the caller party and the called party.

Figure 28:
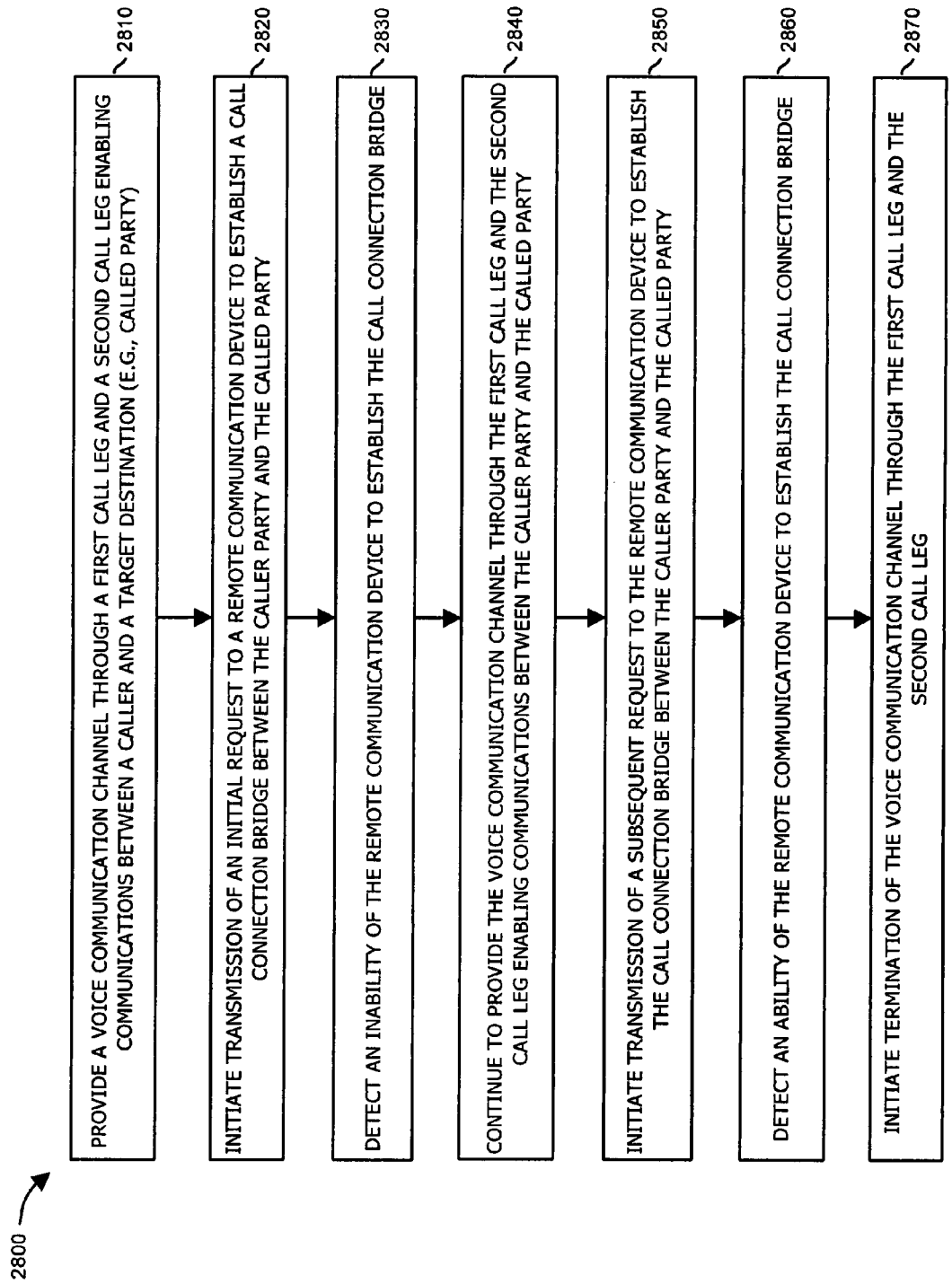

FIG. 28 is an example diagram of flowchart 2800 illustrating techniques in which the ring-back tone generator system 2140 at least temporarily provides a voice communication bridge (e.g., bridge 2146-2) and attempts (e.g., performs a looping procedure) to establish bridge 2236 at phone switch system 2130) according to embodiments herein. Note that techniques discussed in flowchart 2800 may overlap with the techniques discussed above in the previous figures.

In step 2810, the ring-back tone generator system 2140 provides a voice communication channel through a first call leg 2150-1 and a second call leg 2150-2 enabling communications between a caller and a target destination (e.g., called party). This was described in step 2720 of flowchart 2600-2.

In step 2820, assume in this example that the ring-back tone generator system 2140 initiates transmission of an initial request to a remote communication device (e.g., phone switch system 2130) to establish a call connection bridge 2236 at the phone switch system 2130 connecting the caller party and the called party.

In step 2830, assume that the ring-back tone generator system 2140 currently detects an inability of the phone switch system 2130 to establish the call connection bridge 2236 at the phone switch system 2130.

In step 2840, the ring-back tone generator system 2140 continues to provide bridge 2146-2 and the voice communication channel through the first call leg 2150-1 and the second call leg 2150-2 enabling communications between the caller 2110 and the target (e.g., called party).

In step 2850, the ring-back tone generator system 2140 initiates transmission of a subsequent request to the phone switch system 2130 to establish the call connection bridge 2236.

In step 2860, assume that the ring-back tone generator system 2140 now detects an ability of the phone switch system 2130 (e.g., based on a response from the phone switch system 2130) to establish the call connection bridge 2236. The phone switch system 2140 then creates bridge 2236 to connect the caller 2110 to the target 2120.

In step 2870, during, around, and/or after establishment of bridge 2236, the ring-back tone generator system 2140 initiates termination of the bridge 2146-2 as well as the first call leg 2150-1 and the second call leg 2150-2 and corresponding voice communication channel. Accordingly, the caller and the called party can communicate via a voice call handling through bridge 2236.

Figure 29:
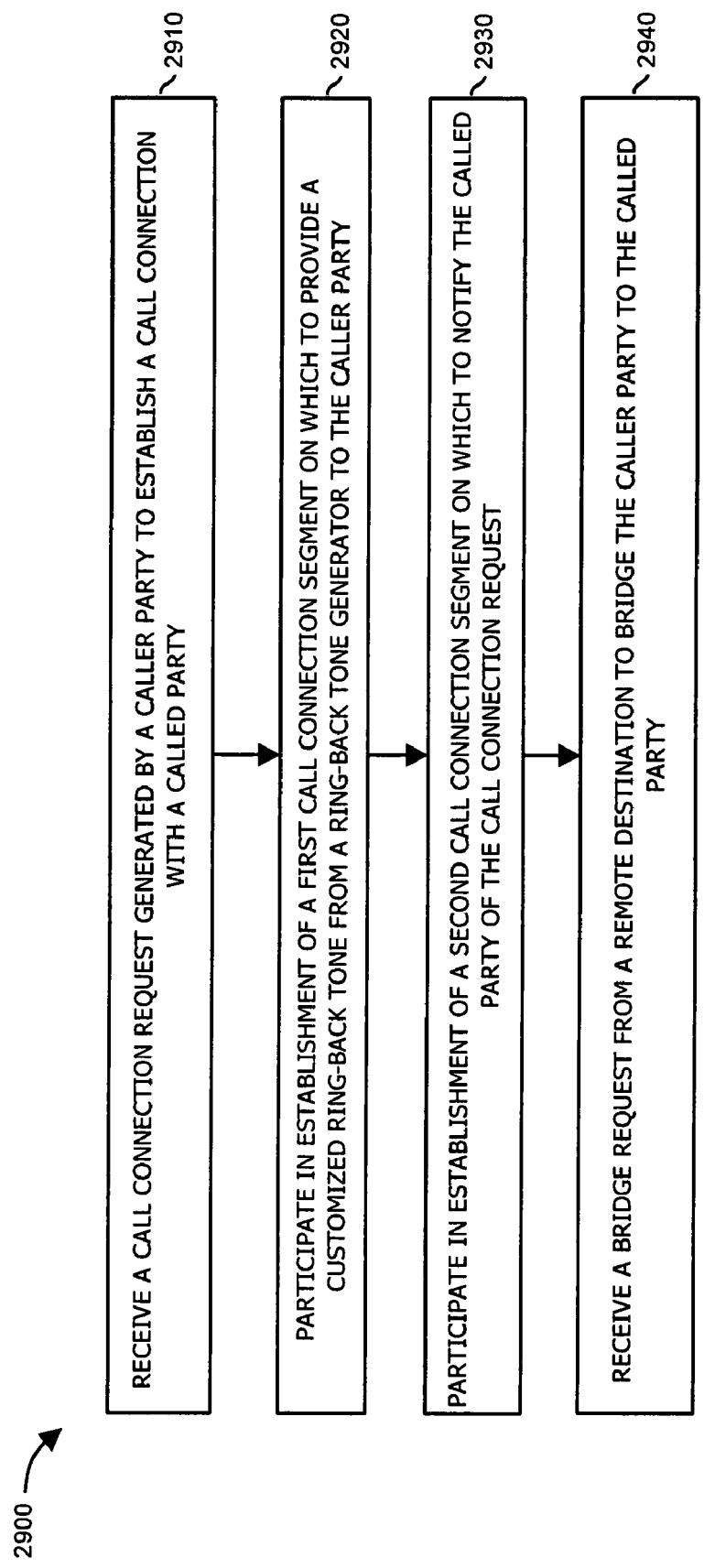

FIG. 29 is an example diagram of flowchart 2900 illustrating techniques associated with phone switch system 2130 according to embodiments herein. Note that techniques discussed in flowchart 2900 may overlap with the techniques discussed above in the previous figures.

In step 2910, the phone switch system 2130 receives a call connection request generated by a caller 2110 to establish a call connection with a called party (e.g., target 2120).

In step 2920, the phone switch system 2130 participates in establishment of a first call connection segment (e.g., call connection leg 2150-1) on which to provide a customized ring-back tone from a ring-back tone generator 2140 to the caller 2110.

In step 2930, the phone switch system 2130 participates in establishment of a second call connection segment (e.g., call connection leg 2150-2) on which to notify the called party (e.g., target 2120) of the call connection request.

In step 2940, the phone switch system 2130 receives a bridge request from ring-back tone generator system 2140 (e.g., a resource at a remote destination) to bridge the caller 2110 to the called party.

Figure 30:
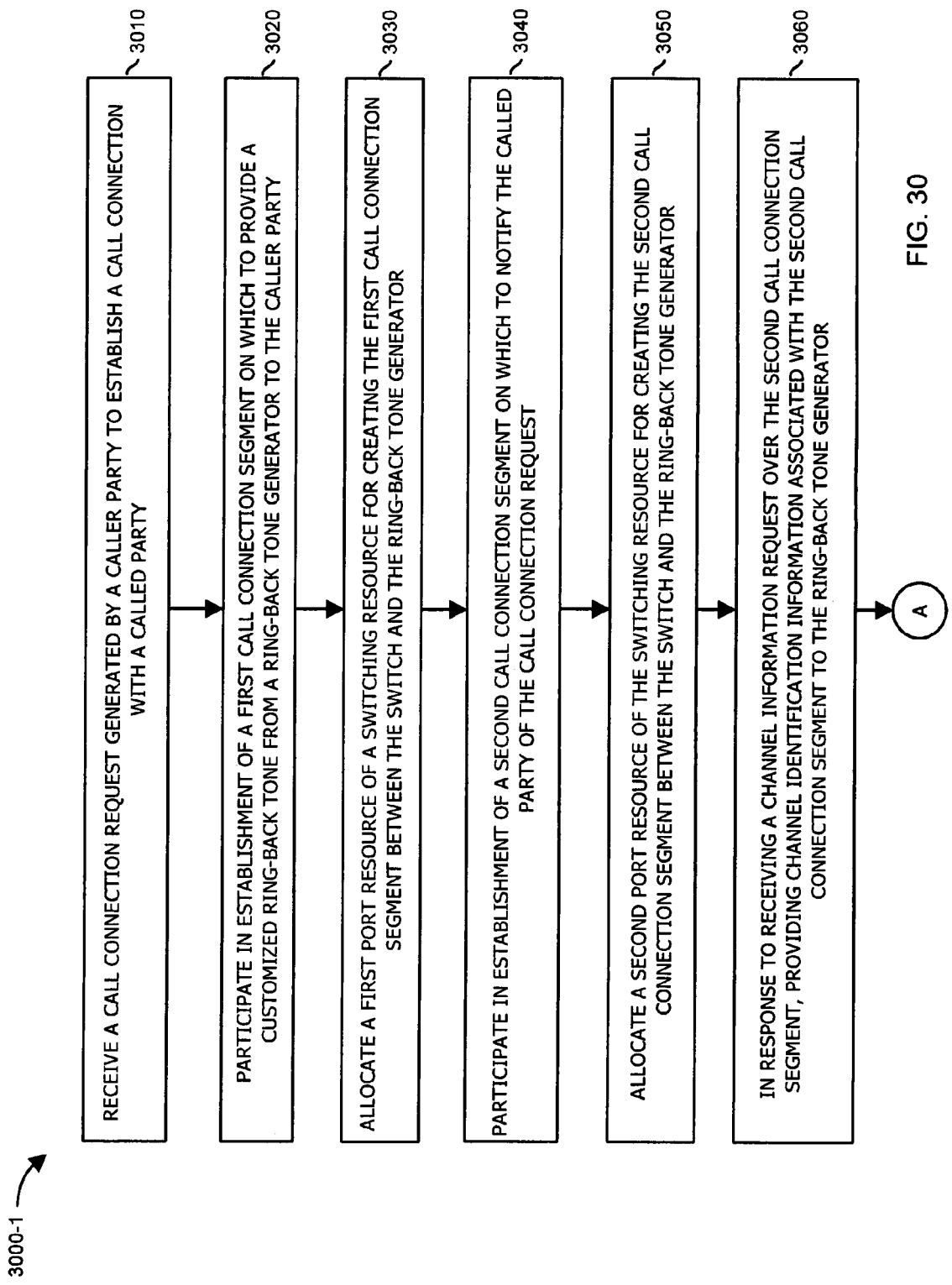
Figure 31:
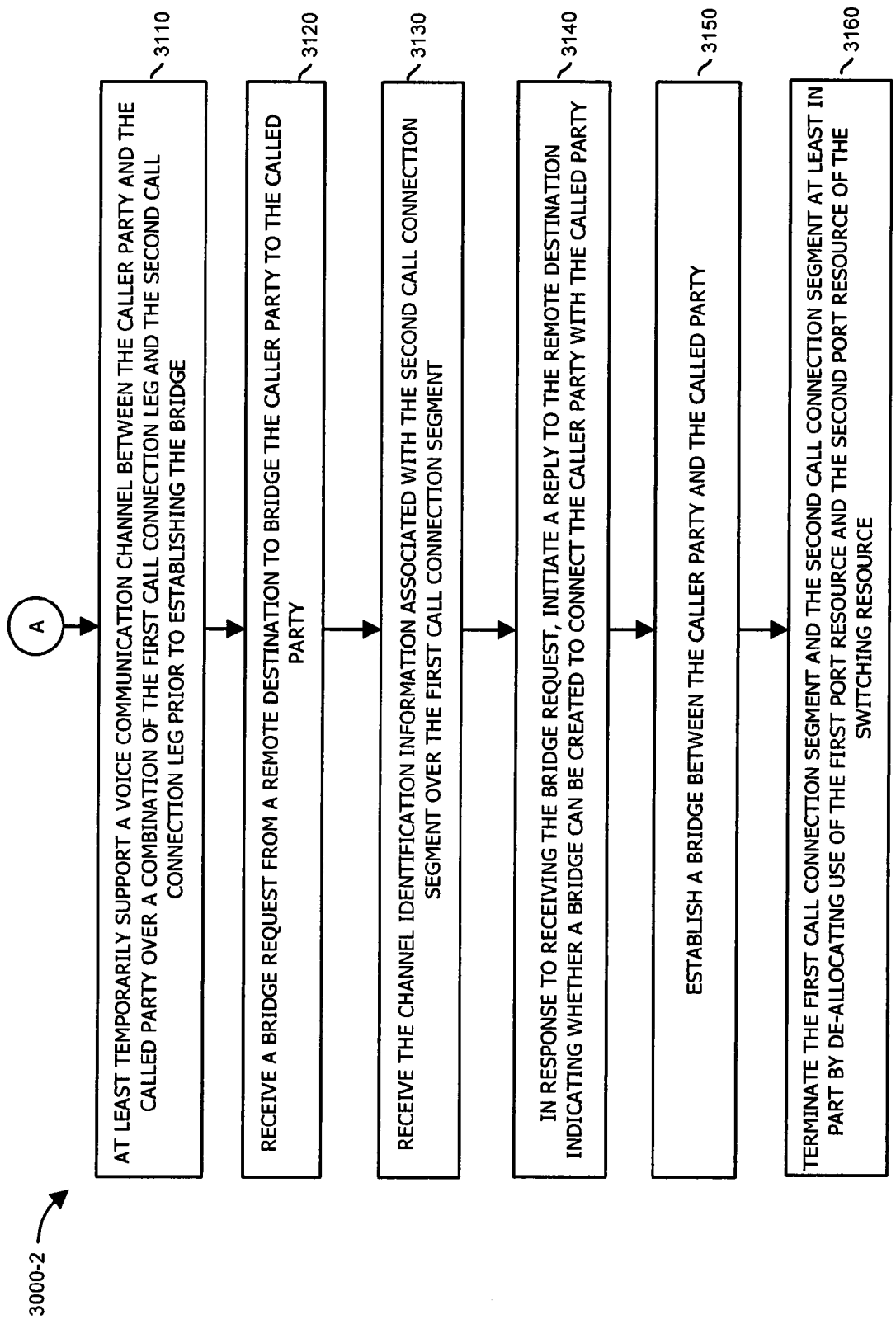

FIGS. 30 and 31 combine to form flowchart 3000 (e.g., flowchart 3000-1 and flowchart 300-2) illustrating techniques associated with communication system 2100 according to embodiments herein. Note that techniques discussed in flowchart 3000 may overlap with the techniques discussed above in the previous figures.

In step 3010 in flowchart 3000-1 of FIG. 30, the phone switch system 2130 receives a call connection request generated by a caller 2110 to establish a call connection with a target 2120.

In step 3020, the phone switch system 2130 participates in establishment of a first call connection leg (e.g., segment) on which to provide a customized ring-back tone from a ring-back tone generator 2140 to the caller 2110.

In step 3030, the phone switch system 2130 allocates a port resource 2132-2 (e.g., of a switching resource) for creating the first call connection leg 2150-1 between the phone switch system 2130 and the ring-back tone generator 2140.

In step 3040, the phone switch system 2130 participates in communications with the ring-back tone generator system 2140 to establish a second call connection leg 2150-2 that is used to notify the called party of the call connection request In step 3050, based on communications with the ring-back tone generator system 2140, the phone switch system 2130 allocates a second port resource 2132-3 of phone switch system 2130 (e.g., a switching resource) for creating the second call connection segment between the phone switch system 2130 and the ring-back tone generator system 2140.

In step 3060, in response to receiving a channel information request (e.g., a request for information associated with the first call connection leg 2150-1) over the second call connection leg 2150-2, the phone switch system 2130 provides channel identification information associated with the second call connection leg 2150-2 to the ring-back tone generator 2140.

In step 3110 in flowchart 3000-2 of FIG. 31, via bridge 2146-2 in ring-back tone generator system 2140, the phone switch system 2130 at least temporarily participates as an intermediary and supports a voice communication channel between the caller 2110 and the target 2120 over a combination of the first call leg 2150-1 and the second call connection leg 2150-2 prior to establishing the bridge 2236 in the phone switch system 2130.

In step 3120, assume that the phone switch system 2130 receives a bridge request from the ring-back tone generator system 2140 (e.g., a remote destination) to bridge the caller 2110 to the target 2120. For example, assume that the subscriber at target 2120 answers his phone causing the ring-back tone generator system 2140 to communicate over the first call connection leg 2150-1 that the phone has been answered.

In step 3130, in addition to notifying the target that the target answers the phone, the phone switch system 2130 receives (from the ring-back tone generator system 2140) channel identification information associated with the second call connection leg 2150-2 over the first call connection leg 2150-1.

In step 3140, in response to receiving the bridge request from a source such as ring-back tone generator system 2140, the phone switch system 2130 initiates a communication to the ring-back tone generator system 2140 indicating whether a bridge can be created at the phone switch system 2130 to connect the caller party with the called party.

In step 3150, assuming the phone switch system 2130 can create bridge 2236 and provides such a message in step 3140, the phone switch system 2130 establishes bridge 2236 at phone switch system 2130 to connect the caller party and the called party eliminating the need for bridge 2146-2 at ring-back tone generator system 2140.

In step 3160, the phone switch system 2130 initiates termination of the first call connection leg 2150-1 and the second call connection leg 2150-2 at least in part by de-allocating use of the first port resource 132-2 and the second port resource 132-3 at the phone switch system 2130 as specified by the call handling identification information.

Figure 32:
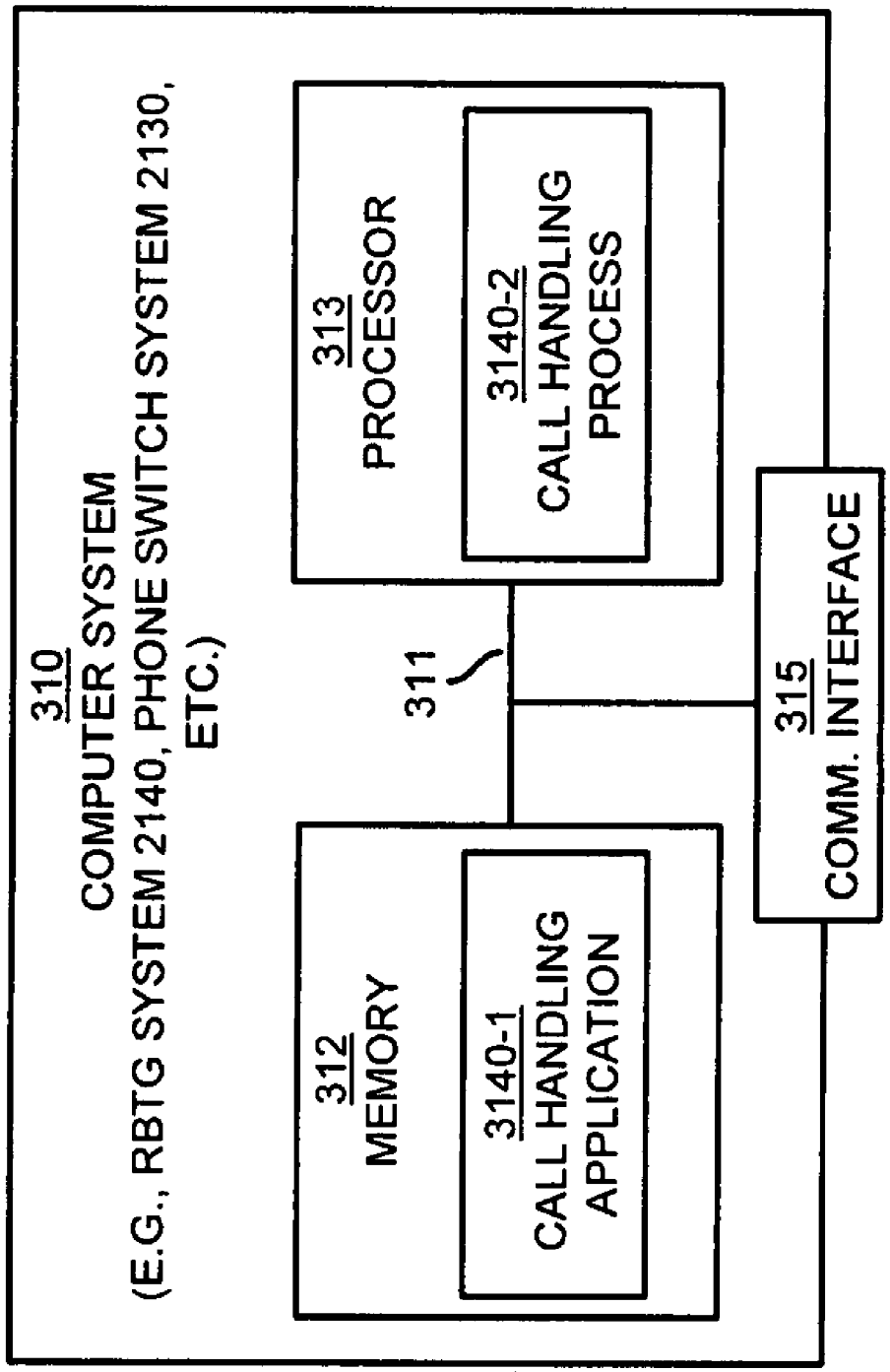
FIG. 32 is a diagram of an example architecture for carrying out processes, methods, etc. according to embodiments herein.

FIG. 32 is a block diagram illustrating an example computer system 310 for executing software instructions according to embodiments herein. Computer system 310 (e.g., hardware and/or software in ring-back tone generator system 2140, phone switch system 2130, etc.) may be a computerized device for providing corresponding call handling functions as described herein.

As shown, computer system 310 of the present example includes an interconnect 311 that couples resources such as a memory system 312, a processor 313, and a communications interface 315. Memory system 312 can be encoded with a call handling application 3140-1 supporting embodiments as described herein. For example, the call handling application 3140-1 can be embodied as software code such as data and/or logic instructions (e.g., code stored in the memory or on another computer readable medium such as a disk) that support functionality according to different embodiments described herein such as those supported by ring-back tone generator system 2140 and phone switch system 2130.

During operation of call handling application 3140-1, processor 313 accesses memory system 312 via the interconnect 311 in order to launch, run, execute, interpret or otherwise perform the logic instructions associated with the call handling application 3140-1. Execution of the call handling application 3140-1 produces processing functionality in call handling process 3140-2. In other words, the call handling process 3140-2 represents one or more portions of the call handling application 3140-1 (or the entire application) performing within or upon the processor 313 in the computer system 310.

It should be noted that call handling process 3140-2 executed in computer system 310 can be represented by either one or both of the call handling application 3140-1 and/or the call handling process 3140-2. For purposes of this discussion and different embodiments herein, general reference will again be made to the call handling process 3140-2 as performing or supporting the various steps and functional operations as previously discussed in flowcharts and other text herein.

As mentioned, in addition to the call handling process 3140-2, embodiments herein include the call handling application 3140-1 itself (i.e., the un-executed or non-performing logic instructions and/or data). The call handling application 3140-1 may be stored on a computer readable medium such as a floppy disk, hard disk, or optical medium. The call handling application 3140-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of call handling application 3140-1 in processor 313 as the call handling process 3140-2. Thus, those skilled in the art will understand that the computer system 310 may include other processes and/or software and hardware components, such as an operating system that controls allocation and use of hardware resources.

While techniques herein have been particularly shown and described with references to preferred configurations thereof, it will be understood by those skilled in the art that various changes in form and details may be made therein without departing from the spirit and scope of the invention as defined by the appended claims. Such variations are intended to be covered by the scope of this invention. As such, the foregoing description of configurations is not intended to be limiting. Rather, any limitations to configurations are presented in the following claims.

What is claimed is:

1. A method comprising: establishing a first call leg with a ring-back tone generator system, the ring-back tone generator system providing a customized ring-back tone over the first call leg to a caller party attempting to establish a call connection with a called party; establishing a second call leg between the ring-back tone generator system and the called party, the ring-back tone generator system providing notification to the called party over the second call leg of the attempted call connection; detecting acceptance of the call connection by the called party; providing notification to terminate the first call leg and the second call leg and bridge the caller party to the called party at a remote communication device with respect to the ring-back tone generator system, the remote communication device residing in a path of both the first call leg and the second call leg; wherein establishing the first call leg includes maintaining call leg identification information associated with the second call leg; and wherein providing notification includes communicating, the call leg identification information associated with the second call leg, to notify the remote communication device to terminate the first call leg and the second call leg and connect the caller party to the called party at the remote communication device.

2. A method as in claim 1 further comprising:
communicating with the remote communication device to retrieve channel identification information associated with the second call leg; and
storing the channel identification information associated with the second call leg.

3. A method as in claim 1, wherein establishing the first call leg occurs in response to receiving a communication from the remote communication device of a call request generated by the caller party to establish the call connection with the called party.

4. A method as in claim 1 further comprising:
providing a bridge in the ring-back tone generator system, the bridge providing connectivity between the first call leg and the second call leg to convey communications between the caller party and the called party; and
after providing the customized ring-back tone over the first call leg, at least temporarily supporting a voice communication channel through a link including the first call leg, the bridge, and the second call leg enabling communications between the caller party and the called party.

5. A method as in claim 4 further comprising:
initiating termination of the first call leg and the second call leg in response to the remote communication device initiating establishment of a bridge between the caller party and the called party at the remote communication device.

6. A method as in claim 1 further comprising:
providing a voice communication channel through the first call leg and the second call leg enabling communications between the caller party and the called party;
initiating transmission of an initial request to the remote communication device to establish a call connection bridge between the caller party and the called party;
detecting an inability of the remote communication device to establish the call connection bridge; and
continuing to provide the voice communication channel through the first call leg and the second call leg enabling communications between the caller party and the called party.

7. A method as in claim 6 further comprising:
initiating transmission of a subsequent request to the remote communication device to establish the call connection bridge between the caller party and the called party;
detecting an ability of the remote communication device to establish the call connection bridge; and
initiating termination of the voice communication channel through the first call leg and the second call leg.

8. A method as in claim 1 further comprising:
providing the customized ring-back tone to the caller over the first call leg while sending an alert over the second leg to the called party, the alert indicating that the caller party is attempting to reach the called party.

9. A method as in claim 8, wherein providing the customized ring-back tone includes transmitting the customized ring-back tone to the caller party over a voice channel established on the first call leg, the method further comprising:
after the called party accepts the call connection, at least temporarily supporting a voice communication channel through the first call leg and the second call leg enabling communications between the caller party and the called party; and initiating termination of the first call leg and the second call leg in response to the remote communication device establishing the connection between the caller party and the called party.

10. A method comprising:
receiving, at a ring-back tone generator, a call connection request generated by a caller party to establish a call connection with a called party;
participating in establishment of a first call connection segment on which to provide a customized ring-back tone from the ring-back tone generator to the caller party;
transmitting the customized ring-back tone over the first call connection segment to the caller party;
participating in establishment of a second call connection segment from the ring-back tone generator to the called party, the second call connection segment used to notify the called party of the call connection request;
receiving a bridge request from a remote resource, the bridge request indicating to bridge the caller party to the called party;
wherein participating in establishment of a first call connection segment includes allocating a first port resource of a switching resource for creating the first call connection segment between the switching resource and the ring-back tone generator, the remote switching resource located at a remote location with respect to the ring-back tone generator; and
wherein participating in establishment of the second call connection segment includes allocating a second port resource of the switching resource for creating the second call connection segment between the switching resource and the ring-back tone generator, the switching resource residing in a path of both the first call connection segment and the second call connection segment;
in response to receiving a channel information request over the second call connection segment, providing channel identification information associated with the second call connection segment to the ring-back tone generator;
wherein receiving the bridge request includes receiving the channel identification information associated with the second call connection segment over the first call connection segment, the method further comprising:
establishing a bridge between the caller party and the called party;
terminating the first call connection segment and the second call connection segment at least in part by de-allocating use of the first port resource and the second port resource of the switching resource; and
at least temporarily supporting a voice communication channel between the caller party and the called party over a combination of the first call connection segment and the second call connection segment prior to establishing the bridge at the switching resource.

11. A method as in claim 10 further comprising:
in response to receiving the bridge request, initiating a reply to the remote resource, the reply indicating whether a bridge can be created to connect the caller party with the called party.

12. A computer system comprising:
a processor;
a memory unit that stores instructions associated with an application executed by the processor; and
an interconnect coupling the processor and the memory unit, enabling the computer system to execute the application and perform operations of:
establishing a first call leg with a ring-back tone generator system, the ring-back tone generator system providing a customized ring-back tone over the first call leg to a caller party attempting to establish a call connection with a called party;
establishing a second call leg between the ring-back tone generator system and the called party, the ring-back tone generator system providing notification to the called party over the second call leg of the attempted call connection;
detecting acceptance of the call connection by the called party; and providing notification to terminate the first call leg and the second call leg and bridge the caller party to the called party at a remote communication device with respect to the ring-back tone generator system, the remote communication device residing in a path of both the first call leg and the second call leg;

wherein establishing the first call leg includes maintaining call leg identification information associated with the second call leg; and wherein providing notification includes communicating, at least the call leg identification information associated with the second call leg, to notify the remote communication device to terminate the first call leg and the second call leg and connect the caller party to the called party at the remote communication device.

13. A computer system as in claim 12 further supporting operations of:

communicating with the remote communication device to retrieve channel identification information associated with the second call leg; and storing the channel identification information associated with the second call leg.

14. A computer system as in claim 12 further supporting operations of:

after providing the customized ring-back tone, at least temporarily supporting a voice communication channel through the first call leg and the second call leg enabling communications between the caller party and the called party; and initiating termination of the first call leg and the second call leg in response to the remote communication device initiating establishment of a bridge between the caller party and the called party.

15. A computer system as in claim 12 further supporting operations of:

providing a voice communication channel through the first call leg and the second call leg enabling communications between the caller party and the called party;

initiating transmission of an initial request to the remote communication device to establish a call connection bridge between the caller party and the called party;

detecting an inability of the remote communication device to establish the call connection bridge; and continuing to provide the voice communication channel through the first call leg and the second call leg enabling communications between the caller party and the called party.

16. A computer system as in claim 15 further supporting operations of:

initiating transmission of a subsequent request to the remote communication device to establish the call connection bridge between the caller party and the called party;

detecting an ability of the remote communication device to establish the call connection bridge; and initiating termination of the voice communication channel through the first call leg and the second call leg.

17. A method comprising:

establishing a first call leg with a ring-back tone generator system, the ring-back tone generator system providing a customized ring-back tone over the first call leg to a caller party attempting to establish a call connection with a called party;

establishing a second call leg between the ring-back tone generator system and the called party, the ring-back tone generator system providing notification to the called party over the second call leg of the attempted call connection; detecting acceptance of the call connection by the called party; and providing notification to terminate the first call leg and the second call leg and bridge the caller party to the called party at a remote communication device with respect to the ring-back tone generator system;

communicating with the remote communication device in a path of the first call leg to retrieve channel identification information associated with the second call leg; storing the channel identification information associated with the second call leg, the channel identification information indicating call leg identification information; providing the customized ring-back tone to the caller party while the called party is alerted of the request for the call connection; upon acceptance of the call connection by the called party, at least temporarily supporting a voice communication channel through the first call leg and the second call leg, the call connection transmitting communications between the caller party and the called party; providing notification to terminate the first call leg and the second call leg and bridge the caller party to the called party at a remote communication device with respect to the ring-back tone generator system by communicating the channel identification information associated with the second call leg over the first call leg to notify the remote communication device to terminate the first call leg and the second call leg and bridge the caller party to the called party at the remote communication device; and initiating termination of the first call leg and the second call leg in response to the remote communication device initiating establishment of the bridge between the caller party and the called party.

* * * * *